United States Patent [19]
Culley

[11] Patent Number: 4,787,032
[45] Date of Patent: Nov. 22, 1988

[54] PRIORITY ARBITRATION CIRCUIT FOR PROCESSOR ACCESS

[75] Inventor: Paul R. Culley, Houston, Tex.

[73] Assignee: Compaq Computer Corporation, Houston, Tex.

[21] Appl. No.: 905,075

[22] Filed: Sep. 8, 1986

[51] Int. Cl.[4] .............................................. G06F 9/46
[52] U.S. Cl. ...................................................... 364/200
[58] Field of Search ... 364/200 MS File, 900 MS File

[56] References Cited

U.S. PATENT DOCUMENTS 4,001,783 1/1977 Monahan et al. ................... 364/200
4,488,258 12/1984 Struger et al. ...................... 364/900

Primary Examiner—David Y. Eng
Attorney, Agent, or Firm—J. David Cabello

[57] ABSTRACT

A personal computer is disclosed having a microprocessor RESET/HOLD arbitration circuit and logic. The RESET/HOLD arbitration circuit requires a RESET signal to wait until any pending microprocessor "HOLD" is serviced or in the alternative and in the event the "RESET" signal is being processed causes the microprocessor "HOLD" signal to wait. The priority arbitration circuit and logic is essential to the proper operation of the 80386 microprocessor particularly in shifting from the "protected" mode of the microprocessor to the "real" mode of the microprocessor, since many third party application programs require the use of the microprocessor "protected" mode and require that the microprocessor be "reset" before returning to the "real" mode. The microprocessor "reset" must be accomplished by resetting the microprocessor without resetting the entire machine and without losing a HOLD request during the RESET. The computer system must also be capable of retaining a RESET request while either a DMA or REFRESH cycle is processed.

6 Claims, 8 Drawing Sheets

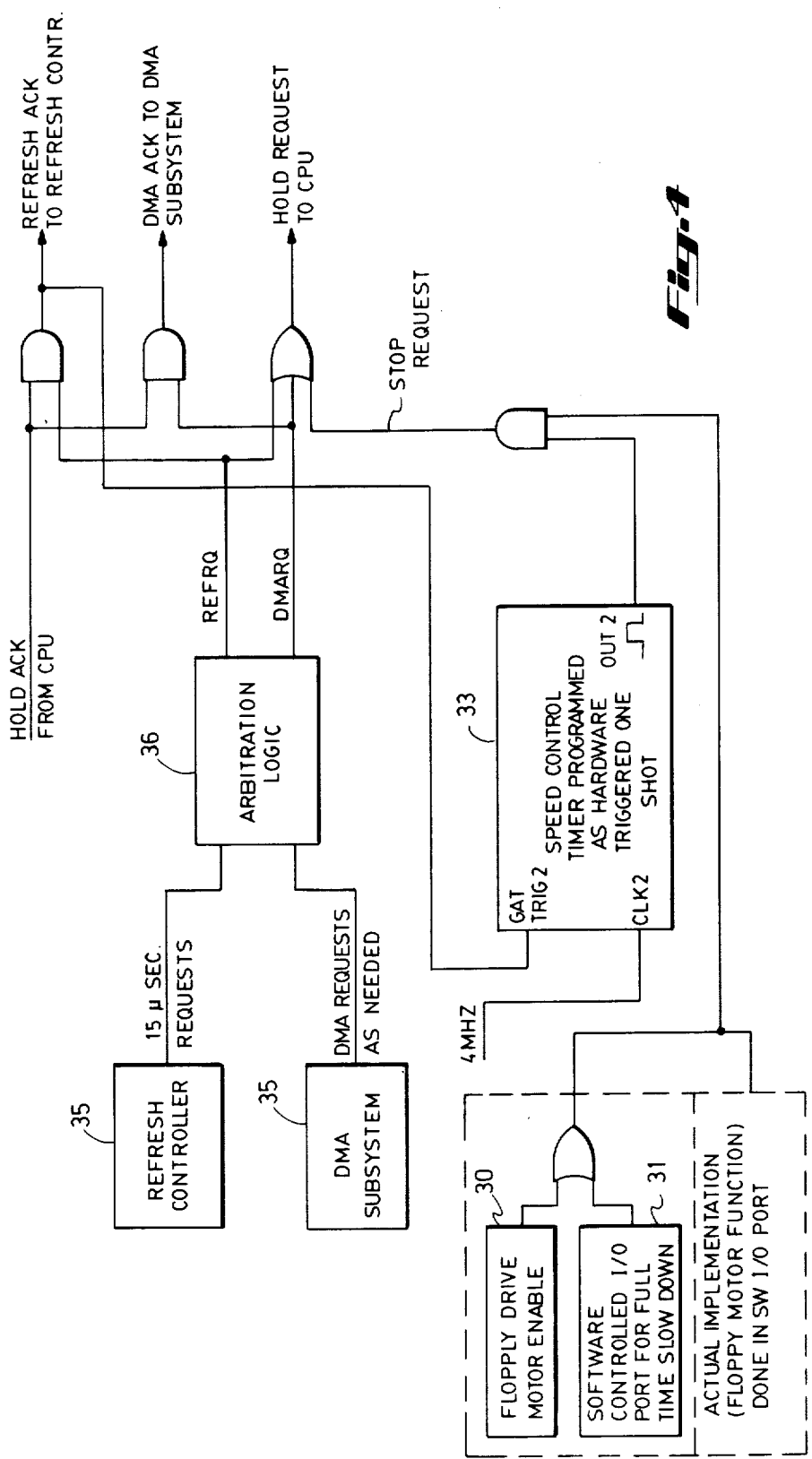

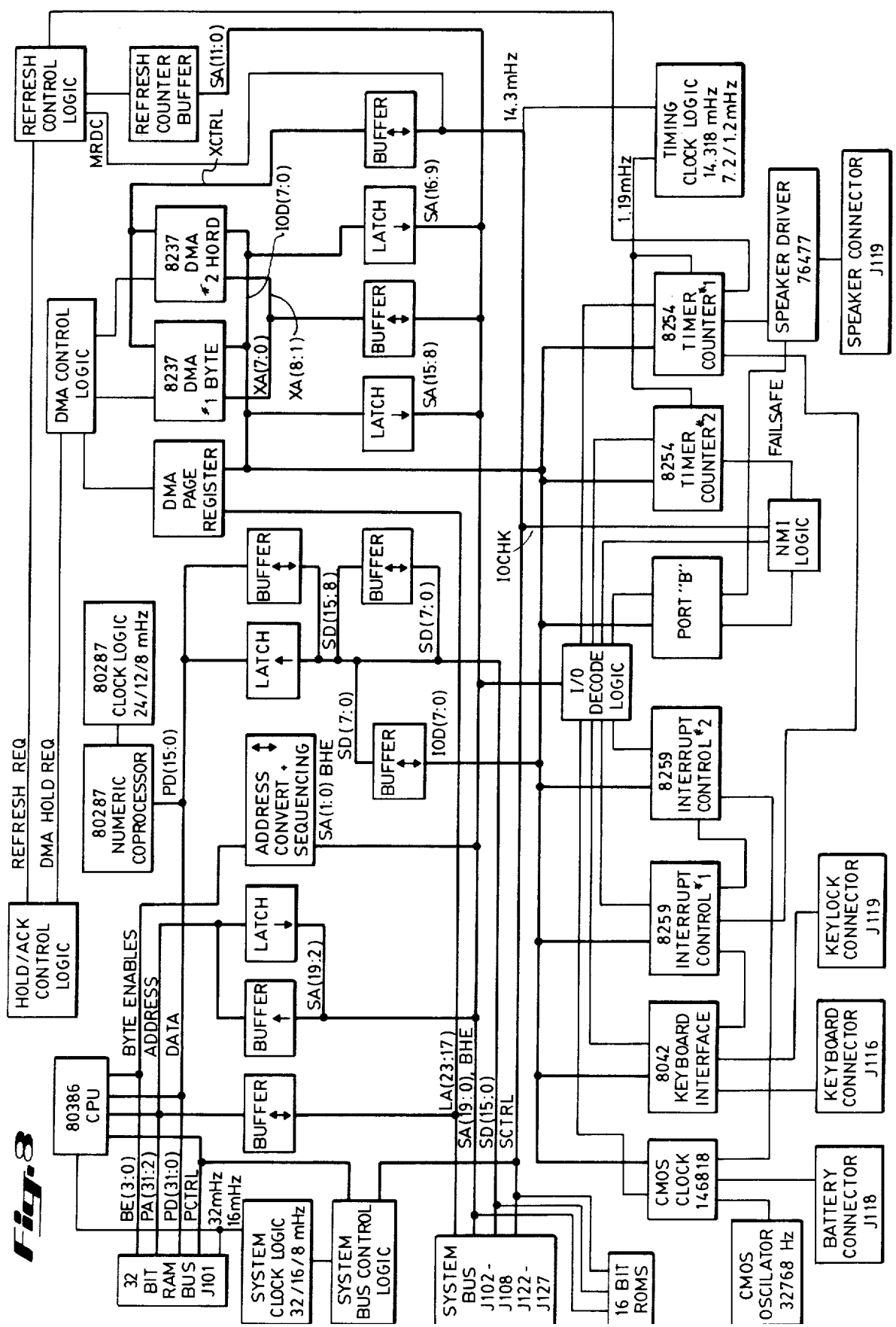

PRIORITY ARBITRATION CIRCUIT FOR PROCESSOR ACCESS

BACKGROUND OF THE INVENTION

This invention relates to personal computers designed with commercially available microprocessor chip sets. More particularly, the present invention relates to a personal computer in which a new generation of commercially available microprocessors is implemented in a manner to maintain software compatibility with existing application programs.

The present invention permits one to implement a new family of microprocessors such as the Intel 80386 while maintaining compatibility with the older generation of microprocessors, specifically the 80286 microprocessor (manufactured by Intel).

One of the design features of the 80286 microprocessor was the ability to recognize and retain a HOLD request from external hardware during a microprocessor RESET cycle. In the 80286 system, DMA and REFRESH cycle operations (using HOLD) could occur while the CPU was being reset. The feature in the 80286 microprocessor, to recognize a HOLD, during a RESET cycle was eliminated at the time the 80386 microprocessor chip was designed. Thus the 80386 chip is not capable of being fully compatible with 80286 functions because of the loss of this feature. Since many third party software applications for the 80286 processor machines are written with this feature in mind, these programs were incompatible with the new 80386 microprocessor. Failure to find a means to make the programs written for the 80286 microprocessor compatible with the new 80386 microprocessor will result in almost no commercial demand for a computer implementing the new 80386 microprocessor.

The introduction of the personal computer has resulted in a tremendous amount of application software programs written for both the professional and for the home entertainment market. These personal computers are designed around commercially available microprocessor chip sets which may include a plurality of microprocessors connected in an architecture which results in varying degrees of execution throughput rates.

Popular microprocessor chip sets widely used by personal computer manufacturers are the Intel Corporation 8088 microprocessor, 8086 microprocessor and the 80286 microprocessor, all having similar instruction sets. Similar instruction sets are also available for a new generation microprocessor from Intel, the 80386 microprocessor. The 80386 microprocessor has a substantially higher execution cycle rate, almost three times faster than the 80286. Available also from Intel is a co-processor chip, the Intel 80287, which may be used either with the 80286 or the 80386 microprocessor chips to achieve even higher execution throughput rates.

With the availability of a software compatible (i.e., executes the same instruction set) microprocessor, it is possible to upgrade a prior art personal computer with higher execution speeds for some application programs written for the lower speed microprocessor chip sets. While faster software compatible microprocessors are available, it is not possible, however, to simply substitute the faster microprocessor for the slower microprocessor and thereby produce a personal computer which executes at higher speeds for all of the application programs written for the slower microprocessor.

Not all application programs written for the slower microprocessor i.e., 8088/8086 and 80286 microprocessors are capable of running at faster microprocessor speeds, even though each instruction in the program is executed in a similar manner in these machines. The inability to run some programs at higher speeds results from the fact that programmers, when writing for the slower microprocessor, take advantage of the particular capabilities of the microprocessor in structuring routines. For example, many programmers took advantage of the ability of the 80286 microprocessor to run programs in the "real" and "protected" mode and implemented this capability while at the same time taking the necessary precautions to work within the limitations of these features as the program performed the various functions.

It is undeniable that providing a personal computer capable of executing application programs written for slower microprocessors in a third of the time would be of a commercial advantage in the marketplace, but such a device would not be competitive unless it were able to execute a majority of the application programs written for slower speed microprocessors.

Even though the previous microprocessor chip sets, (i.e. 80286 ) contain a great deal of software compatibility, the internal design of the microprocessors is not the same. This difference in internal design, depending upon the design of the application program, i.e., does it contain a lot of program jumps, affects the adaptability of a given application program to the new microprocessor.

The internal design difference between the 80286 and the 80386 microprocessors is primarily in the amount of pre-fetch buffer memory provided in the microprocessor, however, some of the firmware features in the 80286 microprocessor were eliminated in the design of the 80386 microprocessor.

Therefore, it would be advantageous to provide a personal computer with a new generation microprocessor executing at a faster rate which provides for a faster execution of application programs which were written for an earlier generation of microprocessors while maintaining compatibility with the older generation microprocessors. Compatibility should be maintained particularly when the chip manufacturer has eliminated features from the new generation microprocessor without regard to the issue of compatibility. For example, the older generation microprocessor included features which were intentionally used by program writers as a part of the program, however the chip manufacturer has eliminated these features without regard to the issue of compatibility. One such feature is the ability to recognize and respond to a "HOLD" request during reset of the CPU.

RELATED APPLICATION

This application is filed concurrently with U.S. patent application Ser. No. 905,074 entitled "ROM REPLACEMENT USING DUAL MAPPED RAM" and U.S. patent application Ser. No 904,982 entitled "COMPUTER SYSTEM SPEED CONTROL AT CONTINUOUS PROCESSOR SPEED", these concurrent applications having a common assignee and common inventor. Additionally a related application is co-pending U.S. patent application Ser. No. 626,912, filed June 27, 1984, having a common assignee and inventor.

SUMMARY OF THE INVENTION

In accordance with the present invention, there is disclosed a personal computer having a high speed 32-bit microprocessor that is almost fully compatible with an older generation of 16-bit microprocessors.

In accordance with the present invention, there is provided an arbitration circuit and logic which maintains the compatibility between the 80286 and the 80386 microprocessors even though the microprocessor chip manufacturer has eliminated a design feature which permitted the microprocessor to recognize and respond to a "HOLD" request during reset of the CPU.

The present invention implements a 80386 microprocessor with a unique and novel arbitration circuit which overcomes specific short-comings of the new processor without the necessity for a modification to the microprocessor itself. In the preferred embodiment, of the present invention disclosed herein, is an arbitration circuit which permits one to implement the 80386 microprocessor in a manner which achieves compatibility with the 80286 microprocessor in the real and the protected operating modes.

In accordance with the present invention an arbitration circuit consisting of a flip-flop is implemented to permit the system refresh and DMA operations to operate properly during system reset. In the preferred embodiment, a flip-flop serves as an arbitration between the HOLD and RESET lines to prevent these signals from occurring at the same time. This arbitration circuit causes a RESET signal to wait until after any pending HOLD is serviced or causes the HOLD signal to wait until after the RESET is complete depending on which of the two signals occurred first.

In accordance with the present invention, the implementation of the arbitration circuit into the personal computer permits the microprocessor to operate in the extended address space of the microprocessor while the processor is in the protected mode. Return from the protected mode by the processor to the real mode is accomplished by resetting the processor without upsetting the state of the rest of the machine. In the event a HOLD request is received by the machine during the CPU RESET, the arbitration circuit and logic of the present invention retains the HOLD request until the RESET has been completed. Conversely if a HOLD request is being processed when a CPU RESET is received, the arbitration circuit and logic of the present invention retains the RESET request until the hold has been completed.

It is an object of the present invention to implement the invention in hardware, software or any combination thereof. It is a further object of the present invention to achieve the compatibility with the 80286 microprocessor by implementing a means to permit the CPU to RESET without losing a HOLD request and to permit the CPU to process a HOLD request without losing a RESET request. The implementation presented herein is made without affecting the design of the microprocessor itself

BRIEF DESCRIPTION OF THE DRAWINGS

For a fuller understanding of the present invention, reference should be had to the following detailed description of the preferred embodiment of the invention taken in conjunction with the accompanying drawings in which:

FIG. 4 is a simplified schematic illustrating the basic logic steps employed to implement the microprocessor speed control.

FIG. 8 is a block diagram of the functions included on the system board.

Similar reference numerals refer to similar parts throughout the several views of the drawings.

DETAILED DESCRIPTION OF THE PREFERRED EMBODIMENT OF THE INVENTION

Figure 1:
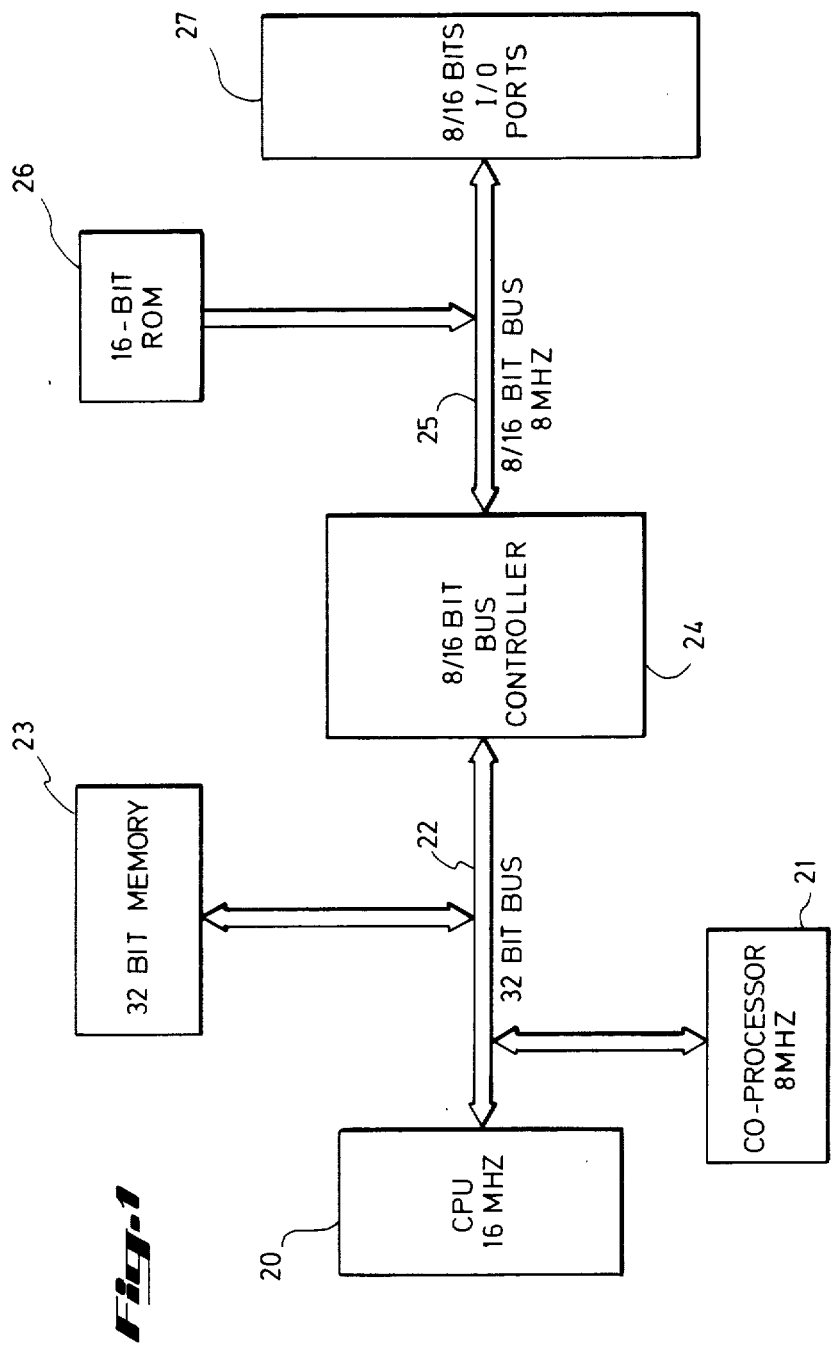
FIG. 1 is a functional block diagram of the architecture of the present invention.

Through the following detailed description of the preferred embodiment of the present invention, and shown in the accompanying drawings, the following notation has been adopted for indicating signals. Since the terms "1" and "0" and "true" and "false" can be ambiguous, their use is avoided. In their place the terms "logic high" (H) and "logic low" (L), in association with "active" and "inactive" states for how the signals have been used. An asterisk (*) following a signal name indicates that the signal is "active" when low. For example, the HOLD request signal to the microprocessor is designated HRQ* and is active when at a logic low state, while the REFRESH signal designated as REFRS and is active when in a logic high state. The signals are "inactive" when in the logic state opposite to its "active" logic state. In our example, HRQ* is inactive when in the logic high state, and the signal REFRS is inactive when in the logic low state.

Certain logic circuit functions of the preferred embodiment of the present invention have been constructed using Programmable Array Logic (PAL) chips in implementing the combinational logic required to combine certain ones of the logic signals to obtain additional logic signals. For such devices and where necessary to practice the present invention, the combinational logic circuits implemented with the PAL chips are neither shown in the drawings or discussed in the specifications; however, the logic design data for producing each PAL chip contained in the invention and illustrated in the drawings is provided in this specification as an appendix. The PAL design data presents the logic equations for combining the input signals to produce the output signals indicated in the drawings. For these design equations and the type of PAL chip to be programmed, it is possible to produce the particular chip using standard manufacturing techniques suggested by the PAL chip manufacturer.

A speed control feature of the present invention has been implemented in the preferred embodiment to provide compatibility with a number of software products that contain programs dependent on certain system speeds. Typically, these programs contain timing idiosyncrasies associated with diskette copy protection mechanisms. The system speed control hardware in the preferred embodiment can also automatically detect the occurrence of timing-dependent programs and thereby adjust the overall program execution speed to simulate a system speed compatible with the copy protection mechanisms. The speed control function described herein is also useful for adjusting the personal computer program execution speed to handle action software games written for 8088-based personal computers. Reduction of the system speed to simulate the system speed of an 8088-based personal computer allows these games to be played at a realistic speed.

The simulated system speed control is accomplished by reducing the system bus bandwidth using extended REFRESH cycles. Since the CPU is in a HOLD state during REFRESH cycles, the apparent execution speed of programs is reduced as the length of the REFRESH cycles are increased. The lengthening of the REFRESH cycles, however, has been carefully implemented so as not to reduce the DMA latency period that would be present during REFRESH cycles of normal length. A DMA request for access to the bus cycle is granted access to the bus immediately, since the CPU is already in the HOLD state. The amount of time added to the normal REFRESH cycle period is determined by the length of a one-shot time period output by one of the Intel 8254 timers in the system.

A RESET/HOLD arbitration circuit has been implemented in the preferred embodiment of the present invention by adding a flip-flop arbitration circuit to the HOLD and RESET lines to prevent these signals from occurring simultaneously. This arbitration circuit causes a RESET signal to wait until after any pending HOLD request is serviced or causes the HOLD signal to wait until after the RESET is completed, depending on which signal is received first at the input to the arbitration flip-flop.

The implementation of the RESET/HOLD arbitration circuit in a personal computer with an 80386 microprocessor restores compatibility to application programs, written for an 80286 microprocessor, which utilized the extended address space of the microprocessor in what is called the "protected" mode. Application programs which used the extended address space of the microprocessor in the "protected" mode can only return to the "real" mode by resetting the microprocessor. The RESET of the microprocessor in the 80286 chip was accomplished by a feature which allowed the CPU RESET without upsetting the state of the rest of the machine. Upon RESET of the microprocessor the processor returned to the "real" mode.

The chip designers of the 80386 eliminated the processor's ability to recognize and respond to a "HOLD" request from external hardware even during the processor RESET. The HOLD state is used for system REFRESH of Dynamic Random Access Memory (DRAM) and for Direct Memory Access (DMA). Thus these operations, DRAM REFRESH and DMA, cannot occur during RESET of the 80386 processor. Since third party application programs were written with these processor features in mind (i.e., DRAM REFRESH and DMA), during processor reset, the 80386 microprocessor which eliminated these features was incompatible with pre-existing programs.

The arbitration circuit implemented in the preferred embodiment of the invention permits the DRAM REFRESH and DMA operations to properly operate during processor reset. Thus compatibility with third party software which implemented these features is assured with the 80386 microprocessor.

A dual mapping BIOS function is implemented in the preferred embodiment by using some of the high performance Random Access Memory (RAM) to hold the BIOS stored in ROM. Utilization of the RAM to store the BIOS improves the performance of the 80386 microprocessor since the microprocessor accesses a 32-bit memory (RAM) instead of the 16-bit memory (ROM). In prior art personal computers software (BIOS) has been contained in ROM connected to the microprocessor at the microprocessor's normal data size, i.e., 8-bit ROM for 8-bit processor such as the 8088 and two 8-bit ROMs for the 16-bit microprocessor such as the 8086 and 80286 processors. These 8 and 16-bit ROMs were fast enough in access time to meet the requirements of the prior art processors so the ROM's did not affect system performance to any degree.

With the development of the 32-bit 80386 microprocessor the standard 8 and 16-bit ROMs were too slow to keep up with the microprocessor. The addition of two more ROM devices (to achieve a 32-bit bus width) presents an undesirable cost penalty, however, a 16-bit ROM on a slower 16-bit bus materially affects the speed advantage of a 32-bit microprocessor.

Implementation of a dual mapped BIOS provides a 32-bit RAM memory for the BIOS at no significant cost penalty since the 16-bit ROMs are not replaced. Use of 32-bit RAM can be fully cost justified since the RAM subsystem necessary for a 32-bit processor required a minimum of 1024 kilobytes. Since a majority of the applications software can only utilize 640 kilobytes of RAM, 384 kilobytes of high performance RAM was available for use by the BIOS.

To achieve compatibility with prior art machines, the BIOS code has to remain at its original address and must be protected from an inadvertent write-over.

The dual mapped BIOS has been implemented in the preferred embodiment by adding decoding logic to the RAM subsystem to allow the system to respond to the ROM addresses. The decoding logic operates through a writable control port which switches the system from operation out of the 16-bit ROM to operation out of the RAM.

Implementation in the preferred embodiment is accomplished in the following sequence:

(1) Computer power up;
(2) Execution of BIOS stored in ROM begins;
(3) Part of RAM system is tested;
(4) BIOS copied from ROM to RAM which has been tested;
(5) Control bit written by ROM code causing BIOS restored in RAM to continue start-up of machine;
(6) BIOS stored in RAM is write protected;
(7) Machine boot-up and continues operation out of RAM.

Turning now to the Figures, and first to FIG. 1, there is shown a functional block diagram of a personal computer in accordance with the present invention. The personal computer is designed around the central processing unit (CPU) comprised of microprocessor (CPU) 20 and co-processor 21 (hereafter sometimes referred to as numeric processor). For the preferred embodiment of the present invention, microprocessor 20 is an Intel Corporation 80386 microprocessor and the numeric co-processor 21 is an Intel Corporation 80287 microprocessor. It is also possible to substitute the 80287 microprocessor with an Intel 80387 microprocessor when those microprocessors become commercially available.

Processor 20 and co-processor 21 are functionally connected to a 32-bit data bus 22. A 32-bit Random Access Memory (RAM) 23 is also connected to the 32-bit data bus. In order to permit the 32-bit processor 20 and co-processor 21 to function with the older generation products consisting of 8-bit and 16-bit input and output devices a bus controller 24 is provided between the 8/16-bit bus 25 and the 32-bit bus 22. The bus controller 24 re-structures data from 8-bit and 16-bit devices into a data string which can be accepted and used by the 32-bit devices attached to the 32-bit bus 22.

The bus cotroller 24 likewise re-formats the 32-bit data in a format which can be accepted and used by the 8 and 16-bit devices attached to the 8/16-bit bus 25.

As is further shown in FIG. 1, a 16-bit Read Only Memory (ROM) 26 is functionally connected to 8/16-bit bus 25. The ROM 26 is used to store the Basic Input-/Output System (BIOS). A copy of the BIOS is transferred to RAM after the computer power is turned on and a partial RAM system test is completed.

Also illustrated in FIG. 1 are the 8/16-bit input/output device ports which are functionally connected to the 8/16-bit bus 25. Data transferred from the 8 and 16 bit input/output devices to the 32-bit RAM 23 is re-structured by the bus controller 24 before being stored in the 32-bit RAM.

Intel Corporation has published documentation for its 80386 and 80287 processors. This documentation is essential to an understanding of the operation of Intel's processors. Instruction sets and the information provided in Intel's manuals is presumed to be firmly understood by anyone attempting to practice this invention.

The preferred embodiment of personal computer which implements this invention contains at least the following hardware:

(a) 80386 microprocessor;
(b) 32 MHz clock for the 80386 microprocessor;
(c) A 4 MHz or 8 MHz clock for a co-processor;
(d) An 8 MHz expansion bus compatible with an 80286 processor;
(e) A 4 MHz clock for the DMA subsystem
(f) Random Access Memory;
(g) Read Only Memory; and
(h) Input/output device slots.

It is to be understood that the above listing of hardware requirements is not intended to limit the scope of the invention but rather to describe the preferred embodiment.

The various clock rates referred to in the schematics are CLK 16, CLK 24 and OSC. The system clocks are separated into three sections. One is the CPU clock (32 MHz) for the 80386 and its associated circuits. Another is the 24 MHz clock which is used for the numeric co-processor. The third is the 14.31818 MHz clock which provides software compatible system timing functions, a fixed frequency signal on the expansion bus, and the 8042 keyboard processor clock reference.

The CLK 32 signal is clock for the 80386 processor (CPU). The CPU clock is provided by a crystal oscillator, CMOS buffer IC (74HC125), and an F74 flip-flop. There are three outputs from these circuits, a 32 MHz processor clock, a 16 MHz reference clock (CLK16*) (which has the same phase as the internal CPU clock), and a reset signal which meets the setup and hold time requirements for the 80386. The CPU reset is always adjusted to the 16 MHz clock so that the phase is properly matched to the CPU.

The 32 MHz clock and the CLK16* signal are provided to the 32-bit memory board for use in state machines synchronized in the CPU.

The signal BCLK is a (approximately) divide by two from CLK16*. This division takes place in the sub-state machine PAL D4-STAT where the clock is also resynchronized to the CPU on each bus cycle. It is this adjusting that leads to the "approximately" part of the divide by two functions. The average frequency will be somewhat less than 8 MHz. Transitions of BCLK occur on rising edges of CLK16*.

The clock for the DMA subsystem is generated from the rising edge of the BCLK clock by toggling a 74LS74 flip-flop. The outputs (DCLK, DCLK*) will therefore have a frequency of one half that of BCLK.

The CLK 24 signal is the clock for the 80287 co-processor.

The clock source for the 80287 is developed from a 24 MHz crystal oscillator. The 24 MHz frequency (CLK 24) is divided down in single 74HC109 to provide either 12 MHz or 8 MHz for use by the numeric co-processor (80287). The 12 MHz frequency is divided again inside an 80287 -3 to provide a 4 MHz operating frequency. The 8 MHz has the required 33% duty cycle for direct use by an 80287 -8 giving an operating frequency of 8 MHz. The choice of frequencies is provided by switch SW1-3. Switch OFF selects 8 MHz (80287 -8), switch ON selects 4 MHz (80287-3).

System bus compatibility is provided by clock rate OSC. The specific time dependent clocks in the system are generated by a crystal oscillator at a frequency of 14.31818 MHz which generates the signal OSC.

The OSC signal is provided to the system bus for compatibility with older generation computer products. The OSC signal is also divided by two by the PCLK flip-flop to provide a stable and unchanging frequency source (7.1591 MHz) to the keyboard processor (8042). The PCLK signal is in turn divided by six to provide a timing reference for the system timer (TIMCLK). This frequency is 1.19318 MHz and is compatible with the previous products for timing and speaker purposes.

The divide by six is done with a synchronous counter which cycles though the counts of 1 through 6 and back again. The counter is not specifically set on power-up but will always cycle into the legal count sequence within seven clocks.

The microprocessor addresses and data handling are generally handled in the manner set forth below. Typically the processor begins a bus cycle by placing an address and status on its bus. This address will usually come out even while the previous cycle is still in progress. Since most devices expect to see a valid address for the duration of a bus cycle, it is necessary to latch the address seen by the system bus. Some devices (notably high speed memory) are already short on time to perform their function therefore they overlap some of their operations with others, (i.e., address decode). To allow this, the system bus also provides a set of address lines LA<23:17> which are not latched but which can provide a greater setup time to perform decoding. The typical usage of these lines is address decoding whenever the address changes, and then latch the decoded outputs.

To provide the unlatched addresses, the board contains buffer ICs which are connected to the CPU's PA<23:17> address lines and provide LA<23:17> (see FIG. 8) as an output.

To provide the latched addresses, the board contains latched ICs which are connected the to CpU's PA<19:2> and provide SA<19:2> as an output. These latches are of the fallthrough type so that when the Address Latch Enable signal (ALE) goes active the address appears at the output. When ALE goes inactive, the addresses will stay on the outputs until the next bus cycle begins.

The address lines SA0 and SA1 are handled differently. The CPU indicates which bytes are to be accessed out of the 32-bit word by the status lines BE3* to BE0* or Bus Enable three through zero. The output of this state machine are the address lines SA0, SA1 and BHE*.

The signal BHE* is used on the system bus to indicate that the high half of the 16-bit data bus contains valid data.

These signals (SA0, SA1 and BHE*) are changed at the rising edge of ALE so that their timing is very similar to the other SA<19:2> address lines.

All of the address outputs listed above are disabled when the CPU responds to a HOLD request (BHLDA) so that another device can control the address bus. When this occurs, the address lines are fed back to the CPU bus (PA<23:2>> and BE<3:0>) so that the 32-bit memory board can receive the address data from the other device. The feed back operation occurs from the SA<16:0> and the LA<23:17> lines through buffers and a PAL (D4-SADI) for SA0, SA1 and BHE*.

CPU address line PA20 is handled a little differently. Because of software compatibility considerations (with 8088 products) it is sometimes necessary to restrict program access to the bottom megabyte of memory. This is done by disconnecting the PA20 line from the bus and forcing a low in its place (by means of a 74F257). This is controlled by the line LOWA20 from the keyboard controller. To equalize the delay with the other address lines, the output of the 74F257 is used to directly drive the LA20 line instead of being buffered again by a 74LS245.

The CPU data bus is buffered from the rest of the system by four bi-directional buffer ICs and four latches. On the CPU side of the bus, the 80386 and 80287 are connected together. Four ICs buffer the separate bytes of the data bus. The latches are used to hold read data for the CPU during separate read cycles on the system bus when the CPU attempts to read more data than the system bus allows.

The data path also contains a bi-directional buffer between the high and low half of the bus to enable routing of the data from high half to low during high writes and routing of the data from low to high half during high reads of the 8-bit bus. This function is controlled by the CPYEN* and CPYHL* lines. CPYEN* enables the buffer, CPYHL* controls the direction according to the type of cycle (active for CPU writes or DMA reads).

The last item in the data path is a buffer for the processor board I/O devices. This buffer is normally active in the "TO" direction to the I/O devices and switches to the "FROM" direction when an I/O read occurs to these devices (controlled by CIORD*). This buffer is disabled when DMA operations occur to allow the bus to be used by the DMA controllers for address latching.

The SA1 and SA0 lines are positive true and BHE* is negative true. The BENx* lines enable the data buffers to the bus and the latching function from the bus, they are negative true. The CPYEN* line enables the copy buffer from the SD<7:0> to SD<15:8>, the CPYHL* lines is also enabled when reading (high to low copy). The LAST CYCLE term is used to indicate the last cycle in a group of cycles from one CPU status, it tells the state machine to send the CPU the READY* signal.

If the CPU status indicates more than one bus cycle will be required for a single CPU access, then the bus state machine will run the necessary number of bus cycles to complete the CPU access. For example, if the CPU status indicates a double word memory read from the 8-bit bus, then the total cycles for the access would be 4*12=48, 62.5 nsec cycles (assuming normal cycles).

In the preferred embodiment the CPU is normally held in the NOT READY state. READY* only goes active (low) when a cycle is guaranteed to be finished. The CPU next address (NA*) line is normally inactive, requiring the logic to specifically tell the CPU when to send the next address.

The cycle begins when the 80386 activates ADS* and presents the status lines. The address is decoded by the 32-bit memory board (if present) and the signal M32* is produced. The system board decodes the status lines to determine if the cycle is a valid memory cycle, producing the signal MEM*. M32* and MEM* are then combined to the signal MEM32* which is latched by the rising edge of CLK32 (the CPU clock) at the beginning of phase one in the CPU cycle following ADS* going active. If the end result of this is NOT a valid 32-bit memory cycles, the signal MYCYC* goes active.

MYCYC* is then sampled by the D4-STAT PAL on the rising edge of CLK16* (the bus clock). Unless otherwise noted all clocks referred to are CLK16* clocks. When the PAL clocks in MYCYC* it generates the signal ALE*. The PAL code is set up to allow ALE* to be active only for a signal cycle. What follows next is the propagation of the ALE* pulse through a series of flip-flops arranged in a configurable shift register. The general method is to bypass parts of the shift register to shorten the total bus cycle time depending on the type of bus cycle to be executed.

The rising edge of ALE latches the address and status for later use and does the SA1, SA0, BHE* generation. This signal BCLK will be forced to a low during ALE by the D4-STAT PAL to insure the compatibility with previous products.

The next stage is T00. It is always generated. If the command being generated is a 16-bit memory command, as signified by LM-IO and M16*, then the signal CMD* will also be set active at this time. CMD* is combined with the decoded status to generate the signal MRDC* or MWTC*. If this is the last cycle in a set, (either guaranteed by the state or because the bus size is known by M16* and a memory cycle) then the D4-SADO PAL will set the signal CLSTD* active at this time.

The next stage is T01. It is always generated. If the command being generated is not a 16-bit memory command, as signified by LM-IO and M16*, then the signal CMD* will also be set active at time time. CMD* is combined with the decoded status to generate the signal IORC*, IOWC* or INTA*. If this is the last cycle in a set, (because the bus size is known by IO16* and an I/O cycle) then the D4-SADO PAL will set the signal CLSTD* active at the time. If this is 16-bit memory cycle, and the NOWS* signal was received during T00 (LNOWS* active), then the signal BRDY* will be generated next to terminate the cycle and no other stages will be activated.

The next stage is T10. It is always generated. If the cycle is a 16-bit memory cycle, then the T40 stage will also be activated at this time. In this case, the T10 and T11 states will be ignored for the remainder of the 16-bit memory cycle.

The next stage is T11. It will always be generated. If the cycle is a 16-bit I/O cycle, then T41 will also occur at the same time as T11. If this is an 8-bit cycle, and the NOWS* signal was received earlier (LNOWS* active), then the signal BRDY* will be generated next to terminate the cycle and no other stages will be activated. Otherwise, stages T20, T21, T30 and T31 will follow if the cycle is an 8-bit bus cycle as signalled by CX16* inactive.

The next stage is T40. This stage is entered either from T31 during an 8-bit cycle, or T01 if a 16-bit memory cycle or a cycle that does not depend on the CX16* status occurs. This stage is skipped if the LNOWS* line is found active.

The next stage is T41. This is entered only from T40 (the normal case) or T10 (if a 16-bit I/O cycle is in progress). If the signal WAIT* is active at the end of T41, then T41 will be restarted, holding the bus in a wait state. Since the WAIT* signal is developed by sampling the BUSRDY* going high only every BCLK rising edge, wait states will come in increments of two clock cycles. When WAIT* goes inactive, the signal BRDY* will be generated to terminate the cycle.

At the same time as the cycle is being terminated (BRDY* is set active) several things can occur. If this is not the last cycle in the set (CLAST* inactive), then TS0* is set active by the D4-STAT PAL to start another cycle. If this is the last cycle in the set (CLAST* active) and another cycle is pending (MYCYC* is active), then TS0* is set active by the D4-STAT PAL to start another cycle. If no more cycles are to be run for the moment, then the bus state machine will remain idle waiting for another cycle.

TS0* is used to provide an adequate address setup between cycles in a group or between groups when the CPU pipelines the next cycle. After TS0* the ALE state will be entered for the next cycle.

The signal CMD* (which is used to enable on of MRDC*, MWTC*, IORC*, IOWC* or INTA*) is started at the beginning of T00 or T01 as discussed above. It will end at the end of the basic bus cycle (when BRDY* or TS0 goes active).

The signal WDEN* is used for enabling the various data buffers during write cycles. It goes active at the same time as ALE and goes inactive one cycle after CMD* goes inactive. In the case of back to back cycles, WDEN* will therefor remain active until after the last CMD*.

The signal BRDY* from the D4-STAT PAL signals the end of a set of bus cycles to the CPU. The signal CLSTD* (which goes active for one CLK16* cycle to indicate that the last cycle of a set is in progress) also generates the CLAST* signal internal to the D4-SADO PAL. CLAST* is used by the D4-SADO PAL to do the conversion from BE<3:0> to SA1, SA0 and BHE*. CLAST* is also used to tell the state machine that no more cycles are in the set. At the rising edge of ALE, CLAST* is set to the inactive state in preparation for the next CPU access.

The signal CLSTD* is also used to generate NAB* (next address from bus) which signals the CPU that it is all right to put a new address and status onto the CPU bus. Since NAB* is sampled at the beginning of phase two of a CPU clock cycles, it is synchronized to the rising edge of CLK32 at the rising edge of CLK16* by a F175 flip-flop. This assures a setup time to the CPU for NA*.

The signal CX16* is used to signal the presence of a 16-bit memory or I/O cycle. It is set active during T00 for memory cycles if M16* is active. It is also set active during T10 for I/O cycles if I016* is active. It is set inactive at ALE in preparation for the next cycle. This signal is used to control the bus address conversion for the 8 or 16-bit bus and to adjust the timing of the expansion bus for 16-bit operations.

The signal LOE* (latch output enable) is generated during read cycles from the 8/16 bus to enable the data stored in the data latches to the CPU data bus. LOED* is first set active during ALE in the D4-SMSC PAL and is set inactive as soon as the signal BRDY* is active. LOED* is then clocked through to LOE* by the rising edge of CLK32 at the rising edge of CLK16* in a 74F175. When LOE* goes inactive, it buffers before the CPU may begin driving the bus again.

The BUSRDY signal is used to add additional wait signals to a bus cycle. If a 16-bit device wants to add an additional wait state, then it must pull the BUSRDY low (inactive) by the end of the third CLK16 cycle after the falling edge of ALE. To add only one wait state, BUSRDY must return to the high state during the fourth CLK16 cycle after the falling edge of ALE. If an 8-bit device wants to add an additional wait state, then it must pull the BUSRDY low (inactive) by the end of the ninth CLK16 cycle after the falling edge of ALE. To add only one wait state, BUSRDY must return to the high state during the tenth CLK16 cycle after the falling edge of ALE. The decode logic to drive BUSRDY should use the device address and MRDC*, MWTC*, IORC* or IOWC* as inputs. Synchronous peripherals usually use the falling edge of BCLK as the time to change the state of BUSRDY.

The NOWS* signal is used to shorten the standard bus cycle. If a 16-bit memory device is to prevent the standard wait state then it must pull the NOWS* line low (active) within one CLK16 time from the falling edge of ALE. (Note that this is not possible on 16-bit I/O cycles because it is not known that an I/O cycle exists until the required time). If an 8-bit device is to prevent the standard wait states then it must pull the NOWS* line low (active) within two CLK16 times from the falling edge of the command. The decode logic to drive NOWS* should use the device address and MRDC*, MWTC*, IORC* or IOWC* as inputs. If less than the four standard wait states normally used on 8-bit bus cycles is desired, then the NOWS* line can be used to provide 1, 2, or 3 wait states by delaying the activation of NOWS*. The NOWS* line is sampled at approximately the falling edge of BCLK.

The M16* signal is used to indicate that the current address on the LA<23:17> line is covered by a 16-bit memory peripheral. The system board will only use this signal if the current cycle is a memory cycle. The addressed peripheral on the bus must pull the M16* line low as soon as the address is decoded and hold it low until the address becomes invalid. The M16* line must be correct before ALE goes away to insure that it is latched by the system board latch. Pulling this line low prevents the 16-bit to 8-bit bus conversion logic from being activated.

The I016* signal is used to indicate that the current address on the SA<9:0>lines is covered by a 16-bit I/O peripheral. The system board will only use this signal if the current cycle is an I/O cycle. The peripheral addressed on the bus must pull the I016* line low as soon as the address is decoded and hold it low until the address becomes invalid. The I016* line must be correct by the second CLK16 cycle after ALE goes away to insure that it is latched by the system board latch. Pulling this line low prevents the 16-bit to 8-bit bus conversion logic from being activated.

The signals SMRDC* and SMWTC* are used by the 8-bit bus only. These memory signals are only enabled when the lower one megabyte of memory is addressed. They are developed from the regular MRDC* and MWTC* signals by enabling a set of tri-state buffers with the signal LOWEN*. This signal is developed by the D4-SROM PAL from the address information on the system bus. The PAL also includes the latching function required to hold the address through the entire cycle and the refresh function for any dynamic memory on the original 8-bit bus.

The processor board of the preferred embodiment (also referred to as a mother board) contains logic to generate other types of bus cycles.

The following description for miscellaneous subsystems of the preferred embodiment are set forth below:
(1) Expansion bus definition;
(2) Bus timing information for expansion bus;
(3) 32-bit expansion bus definition;
(4) Bus timing information for 32-bit expansion bus;
(5) Page mode dynamic RAM board;
(6) Address decoding;
(7) Jumper setting;
(8) Bits presented by option board;
(9) Detailed cycle description; and
(10) Timing analysis for page DRAM board.

Figure 2:
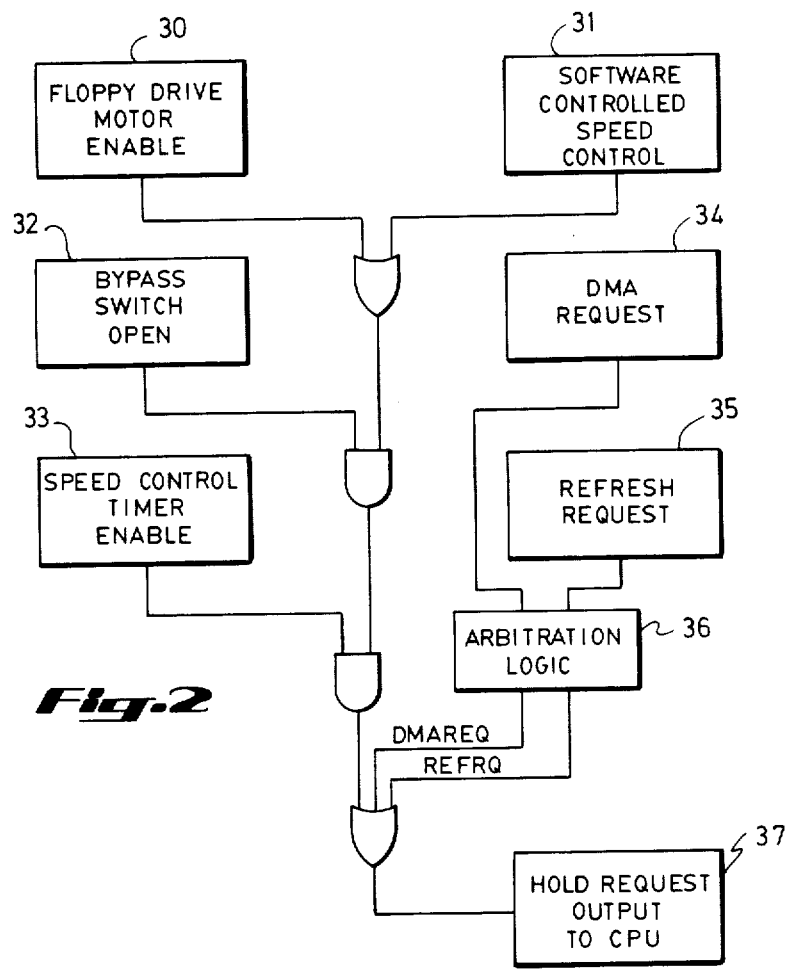
FIG. 2 is a simplified logic diagram illustrating the logic sequence employed in the microprocessor speed adjustment invention.

Turning now to FIG. 2 a simplified logic diagram illustrates the system components of the speed control device and the arbitration logic.

The Speed control of the microprocessor can be initiated by either the floppy drive motor spin-up or enable 30 or the speed control software 31. The computer operator interacts with the computer through a utility program to set the speed of the microprocessor. This action by an operator is represented in FIG. 2 by block 31.

As illustrated in FIG. 2 the floppy drive enable 30 is logically OR'ed with the software controlled speed control 31 and logically AND'ed with the speed control bypass switch 32. In the event the bypass switch 32 is closed the speed control mechanism is inoperative. The speed control command is then logically AND'ed with the speed control timer 33, therefore, the CPU HOLD output to the CPU remains active for as long as the timer remains active.

The speed control command is logically OR'ed with the arbitrated output of the arbitration logic of the DMA request 34 and the REFRESH request 35.

THE DMA request/REFRESH request is arbitrated by arbitrator logic 36 to prevent both a DMA and REFRESH request from occurring simultaneously.

The HOLD request 37 to the CPU can be generated by either the REFRESH request, DMA request or the speed control logic. As will be described infra these holds cannot occur simultaneously because of the logic which controls each function.

The speed control is initiated by the following four CPU instructions:
(1) MOV AL, 92H
(2) OUT 4BH, AL
(3) MOV AL, XX
(4) OUT 4AH, AL Instructions 1 and 2 above essentially disable the component 8254. "XX" in instruction 3 above is a number from 2 to 38 hex. The one-shot time delay set in the speed control timer is set by instruction 4. Address 4AH in instruction 4 above represents that timer 2 is to be set to the value in register AL. Address 4BH in instruction 2 is the control word register.

The speed adjustment software controls the setting of the one-shot timer. The source code listing of this utility program is set forth in Appendices N and O attached hereto and incorporated by reference as if set forth herein in full.

Utilizing the utility programs set forth in Appendices N and O the operator of the machine selects a time delay setting by selecting one of the arbitrary designations set forth below:
COMMON
FAST
HIGH or by selecting a speed setting from 1 to 50 where the setting "1" corresponds to the slowest machine speed which can be simulated by this microprocessor and "50" corresponds to the highest speed which can be simulated by this microprocessor.

It should be noted that the designation "COMMON" will simulate a microprocessor speed equivalent to an 80286 microprocessor operating at a 6 MHz clock rate; the designation "FAST" will simulate a microprocessor speed equivalent to an 80286 microprocessor operating at an 8 MHz clock rate; the designation "HIGH" will simulate the microrocessor speed of an 80386 microprocessor operating at the 16 MHz clock rate; full speed of an 80386 microprocessor.

The arbitrary speed designation of "3" on a scale of 1 to 50 corresponds to the simulated speed of an 8088 microprocessor and the arbitrary speed designation of "50" on a sale of 1 to 50 corresponds to the designation "HIGH" described above.

The KSUBS source code attached hereto as Appendix N sets the one-shot timer by setting register AL to the required hexidecimal value which corresponds to an operator's selection of either a value of "COMMON, "FAST" or "HIGH" or by an operator's selection of a decimal number in the range of 1–50.

The timer source code attached hereto as Appendix O sets the one-shot timer by setting register AL to a hexidecimal value corresponding to the "FAST" mode whenever the floppy drive motor is enabled. Enabling the floppy drive motor reduces the apparent microprocessor speed since most floppy drive operations indicate either a transfer of data from a copy-protected diskette or other diskette operation which cannot be performed at the full 80386 processor speed.

Figure 3:
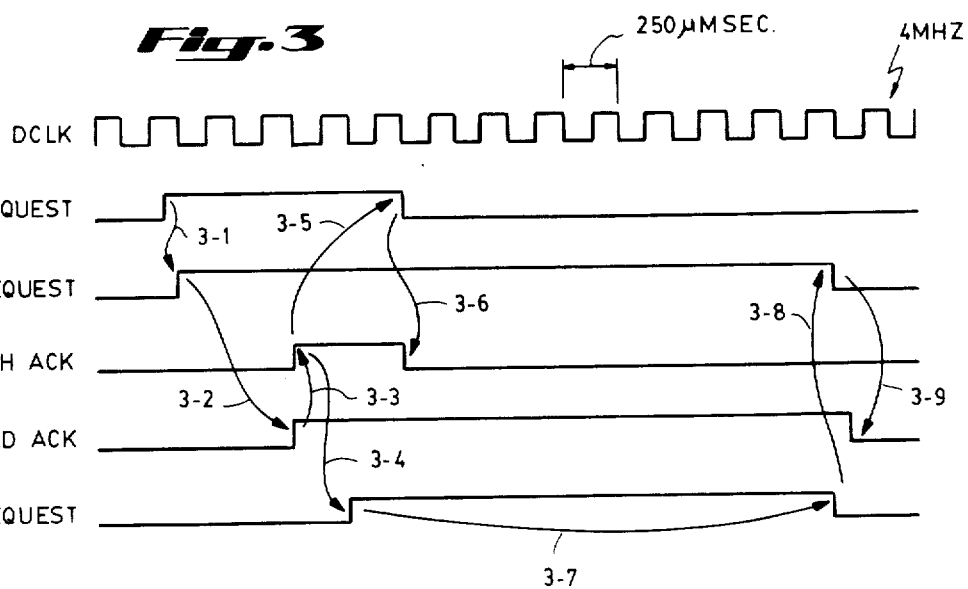
FIG. 3 is a timing diagram for various signals of the microprocessor speed control logic and the HOLD request and RESET request signals which occur during different cycle operations.

Turning now to FIG. 3 and FIG. 4 the following sequence is illustrated in FIG. 3 (timing diagram) (the numbers in the description below corresponding to the numbers on the timing arrows shown in FIG. 3):

A 4 MHz clock rate is illustrated as "DCLK". Each square wave represents 250 microseconds.

3-1: The REFRESH request occurs once every 15 microseconds. This request is arbitrated with the Direct Memory Access (DMA) request to prevent simultaneous requests. The REFRESH request is then logically OR'ed with the other request sources to generate the CPU "HOLD" request.

3-2: Sometime after the HOLD request is generated and after the current CPU bus cycles have been completed (approximately 215 nanoseconds to 12 microseconds later) the CPU will stop executing the program and grant the HOLD acknowledge (ACK).

3-3: The HOLD ACK is logically gated with the arbitrated REFRESH request to form the REFRESH acknowledge (ACK) signal to the REFRESH controller.

3-4: The REFRESH ACK signal triggers the digital one-shot (Intel 8254 or similar logic device) which in turn sets the STOP request signal active. Since the REFRESH request is still present (high), there is no change in the CPU state.

3-5: The REFRESH controller executes the REFRESH cycle on the system bus and then releases the REFRESH request. This typically takes approximately 500 nanoseconds.

3-6: Release of the REFRESH request also releases the REFRESH ACK signal and ends the REFRESH portion of the cycle. (If the STOP request is NOT present, then the HOLD request is released and the CPU begins executing again.

3-7: During the duration of the one-shot timeout, the STOP request remains active and the CPU cannot run bus cycles (i.e., execute code). This timeout value is variable from 0 duration (e.g., CPU begins executing immediately after REFRESH, equivalent to full speed microprocessor cycle) through 15 microseconds where the CPU never gets a chance to execute because another REFRESH and STOP cycle will begin as soon as the last cycle is completed (e.g., microprocessor fully stopped). Choosing values between 0 and 15 microseconds will result in apparent speed changes of the CPU from full speed to the speed of previous generation microprocessors. If the time delay value for the one-shot timer is less than 15 microseconds the STOP request will be dropped when the one-shot times out.

3-8: Release of the STOP request causes the HOLD request to be dropped.

3-9: The CPU responds by dropping the HOLD ACK. The CPU begins executing the program again (i.e., executing code or program steps).

3-10: 15 microseconds from the original REFRESH request, the next REFRESH request will arrive and the cycle will repeat itself.

The DMA (Direct Memory Access) subsystem is not impeded from normal operation during the time the CPU is stopped to permit the simulation of a slower CPU. Devices using the DMA subsystem are therefore independent of the simulated speed of the CPU.

The use of the microprocessor HOLD or STOP permits time dependent operations to be handled by the 32-bit microprocessor which is operating at a constant clock rate, in this case 16 MHz, without slowing the microprocessor down to a slower clock rate. The use of a slower clock rate has been previously suggested however this method of operating is not acceptable in an 80386 environment because it has the effect of slowing down all operations, not just those which are time dependent. Thus in the typical application the microprocessor is placed on HOLD only for so long as necessary to simulate the microprocessor speed which is selected by an operator or the speed which is necessary to perform time dependent functions.

Alternatively, the operation of the microprocessor can be placed in a deliberately slow mode by causing the one-shot timer to be re-initiated as soon as it is released. This is accomplished in software and is initiated by the operator calling up a "Mode Speed" subroutine. The "Mode Speed" source code is provided in Appendix N as "KSUBS". Once the subroutine is called up the operator selects a speed ranging from 1 to 50, or in the alternative specific speed designations which have been arbitrarily set. In this case the following speeds have been arbitrarily set which correspond to the speeds indicated below:

COMMON—Approximately equivalent to a speed setting of an 80286 microprocessor operating at clock rate of 6 MHz FAST—Approximately equivalent to a speed setting of an 80286 microprocessor operating at a clock rate of 8 MHz HIGH—Approximately equivalent to a speed setting of an 80386 microprocessor operating at a clock rate of 16 MHz The manual setting of the speed as described above permits the operator of the computer to play time dependent games and also to execute time dependent programs without losing the benefit of having a 32-bit microprocessor operating at a clock rate of 16 MHz.

EXAMPLE 1

The following example illustrates the approximate microprocessor speed which is simulated when the one-shot timer time delay is set at 2 microseconds:

$$\frac{1 - \frac{(0.5 + 2)}{15}}{1 - \frac{0.5}{15}} = 86\%$$

where the denominator of the above equation sets forth the normal system speed with the microprocessor operating at full system speed, i.e., the 16 MHz clock rate, and the numerator of the above equation is the effect of the slow-down on the system speed.

In the above equation normal system speed is designated by unity and the two microsecond one-shot timer setting is entered in the numerator of the equation.

The system speed which is simulated is 86% of the full 80386 microprocessor operating at the 16 MHz clock rate.

Referring now to FIG. 4 a simplified schematic of the arbitration logic and speed control logic is illustrated. The CPU HOLD request can be generated by either the arbitrated REFRESH request, the arbitrated DMA system request or the system speed control.

The system speed control is initiated by software and occurs by either a manually initiated speed selection 31 or by operation of the floppy diskette drive 30.

As illustrated in FIG. 4 the speed control is logically AND'ed with the one-shot to generate the CPU HOLD. The implementation of the one-shot provides the time delay necessary to stop the CPU for a specified time to "simulate" a microprocessor speed below that which corresponds to an 80386 microprocessor. The longer the time delay of the one-shot the slower the CPU "appears" to operate. The CPU speed is not reduced but rather only "appears to be reduced" since the CPU clock rate is not reduced but rather the CPU is stopped and started thereby generating an average CPU time which "appears" to be slower.

Figure 5A:
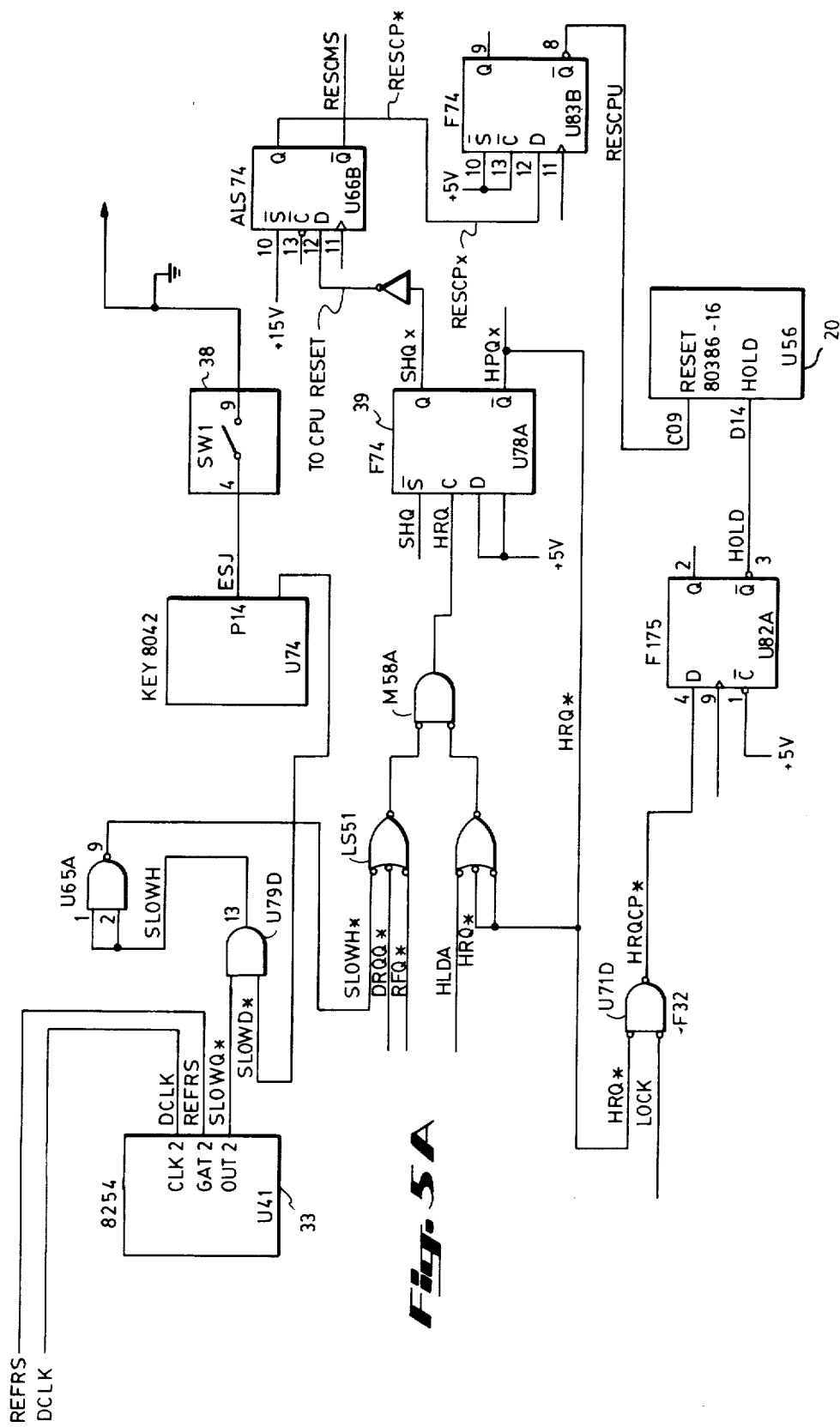
FIGS. 5A and 5B comprise detailed partial circuit diagrams of a portion of the schematics.

Referring now to FIG. 5A the one-shot timer 33 is represented by device U41. The output of device U41, SLOWQ* is logically AND'ed with SLOWD* at device U79D and inverted by device U65A to produce the SLOWH* output.

The by-pass around the automatic speed control is provided by switch 38 designated as SW1 in FIG. 5A. With switch 38 open the automatic speed control is enabled whenever the floppy drive is activated. Conversely with switch 38 closed the automatic speed control is bypassed.

FIG. 5A also illustrates flip-flop 39 also designated as device U78A. Flip-flop 39 serves as the arbitration logic for the DMA request and the REFRESH request. The flip-flop 39 also provides the CPU HOLD request to the CPU 20 for the speed control function.

Figure 5B:
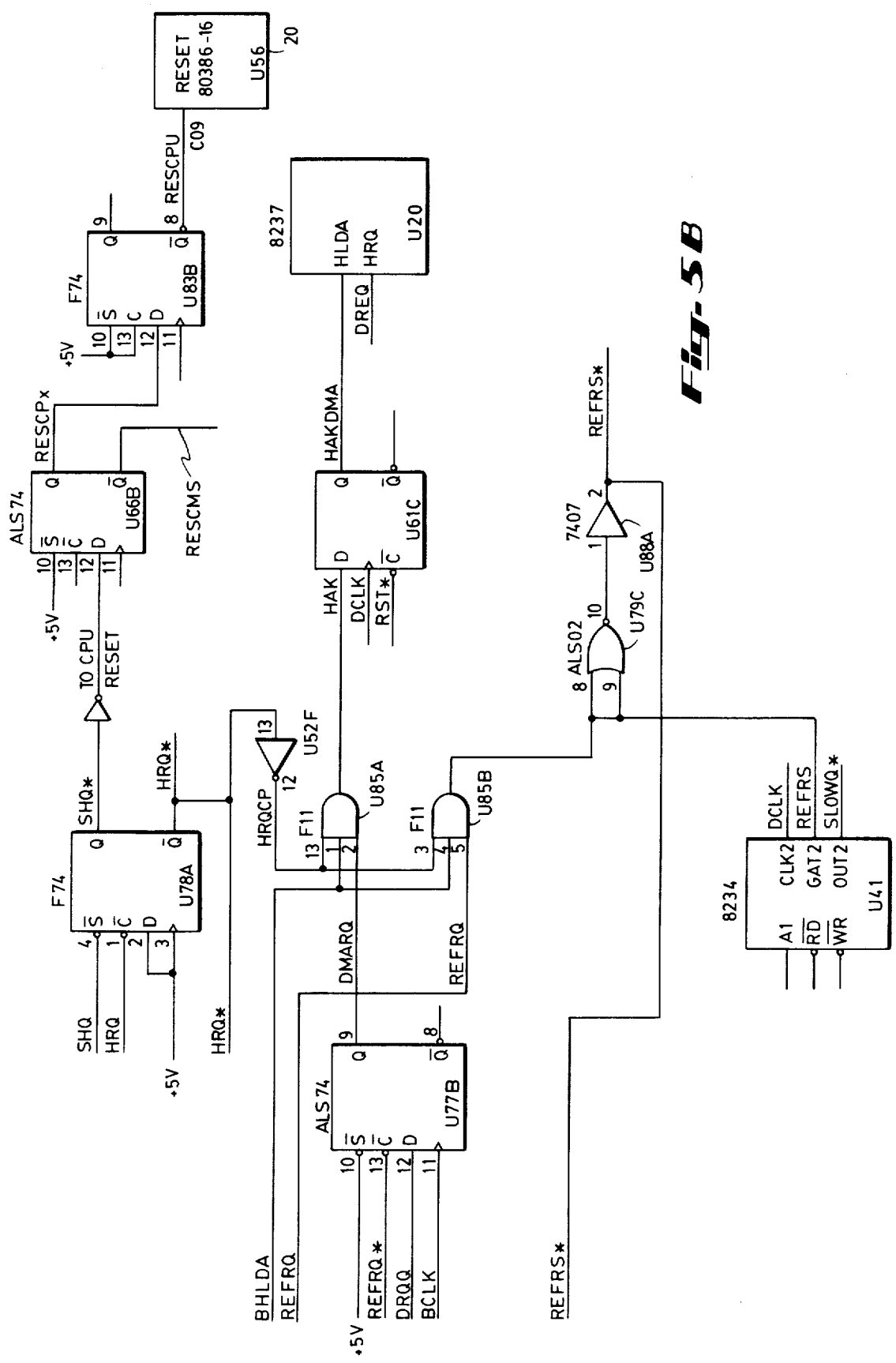
Figure 6:
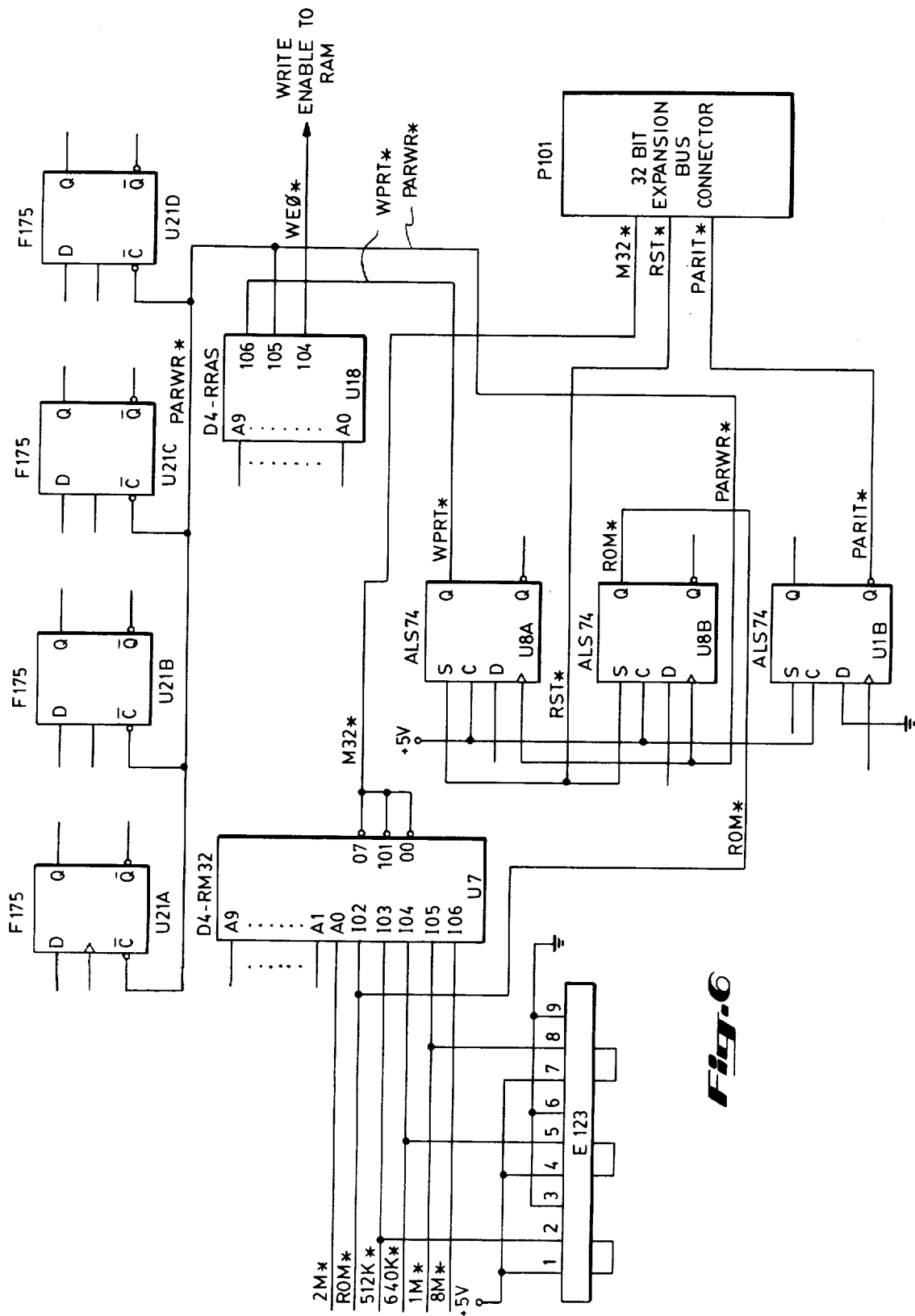
FIG. 6 comprises a detailed partial circuit diagram of a portion of the DRAM memory board schematics.

Referring now to FIG. 5B the functional schematic for the RESET/HOLD arbitration logic is illustrated. The arbitration circuit operates on the HOLD and RESET signals to prevent them from occurring at the same time. The arbitration circuit causes a RESET signal to wait until after any pending HOLD is serviced or causes a HOLD signal to wait until after the RESET is complete. The arbitration circuit holds the last signal received until the first signal received is complete.

The preferred embodiment of the invention is illustrated in the drawings attached hereto as Appendices A and B. In this embodiment the speed control system is implemented to give the user some control of the system speeds in the event that software is speed dependent. The system consists of one channel of the second 8254 timer counter and an interconnect to the HOLD request circuit. The timer channel is programmed as a one-shot which is triggered by REFRESH requests. If the 8042 keyboard controller SLOWD* line is active (LOW) then the timer output will extend the CPU HOLD time for REFRESH by the programmed value of the one-shot. During this HOLD time, the CPU cannot use the bus for execution, but the DMA subsystem can continue to work. The time is clocked by DCLK giving a 250 nanosecond increment in bus HOLD time. To disable the circuit, the 8042 SLOWD* output can be set inactive (HIGH) or the 8254 timer can be stopped by programming the ounter but not giving it a count value.

In order to minimize the potential for operator error because of a failure to set the speed at the proper rate for floppy diskette operations, the computer software is specifically written to sense the operation of the floppy diskette motor. In actuality the software detects a call to the diskette motor or drive and initializes the one-shot timer by setting the one-shot timer time delay. This in effect slows the operation of the computer to a rate equivalent of COMMON. Any calls to the diskette for information which is to be transferred at the 16-bit rate will result in an automatic slow-down of the microprocessor, not by slowing down the clock rate as previously done in prior art devices but by initializing the one-shot timer described above and thus placing the microprocessor on HOLD. This has the net effect of holding up execution of any bus cycles for a predetermined period of time.

Once the transfer of data is completed the HOLD is released and the microprocessor resumes it operation and execution of bus cycles. The completion of data transfer is sensed by the software by monitoring the floppy diskette drive motor—thus after the diskette drive motor is stopped the initialization of the one-shot timer is halted and the microprocessor resumes unimpeded operation.

It has been found that copy-protected diskettes are very sensitive to the execution speed of the microprocessor primarily because the copy-protection scheme is expecting a particular timing rate. Thus as software written for an older generation machine is adapted for a faster new generation machine it becomes difficult to use the copy-protected software in the new generation machine because the software which was written to execute in a slower machine is expecting a particular execution rate which was determined by the slower clock rate. It has been found that the copy-protected software written for older, slower machines cannot be executed in newer, faster machines because of the faster clock rates. In the present invention the utilization of the one-shot timer to stop execution of the microprocessor by placing it in the HOLD or STOP state permits the older software written for the slower machines to be utilized in this new machine without slowing the clock rate down to that of the older generation machines. Thus the new generation machine which is operating at a clock rate of 16 MHz and a 32-bit rate achieves compatibility with older software which heretofore had not been compatible with a new generation machines.

The ability of a new machine to adapt to older generation software has added advantages in that there is no need for the prospective customer of the computer to wait for application programs to be written for the new machine by third party programmers writing with the new clock rate in mind. Thus a 32-bit machine operating at 16 MHz has the potential to gain ready acceptance from future users because it is fully compatible with software programs previously used by the prospective customers in the older generation machines.

The utility program which can be executed by the operator of the machine to slow down the machine has the added advantage that it will permit the operator to vary the program speed not by changing the microprocessor clock rate but by varying the time delay of the one-shot timer. This advantage is manifested in the ability of the operator to manually and intentionally vary the speed of the machine in the event that he wants the machine to function as an older generation machine.

A switch SW1 also provided as is illustrated in FIG. 5A which permits the operator to manually select a bypass mechanism. This switch will defeat the automatic slow-down of the machine. Thus the software which is written to slow-down the operation of the machine by sensing the operation of the floppy diskette drive is defeated.

As previously described the operation of the machine can be manually set to operate at a rate much slower that the rate achieved with a 16 MHz clock rate by selecting the one-shot timer to a time delay which simulates the operation of a slower machine, i.e., an 8088 or 8086 microprocessor or an 80286 microprocessor. A source code listing is provided and is fully set forth in the Appendix H.

The source code of the software listing is provided in Appendix O for the subroutine which is executed to automatically set the speed of the machine. This automatic feature automatically detects the operation of the floppy diskette motor and sets the speed of the one-shot timer to a simulate the speed of an 80286 microprocessor operating at a clock rate of 6 MHz.

An excerpt of the schematic necessary to implement this invention is set forth in FIG. 5A and 5B, however, the entire operational schematics of the preferred embodiment are set forth in Appendices A and B. It is to be understood that the schematics merely set forth the preferred embodiment of the invention and that further implementations of this invention may be made by one skilled in the art.

It is to be further understood that the software listings set forth in Appendices N and O are merely illustrations of the one embodiment of the invention and that further embodiments may be realized and implemented by one skilled in the art.

To assist in the interpretation of the schematics attached hereto as Appendices A and B, a bill of materials of the components used in the preferred embodiment are attached hereto as Appendices C and D. Again it is to be understood that the components set forth in these Appendices are merely the components used in implementing the preferred embodiment.

A simplified logic diagram is set forth in FIG. 4. The simplified logic diagram illustrates the logic flow of each of the components necessary to iimplement the preferred embodiment. It is to be understood that the implementation of the preferred embodiment may be accomplished in a manner other than that specifically illustrated in FIG. 4 by those skilled in the art. The auto-speed routine is executed by calling up the speed-mode routine which is set forth in Appendix N. The routine is executed by utilizing the following command "Mode Speed". Upon execution of this command the routine is automatically loaded and thereafter the operator causes the program to execute by entering a number from 1 to 50 or one of the following commands: COMMON, SLOW or FAST.

As previously indicated the utilization of one of the word commands above results in the assignment of a speed destination by the software. Upon assignment of the assigned speed setting the software causes the entry of the specified speed assignment into the one-shot timer. Consequently, a corresponding time delay is assigned to the one-shot timer thereby causing a corresponding time delay and HOLD of the execution of microprocessor bus cycles.

As previously indicated the 80386 microprocessor is intended to replace the 80286, 8088 and 8086 microprocessors manufactured by Intel. It has been determined that the 80386 microprocessor lacks some of the previous features, features which were specifically implemented in the 80286 microprocessor while at the same time implementing new features which were specifically designed to speed up the microprocessor and vest the new microprocessor with more enhanced features.

One of the features which was eliminated from the 80386 microprocessor is the ability to respond to HOLD request during RESET which in the 80286 microprocessor was intended to permit the operator to reset the microprocessor without affecting other systems of the computer. The ability to reset the microprocessor is an important feature in that at times the microprocessor must be reset without upsetting the setting of other key registers and memory. Typically key registers and memory are reset during either a cold or warm boot of the system, however, the registers and memory should not be reset whenever the microprocessor is reset since this will result in a loss of data and information in the registers and memory.

The drawbacks of the 80386 microprocessor were realized in the implementation of the Direct Memory Access (DMA) and the microprocessor REFRESH cycle. In order to prevent the loss of data during a DMA transfer request or REFRESH which could occur when an 80386 microprocessor is executing a RESET command, it was necessary to utilize an arbitration circuit to arbitrate the execution of the DMA or REFRESH cycle, and the execution of a microprocessor RESET cycle. The arbitration circuit is set forth in FIG. 7 and also illustrated in FIG. 5A as device U78A.

Figure 7:
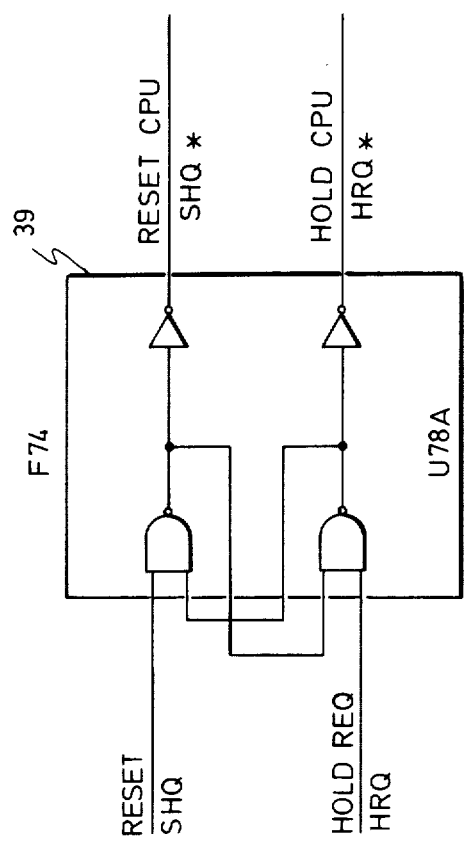
FIG. 7 is a simplified flow diagram of the HOLD/RESET arbitration logic.

The implementation set forth in FIG. 7 is only one implementation of the invention herein. Other implementations may be realized by those skilled in the art having the benefit of this disclosure. The arbitration circuit is primarily executed in hardware, however, it should be apparent to one skilled in the art that implementations of this invention can be made with software.

It should be further realized that the implementation of the arbitration circuit does not accomplish the same function previously implemented in older generation microprocessors. Older generation microprocessors did not arbitrate the microprocessor RESET cycle with the HOLD but rather processed both RESET and HOLD at the same time.

In the present invention the Dynamic RAM REFRESH and DMA controller are arbitrated to prevent these signals from occurring simultaneously and to retain the last signal received while the first signal received is processed. The Dynamic RAM REFRESH subsystem is designed to do a memory read cycle on each of 256 addresses in the memory space. The system is also capable of being driven by an external source if another busmaster has control. The system consists of a timer (part of the 8254) which generates the REFRESH requests over 15.924 microseconds, arbitration logic which arbitrates whether the REFRESH controller or the DMA subsystem secures the bus, a timing generator, and a REFRESH address counter. The REFRESH request rate of 62.799 KHz provides 128 REFRESH cycles in 2.038 milliseconds or 256 cycles in 4.0764 milliseconds.

The REFRESH cycle starts when the REFCK out of the 8254 goes high. This clocks the RFK flip-flop high. The RFK flip-flop will remain high until the REFRESH request is satisfied. This line goes to the HOLD request arbitration circuit discussed above. Nothing else happens until the arbitration circuit responds with acknowledge signal REFRS*. (Note: to allow bus masters control of REFRESH, the REFRS* driver is an open collector gate with a pullup resistor).

When REFRS* goes active, it will be clocked into REFEN* flip-flop by the BCLK signal, enabling the REFRESH address from the counter onto the bus. The REFEN* signal is in turn clocked into REFRD* flip-flop by the next rising edge of BCLK, enabling the MRDC* command onto the bus. The REFRD* signal is gated with BUSRDY and clocked into the next flip-flop (REFEND) by BCLK. This allows a slow memory board to insert wait states into REFRESH cycles. The output of this flip-flop (REFEND) is gated with the REFRS* signal to end the REFRESH cycle on the next BCLK. At the same time that REFEND signal is clocked through, the REFCL* flip-flop is clocked to a low, clearing the RFK and RFQ flip-flops and ending the REFRESH cycle.

If an external bus master wishes to take the bus for long periods of time, it must perform REFRESH or risk losing the dynamic memory. The external bus master can do this by developing its own REFRESH request timer and internal arbitration. When it is not otherwise driving the bus, but still has bus control, it can do a REFRESH cycle by pulling the REFRS* line low with an open collector gate. When the MRDC* line goes inactive from the REFRESH cycle, the REFRS* line should be released. The external bus master can then take full control.

The RFK (REFRESH request) signal is synchronized to DCLK* by RFQ flip-flop. Another flip-flop synchronizes the DREQ (DMA request) signal from the DMA subsystem to the DCLK clock. This insures that the two requests cannot arrive simultaneously. Both requests are next clocked by a pair of flip-flops (DMARQ, REFRQ) that have their Q* outputs cross connected to the other's clear inputs. This guarantees that only one of the two signals (DMARQ, REFRQ) can be active at a time.

The two request signals are also OR'ed together and run through a circuit which locks out the combined request when a HOLD acknowledge cycle is in progress but the original request has gone away. This prevents a new HOLD request from being initiated before the last one is completed. The output of the speed control circuit is also OR'ed in with the other requests in order to use up CPU bus bandwidth as a means of slowing the system down.

The (HRQ) output is fed to an F74 flip-flop which acts as another arbitration circuit. This circuit prevents processor reset from occurring during HRQ or HRQ from occurring during processor reset. This prevents the CPU from aborting a HOLD request with a subsequent lost or erroneous HOLD cycles.

After the reset arbitration, the output (HRQ*) is gated with the signal LOCK. This signal is driven from the processor LOCK* signal. The processor LOCK* is used to clear a flip-flop to set the LOCK signal active. The flip-flop output goes inactive on the falling edge of the next CPU READY* line, thus holding LOCK active for one CPU bus cycle longer than originally intended. The purpose of holding off HRQ until the new LOCK goes away is to fix any processing bug or error encountered by the 80386 CPU.

The output signal from the LOCK lockout circuit (HRQCP*) is synchronized to the CPU clock by a 74F175 (HOLD) to assure a proper setup time to the CPU. The CPU is set out in the following table:

| CLK16* cycle time | 62.5 |
| --- | --- |
| CLK32 to CKP16* in F32 | −5.6 |
| CKP16* to HOLD in F175 | −9.5 |
| 386 HOLD setup time | −25.0 |
| MARGIN *********** | +22.4 |

When the HLDA signal is received from the CPU indicating that the bus is available, then the signal REFRS* (gated from REFRQ) or HAKDMA (gated from DMARQ) is set active, enabling the appropriate subsystem. If the speed control circuit is the source of the request, then neither of the above is set active.

It should be noted that if a cycle is in progress from one requestor, and the other requestor makes a request, then on the first rising edge of BCLK after the first xxxREQ (i.e., DMAREQ or REFREQ) signal goes away, the second requestor will be acknowledged. This will occur without giving the bus back to the CPU, i.e., a DMA HOLD and a REFRESH HOLD will be run back to back. If the speed control circuit is holding the bus then holds from DMA or REFRESH will be immediately acknowledged.

When the HLDA signal is received from the CPU, the address laches and is tri-stated. The CPU bus command generator PAL (D4-SCMD) command output signals are also tri-stated. The command signals are held inactive by pullup resistors until the DMA controller, REFRESH controller, or other bus master can take over the bus. The Bus Address Latch Enable signal (BALE) is forced to the active state requiring that any other bus mast must hold an address stable for the duration of a bus cycle.

To allow the 32-bit memory board to receive addresses generated by the other subsystems, a series of buffers back feeds the CPU address bus from the system buses.

The data buffers between the CPU and system bus are turned around to work in the opposite direction from normal so that the other bus master can access the 32-bit memory as if it was a 16-bit memory.

The DMA controllers in the system operate as a separate subsystem from the main bus controller. They handle requests from the DMA peripherals, arbitrate between them, and then request access to the system address and command busses from the CPU by asserting DREQ. The system consists of two controller ICs (8237A-5), a page register for handling the high order bits of DMA address (74LS612), and various latches and logic for address routing and control.

There are two types of DMA in the preferred embodiment, byte and word DMA. One of the controllers is connected to handle byte operations, the other, word operations. In order to simplify the arbitration between sources, the HOLD request line from the byte controller is connected to a DMA request line (DRQ4) on the word controller. The word controller is programmed for cascade mode on channel 0 (to which is connected DRQ4) so that it will not actually place an address on the bus when it acknowledges the byte controllers request.

The DMA byte cycle begins when a peripheral sets a DRQ0–DRQ3 line active. The 8237 then arbitrates among any other pending requests and sets the HOLD request output active. This line (DRQ4) is connected to the word controller as discussed above which does its arbitration. The word controller then sets its HOLD request line active (DREQ) which is then synchronized and arbitrated by the HOLD arbitration logic discussed above.

When the system responds to the DREQ with a HAKDMA, the word 8237 will respond with a DAK4 which acts as a HOLD acknowledge to the byte controller.

The D4-SCPY PAL drives the SBHE* line in the opposite sense of SA0 in order to satisfy 16-bit devices on the bus.

The DAEN1* signal is OR'ed with the DAEN2* signal inside the D4-SCPY PAL to produce DAEN* which changes the direction of the bi-directional buffers so that the DMA address will be on the system bus.

THE SA16 line has an additional tri-state buffer. This buffer is enabled for byte type DMA and disabled for word type DMA (because the work 8237 drives SA16 in word DMA).

The selection of which internal register is to be enabled to the bus is done by three gates which encode the DAKx signals into a register address for LS612.

In the above fashion, all of the address lines on the bus are driven with appropriate data. When this is complete, 8237 drives the lines XIORC*, XIOWC*, XMWTC* and DMRDC* according to the type of cycle being run. The first three of these lines are buffered back to the IORC*, IOWC*, MWTC* lines by a bi-directional buffer controlled by DAEN*. The DMRDC* line is handled differently. It is delayed by one DCLK cycle before being gated onto the XMRDC* line and then to the MRDC* line. When DMRDC* goes inactive, XMRDC* goes inactive without the DCLK delay. This action provides a greater memory address set up on read commands for block transfer modes of the 8237.

A single DCLK length wait state is added to all DMA cycles. To do this, the OR of DMRDC* and XIORC* clocks the DWQ flip-flop to inactive, setting DRDY inactive. On the next rising edge of DCLK the DXQ flip-flop is clocked active which in turn sets the DWQ flip-flop active again. On the next DCLK, DXQ will go inactive, allowing DRDY to go active and signal ready to 8237. If a peripheral wants additional wait states, it can pull the BUSRDY line low which will set the DWQ output to a low and prevent DXQ from going inactive. The wait circuit is prevented from being affected by BUSRDY except during DMA cycles by a gate which holds the DWQ flip-flop set active.

The D4-SCPY PAL enables the COPYEN* line if SA0 is high and the addressed memory is 16-bit in order to route the data between the low half and high half of the data bus. The COPYHL line moves the data from high to low on memory reads, and from low to high on memory writes.

Word DMA operations are only possible between word memory (16-bit) and word peripherals. The DMA cannot affect the odd address boundary, on either memory or I/O.

The DMA word cycle begins when a peripheral sets a DRQ5-DRQ7 line active. The 8237 then arbitrates among any other pending requests and sets the HOLD request output active. The HOLD request line (DREQ) is then synchronized and arbitrated by the HOLD arbitration logic discussed above.

When the system responds to the DREQ with a HAKDMA, the word 8237 will, after synchronizing the acknowledge, respond with a DAKx acknowledge to the peripheral.

The D4-SCPY PAL drives the SA0 and SBHE* line to a low in order to satisfy 16-bit devices on the bus.

The remainder of the word DMA operation is the same as the byte operation except for the handling of the COPYEN* and COPYHL* signals. These signals are not enabled for word based DMA.

In the preferred embodiment of this invention the BIOS stored in the 16-bit ROM is mapped into RAM. This significantly speeds up the processing time of the processor in that the processor can fetch instructions from RAM at the rate of 32-bits instead of obtaining them from ROM at the rate of 16-bits. The use of a dual mapped BIOS achieves the convenience of a 32-bit memory for BIOS without the cost ramifications of a 32-bit ROM.

The BIOS referred to herein contains the necessary code to interface with most of the system elements in a standard way, to achieve compatibility with earlier generation computers, as well as code to test the system at power up and load code from the floppy or fixed disk subsystems into dynamic memory (RAM). Prior art devices store the software (BIOS) in ROM. Typically these ROMs are connected to the CPU at the CPU's normal data size, i.e., 8-bit for 8088 microprocessors and 16-bit for 8086 and 80286 microprocessors. These 8 and 16-bit ROMs were fast enough for the earlier generation microprocessors in that the access time necessary to meet the requirements of the processor did not materially affect the system performance. With the advent of 32-bit microprocessor, the 8 and 16-bit ROMs cannot be accessed fast enough and therefore result in a considerable degradation of performance of the 80386 microprocessor.

The addition of two additional ROMs to achieve a 32-bit bus width presents an undesirable cost penalty. Since the preferred embodiment of the 80386 microprocessor based personal computer is designed to be compatible with other prior art devices, it has been designed with a 32-bit to 16-bit bus converter to produce a compatible 16-bit bus. The 16-bit bus is a slower bus designed to be compatible with prior art 80286 devices.

The design of the 32-bit RAM subsystem of the preferred embodiment resulted in a minimum RAM size of 1024 kilobytes due to the 32-bit high performance paged RAM design. Since the majority of the software on the current market is not capable of easily using more than 640 kilobytes, 384 kilobytes of memory were available for the dual-mapped BIOS without any cost penalty.

In the preferred embodiment some of the excess RAM (e.g., some of the 384 kilobytes of excess memory) was utilized to hold the ROM code and thereby improve the performance of the 80386 microprocessor. This use of the RAM to store the BIOS, after the computer is powered up, improves the performance of the 80386 microprocessor based computer by improving the access time of the microprocessor to the BIOS. This improvement in the access time is accomplished by increasing the information transferred from memory to the processor, i.e., increasing the transfer rate from 16-bits to 32-bits.

To implement the dual-mapped BIOS in the preferred embodiment, and maintain compatibility with the prior art machines, the ROM code had to remain at its original address and had to be safe from being written over by errant software even though the BIOS had been transferred to RAM. The implementation in the preferred embodiment includes decoding logic which allows the RAM subsystem to respond to the ROM addresses by the CPU and third party software. The additional decoding logic is controllable by software through a writable control port so that the system can switch from operation out of the 16-bit ROM to the 32-bit RAM once the contents of the ROM are written into the 32-bit RAM.

In the preferred embodiment, the personal computer is powered up and begins to execute code from the BIOS stored in the 16-bit ROM. During this initial time, the RAM system necessary to store the BIOS is tested. In the preferred embodiment the BIOS tests the RAM at addresses FE0000 through FFFFFF. The BIOS then initiates the copying of the BIOS into the dynamic memory (RAM).

In the preferred embodiment the BIOS is copied from ROM address space 00E0000h through 00FFFFF to RAM address space FE0000h through 00FFFFFFh.

After the BIOS is copied to RAM, the RAM memory subsystem responds to the following addresses (address range given in hexadecimal):

| ADDRESS RANGE | SIZE | ADDRESS DECODED |
|---|---|---|
| 000000-09FFFF | 640K | when appropriate jumpers are set |
| 0E0000-0FFFFF | 128K | when ROM replacement active (Note) |
| 100000-9FFFFF | 9216K | when expansion RAM is installed |
| F40000-F9FFFF | 384K | when appropriate jumpers are set |
| FA0000-FDFFFF | 256K | always |
| FE0000-FFFFFF | 128K | always (Note) |
| 80C00000 | 1 byte | diagnostic byte (read) address |
| 80C00000 | 1 byte | control byte (write) address |

Note: When ROM replacement is active, writing to this address range can be disabled.

The diagnostic byte (at 80C00000h read only) has several functions. When reading the byte, the value returned is as follows:

| bit 0 | parity status by byte 0 (0 is error) |
|---|---|
| bit 1 | parity status by byte 1 (0 is error) |
| bit 2 | parity status of byte 2 (0 is error) |
| bit 3 | parity status of byte 3 (0 is error) |

| bit 4 | 512K jumper status (0 is active) |
|---|---|
| bit 5 | 640K jumper status (0 is active) |
| bit 6 | 1M jumper status (0 is active) |
| bit 7 | 2 or 8 Mbyte option board (0 is installed) |

The 128 kbytes from 0FE0000h to 0FFFFFFh is used to simulate a system ROM. In the original 80286 products, this spaced was occupied by the system ROMs. In the present invention, for the 80386 machines, this space is occupied by RAM on this board. To provide compatibility with previous products, the system ROM is copied to this same space. To allow faster execution of ROM resident software, this board provides the ROM "replacement" function. When replacement is enabled, the RAM board decodes address range 00E0000h to 00FFFFFh and puts the 128 k of ROM here, replacing the system ROM. When this is done the original ROMs are disabled.

Upon completion of this step, the BIOS initiates the writing of a control bit which causes the RAM system to take over the ROM address space and from then on the CPU executes the BIOS code out of the high speed RAM at a 32-bit bandwidth. This is accomplished by setting bits at 80C00000H thereby causing the RAM subsystem to take over address space E0000.

The PAL equation below is used in the 80386 memory board to decode addresses within the memory space and assert the M32* signal. It does all the decoding for all the expected options according to the following jumper settings.

M32* indicates that the RAM system is to handle the CPU cycle for the given address.

The jumpers 1M*, 512M*, 640K*, 2M* and 8M* are used to specify different amounts of RAM to the system.

The signal ROM is the ROM replacement signal from the control byte.

| 512K | 640K | | | 1M | |
|---|---|---|---|---|---|
| H | H | 256K | 000000-03FFFFh | H | 1024K expanded |
| L | H | 512K | 000000-07FFFFh | L | No extended memory |
| L | L | 640K | 000000-9FFFFFh | | 1024K 100000-1FFFFFh |
| H | L | **** | ILLEGAL | | |
| Daughterboard Jumpers | | | | | |
| 8M | 2M | | | | |
| H | H | OK | | | |
| H | L | 2048K | 200000-3FFFFFh | | |
| L | H | **** | ILLEGAL | | |
| L | L | 8192K | 200000-9FFFFFh | | |

The PAL equation used in the preferred embodiment of this invention to decode address within the memory space is:

```
M32 =
   /A31*/A23*/A22*/A21*/A20*/A19*/A18                      ;000000-03FFFF   256K
 + /A31*/A23*/A22*/A21*/A20*/A19* A18*             512K    ;040000-07FFFF   256K
 + /A31*/A23*/A22*/A21*/A20  A19*/A18*/A17*        640K    ;080000-09FFFF   128K
 + /A31*/A23*/A22*/A21*/A20  A19* A18* A17*        ROM     ;0E0000-0FFFFF   128K
 + /A31* A23* A22* A21* A20*/A19* A18*             /512K   ;F40000-F7FFFF   256K
 + /A31* A23* A22* A21* A20* A19*/A18*/A17*/640K           ;F80000-F9FFFF   128K
 + /A31* A23* A22* A21* A20* A19*/A18* A17                 ;FA0000-FBFFFF   128K
 + /A31* A23* A22* A21* A20* A19* A18                      ;FC0000-FFFFFF   256K
 + /A31*/A23*/A22*/A21* A20*                       1M      ;100000-1FFFFF   1M
 + /A31*/A23*/A22* A21*                            2M      ;200000-3FFFFF   2M
 + /A31*/A23* A22*/A21*                            8M      ;400000-5FFFFF   2M
 + /A31*/A23* A22* A21*                            8M      ;600000-7FFFFF   2M
 + /A31* A23*/A22*/A21*                            8M      ;800000-9FFFFF   2M
 +  A31* A23* A22*/A21*/A20*/A19*/A18*/A17                 ;DAIG 80C0000h   128K
```

Since normal system ROMs could not be written, a write protect function is included in the RAM board for two address spaces. When replacement is not enabled, only 0FE0000h to 0FFFFFFh is protected (the normal ROM space still contains the unwritable ROM). When replacement is active, both spaces can be protected. After POWERUP, the write protect function is disabled.

the write protect control byte (at 80C00000h) write only) is shown below.

| bit 0 | ROM replacement (0 replaces) |
|---|---|
| bit 1 | ROM space write protect (0 protects) |
| bit 2 | reserved (write a 1) |
| bit 3 | reserved (write a 1) |
| bit 4 | reserved (write a 1) |
| bit 5 | reserved (write a 1) |

| | |
|---|---|
| bit 6 | reserved (write a 1) |
| bit 7 | reserved (write a 1) |

The control byte is also used to clear the diagnostic byte parity status. When writing this byte (with any value) the parity status bits will be reset to ones.

The following PAL equations are used in the 80386 memory board to decode the RAS signals and the parity read and write logic. In the equation below the terms used are:

RS0 is the decoded RAM select signal for bank 0 (where the ROM replacement is done).

WE0 is the write enable line to the bank 0 RAMs. This line controls the write protection of the ROM replacement RAM.

WPRT is the ROM write protect signal from the control port.

RFSH is a signal indicating a refresh cycle is to be done.

```
RS0 =
   /A31*/A23*/A22*/A21*/A20*/A19              ;00000000H   512K
 + /A31*/A23*/A22*/A21*/A20* A19*/A18*/A17    ;00080000H   128K
 + /A31*/A23*/A22*/A21*/A20* A19* A18* A17    ;000E0000H   128K
 + /A31* A23* A22* A21* A20*                  ;00F00000H   1024K
 + RFSH                                       ; REFRESH
WE0 =
   MWE*/A31*/A23*/A22*/A21*        /A19                    ;00000000H   512K
 +MWE*/A31*/A23*/A22*/A21*/A20* A19*/A18*/A17              ;00080000H   128K
 +MWE*/A31*/A23*/A22*/A21*/A20* A19* A18* A17*/WPRT        ;000E0000H   128K
 +MWE*/A31* A23* A22* A21* A20*/A19* A18                   ;00F40000H   256K
 +MWE*/A31* A23* A22* A21* A20* A19*/A18                   ;00F80000H   256K
 +MWE*/A31* A23* A22* A21* A20* A19* A18*/A17*             ;00FC0000U   128K
 +MWE*/A31* A23* A22* A21* A20* A19* A18* A17*/WPRT        ;00FE0000H   128K
```

After the BIOS is loaded into RAM, additional system testing (i.e., disks, clock and other I/O devices) continues and the balance of the installed dynamic memory (not previously tested) is tested. Error reports are generated as appropriate.

Once the machine testing is concluded, the boot sector is loaded into the dynamic memory from the floppy diskette or the hard disk. Thereafter the execution of the boot sector code is commenced.

The instructions to transfer the BIOS from ROM to RAM are set forth in two subroutines stored in the BIOS. The source code of those subroutines is set forth in two listings bearing the titles CLEARMEM.LST and TESTHRAM.LST. The TESTHRAM.LST and CLEARMEM.LST source code listings are attached hereto as Appendices R and S respectively and incorporated by reference as if set forth in full herein. The listing for CLEARMEM.LST contains the routine, clr_mem, which calls routine MovSysROM found in routine TESTHRAM.LST. MovSysROM will move the BIOS code in ROM to the RAM space and write the BIOS to the memory locations that replaces the ROM address space. The MovSysROM also write protects the RAM after the BIOS is written into RAM.

Complete listings of PAL equations for the ROM replacement are set forth in Appendices P and Q. The listing entitled D4-SROMA.PAL represents a listing of the PAL equations for the ROM decode logic contained in device U26.

The listing entitled D4-RM32.PAL represents a listing of the PAL equations for the M32 PAL otherwise indicated as device U7.

The listing entitled D4-RRAS..PAL represents a listing of the PAL equations for the logic contained in device U18.

In describing the invention, reference has been made to a preferred embodiment. However, those skilled in the art and familiar with the disclosure of the invention may recognize additions, deletions, substitutions, or other modifications which would fall within the purview of the invention as defined in the appended claims.

APPENDIX N

KSUBS SOURCE CODE

```
**********************************************************************
 Name:       KSUBS - Keyboard I/O ROM Support Group:      ROM Revision:   A Date:       May 25, 1986

Author:     Lance Pontiff

;*********************************************************************
```

CHANGES:

```
    DATE        REVISION            DESCRIPTION
    --------    --------    -----------------------------------
    05/25/86    Original    New module for 386 ROM.
```

;****************************************************************

FUNCTIONAL DESCRIPTION:

This module contains keyboard support routines.

---

```
        .286P
        page

Publics public  get_key
        public  chk_key
        public  read_status
        public  old_key
        public  new_key
        public  new_status
        public  set_typematic
        public  put_key
        public  set_cpu
        public  read_cpu
        public  read_kbd Externals extrn   getbyte:near        ;
        extrn   chkbuf:near         ;   check key buffer static
        extrn   chkLED:near         ;   update kbd LEDs if necessary
        extrn   ts_kbd:near         ;   kbd use semaphore
        extrn   kbdrdy:near         ;   wait til 8042 is ready extrn   ram400:word         ;   ram segment
        extrn   keybit1:byte        ;   keyboard bit status
        extrn   keybit2:byte        ;   other keyboard ststus bits
        extrn   enhbits:byte        ;   enhanced kbd status bits
        extrn   keybfbeg:word       ;   actual start of keyboard buffer
        extrn   keybfend:word       ;   actual end of buffer
        extrn   keybftop:word       ;   holds addr of keyboard buffer
        extrn   keybfbot:word       ;   addr of end of keyboard buffer
        extrn   keytail:word        ;   holds keyboard buffer tail
        extrn   kbd_led:byte        ;   kbd LEDs ram indicator include key_def.equ
        include flag_def.equ
        include pop_f.mac
        include cnt_def.equ Local Equates SET_SPEED       equ     0f0h        ;   set CPU speed
RAD_SPEED       equ     0f1h        ;   read current CPU speed
ST_TYPE         equ     0f2h        ;   determine keyboard type BD_11           equ     0           ;   11 bit keyboard in use
BD_9            equ     1           ;   9 bit keyboard in use ROM     segment byte    public 'ROM'
        assume  cs:ROM, ds:seg ram400 page
;****************************************************************
        Read character from keyboard
;----------------------------------------------------------------
t_key   proc    near
        call    chkLED              ;   update LEDs if necessary
```

```
getkey:
        cli                                     ;;;     mask interrupts
        call    chkbuf                          ;;; Q:  key available?
        sti                                     ;;;     enable interrupts
        jnz     gotkey                          ;   Y:  ax = key, si=si+2
        mov     ax,9002h                        ;   N:  Perform keyboard Device Wait
        clc                                     ;           default = ROM timeout
        int     15h                             ;
wait_key:
        cli                                     ;;;     disable interrupts
        call    chkbuf                          ;;; Q:  key available?
        sti                                     ;;;     enable interrupts
        nop                                     ;;;     allow interrupts to occur
        jz      wait_key                        ;   N:  wait for a key
                                                ;   Y:  place key in queue
;****************************************************************************
        Following code performs keyboard queue wrapping
;----------------------------------------------------------------------------
gotkey:
        cmp     si,[keybfbot]                   ;;;     do we need to loop around?
        jne     savehead                        ;;; N:  leave alone
        mov     si,[keybftop]                   ;;; Y:  set to top of buffer
savehead:
        mov     [keyhead],si                    ;;;     save new head pointer
        sti                                     ;       allow interrupts
        ret                                     ;       *** RETURN ***
get_key endp page
;****************************************************************************
;       Check status of buffer
;----------------------------------------------------------------------------
chk_key proc    near
        call    chkLED                          ;       update kbd LEDs if necessary
        cli                                     ;       mask interrupts
        call    chkbuf                          ;;;     check buffer status
        sti                                     ;;;
        ret                                     ;       *** RETURN ***
chk_key endp ;****************************************************************************
;       Return shift status in al register
;----------------------------------------------------------------------------
read_status     proc    near
        mov     al,[keybit1]                    ;       get shift status byte
        ret                                     ;       *** RETURN ***
read_status     endp page Return with ZF=0 if the key in ax can be converted to an older
        compatible key scan/ascii pair with the converted key in ax.
        Return with ZF=1 otherwise.

Algorithm is as follows:

1. If ah = 00h then return ax unmodified
        2. If ax = e00d then ax = 1c0d
        3. If ax = e02f then ax = 352f
        4. If ah > 84h then cannot convert key
        5. If al = f0h then cannot convert key
        6. If al = e0h then al = 0 old_key proc    near
        cmp     ah,0                            ;   Q:  ALT <num> <num> <num> key?
        je      oldret                          ;   Y:
        cmp     ax,0e00dh                       ;   Q:  new Enter key?
        jne     not_enter                       ;   N:
        mov     ax,1c0dh                        ;   Y:  convert key
        jmp     short oldret                    ;
```

```
)t_enter:
        cmp     ax,0e02fh               ; Q: new Keypad / key?
        jne     not_slash               ; N:
        mov     ax,352fh                ; Y: convert key
        jmp     short oldret            ;
iot_slash:
        cmp     ah,84h                  ; Q: new extened code?
        ja      no_key                  ; Y: cannot convert key
        cmp     al,0f0h                 ; Q: new extended code?
        je      no_key                  ; Y: cannot convert key
        cmp     al,0e0h                 ; Q: redundant keypad key?
        jne     oldret                  ; N:
        mov     al,0                    ; Y: convert to old code
 ldret:
        mov     si,-1                   ; make ZF=0
        jmp     short ret_old           ;
io_key:
        xor     si,si                   ; make ZF=1
 et_old:
        test    si,si                   ; set/reset ZF
        ret                             ; *** RETURN ***
 d_key   endp page If the ASCII code is f0h, replace it with 0
lew_key  proc    near
        cmp     ah,0                    ; Q: ALT <num> <num> <num> key?
        je      not_filler              ; Y:
        cmp     al,0f0h                 ; Q: new ALT extended code?
        jne     not_filler              ; N:
        mov     al,0                    ; Y: replace f0h with 0!
iot_filler:
        ret                             ; *** RETURN ***
ew_key   endp ;       Return the new status information associated with the enhanced
;       keyboard.

lew_status      proc    near
        mov     al,keybit2              ; get left ALT and CTRL status
        and     al,3                    ; mask off other stuff
        mov     ah,enhbits              ; get right ALT and CTRL status
        and     ah,0ch                  ; mask off other stuff
        or      ah,al                   ; ah = left and right ALT and CTRL
        mov     al,keybit1              ; get old shift status byte
        ret                             ; *** RETURN ***
iew_status      endp page ;       Set keyboard typematic rate/delay.  Send keyboard command F3
;       followed by the rate/delay byte.

et_typematic    proc    near
        cmp     al,5                    ; Q: al is 5? (mandatory!)
        jne     bad_type                ; N: don't do function
        cmp     bh,3                    ; Q: legal delay value?
        ja      bad_type                ; N:
        cmp     bl,31                   ; Q: legal rate value?
        ja      bad_type                ; N:
        push    cx                      ; Y: protect cx
kbd_wait:
        call    ts_kbd                  ; Q: kbd command in progress?
        jnz     kbd_wait                ; Y: wait til finished
        and     kbd_led,not RCVD_ACK    ; N: reset ack received
        call    kbdrdy                  ;    wait til 8042 is ready
        mov     al,0f3h                 ;    get set typematic kbd command
        out     60h,al                  ;
        mov     cx,-1                   ;    timeout value
```

```
etack1:
        test    kbd_led,RCVD_ACK        ;   Q: received ACK?
        jnz     gotack1                 ;   Y:
        loop    getack1                 ;   N: keep waiting
        call    kbdrdy                  ;     *** TIMEOUT ***
        mov     al,0f4h                 ;     get kbd enable command
        out     60h,al                  ;     send it to kbd
        jmp     short reset_ip          ;
gotack1:
        and     kbd_led,not RCVD_ACK    ;     reset received ACK flag
        call    kbdrdy                  ;     make sure kbd ready
        mov     al,bh                   ;     get delay value
        shl     al,5                    ;     shift to bits 6 and 5
        or      al,bl                   ;     mask in rate value
        out     60h,al                  ;     send rate/delay value
        mov     cx,-1                   ;     get timeout value
getack2:
        test    kbd_led,RCVD_ACK        ;   Q: received ACK?
        jnz     reset_ip                ;   Y:
        loop    getack2                 ;   N: keep waiting
        call    kbdrdy                  ;     *** TIMEOUT ***
        mov     al,0f4h                 ;     get kbd enable command
        out     60h,al                  ;     send it to kbd
reset_ip:
        and     kbd_led,not KCMD_IP     ;     reset kbd command in progress
        pop     cx                      ;     restore cx
ad_type:
        ret                             ;     *** RETURN ***
set_typematic   endp page ;       Place the scan code/character specified in register CH and CL,
;       respectively, into the keyboard buffer.  If successful, return
;       with AL = 0 and CF = 0.  If the buffer is full, return with
;       Al = 1 and CF = 1.
;
put_key proc    near
        cli                             ;;;   disable interrupts
        mov     si,keytail              ;;;   get next available slot
        mov     [si],cx                 ;;;   place pair in kbd buffer
        inc     si                      ;;;   get next available slot
        inc     si                      ;;;
        cmp     si,keybfbot             ;;; Q: need to wrap around?
        jne     savetail                ;;; N: save new tail
        mov     si,keybftop             ;;; Y: get new tail
savetail:
        cmp     si,keyhead              ;;; Q: buffer was full?
        je      kbdfull                 ;;; Y: don't update tail
        mov     keytail,si              ;;; N: set new tail
        xor     al,al                   ;;;   note success
        clc                             ;;;
        jmp     short put_end           ;;;
kbdfull:
        mov     al,1                    ;;;   note failure
        stc                             ;;;
put_end:
        sti                             ;;;   enable interrupts
        ret                             ;     *** RETURN ***
put_key endp page
;********************************************************************
;       Set the CPU speed according to the value in al
;--------------------------------------------------------------------
set_cpu proc    near
        push    ax                      ;     protect ax
        cmp     al,AUTO_                ;   Q: set AUTO speed?
        je      set_auto                ;   Y:
        cmp     al,COUNT_               ;   Q: set COUNT speed?
        je      set_count               ;   Y:
        test    al,al                   ;   Q: set to common speed?
        jne     chk_fast                ;   N:
        in      al,SPEEDIO              ;   Y: get speed info
```

```
            and     al,not S_BIT            ;       reset the S bit
            and     al,not CNTMSK           ;       clear COUNT field
            or      al,COMM_SP              ;       set COUNT to COMMON
            out     SPEEDIO,al              ;
            mov     ah,COMM_SP              ;       get COMMON speed count
            jmp     short setout            ;
chk_fast:
            dec     al                      ; Q:    set to FAST speed?
            jne     chk_high                ; N:
            in      al,SPEEDIO              ; Y:    get speed info
            and     al,not S_BIT            ;       reset the S bit
            and     al,not CNTMSK           ;       clear COUNT field
            or      al,FAST_SP              ;       set COUNT to FAST
            out     SPEEDIO,al              ;
            mov     ah,FAST_SP              ;       get FAST speed count
            jmp     short setout            ;
chk_high:
            dec     al                      ; Q:    set to HIGH speed?
            jne     chk_toggle              ; N:
            in      al,SPEEDIO              ; Y:    get speed info
            and     al,not A_BIT            ;       reset the A bit
            or      al,S_BIT                ;       set the S bit
            out     SPEEDIO,al              ;
            mov     ah,HIGH_SP              ;       get HIGH speed count
            jmp     short setout            ;
chk_toggle:
            dec     al                      ; Q:    toggle CPU speed?
            jne     setret                  ; N:
            in      al,SPEEDIO              ; Y:    get speed info
            mov     ah,0                    ;       assume HIGH speed needed
            test    al,S_BIT                ; Q:    already in HIGH speed?
            jz      xor_S                   ; N:    set to HIGH speed
            mov     ah,al                   ; Y:    get COUNT value
            and     ah,CNTMSK               ; Y:    mask off A and S bits
xor_S:
            xor     al,S_BIT                ;       toggle the S bit
            out     SPEEDIO,al              ;
            jmp     short setout            ;
set_auto:
            in      al,SPEEDIO              ;       get speed info
            and     al,not A_BIT            ;       reset the A bit
            or      al,(A_BIT+S_BIT)        ;       set the A and S bits
            out     SPEEDIO,al              ;
            mov     ah,HIGH_SP              ;       get HIGH speed count
            jmp     short setout            ;
set_count:
            cmp     cx,1                    ; Q:    cx < 1?
            jb      setret                  ; Y:    bad COUNT, don't use
            cmp     cx,50                   ; Q:    cx > 50?
            ja      setret                  ; Y:    bad count, don't use
            mov     ax,50                   ;       COUNT = 50 - cx + 2
            sub     ax,cx                   ;
            inc     ax                      ;
            inc     ax                      ;
            mov     ah,al                   ;       ah = COUNT
            in      al,SPEEDIO              ;       get speed info
            and     al,not S_BIT            ;       reset the S bit
            and     al,not CNTMSK           ;       clear COUNT field
            or      al,ah                   ;       set COUNT to COMMON
            out     SPEEDIO,al              ;
            jmp     short setout            ;
setout:
            mov     al,92h                  ;       set timer 2 command
            cli                             ;;;     disable interrupts
            out     FCNT_MODE,al            ;;;
            jmp     $+2                     ;;;
            jmp     $+2                     ;;;
            jmp     $+2                     ;;;
            cmp     ah,HIGH_SP              ;;; Q:  set to HIGH speed?
            je      no_cnt                  ;;; Y:  don't set timer 2
            mov     al,ah                   ;;; N:  get counter value
            out     FCNT_2,al               ;;;     set counter value
no_cnt:
setret:
            pop     ax                      ;       restore ax
            ret                             ;       *** RETURN ***
st_cpu endp
``` page

```
;*****************************************************************
;       Read the current CPU speed
;-----------------------------------------------------------------
read_cpu        proc    near
        in      al,SPEEDIO              ;
        test    al,S_BIT                ;       Q: HIGH speed?
        jnz     S_set                   ;       Y:
        mov     ah,COMMON_              ;       N: assume COMMON speed
        and     al,not (A_BIT+S_BIT)    ;          mask off A and S bits
        cmp     al,COMM_SP              ;       Q: COMMON speed?
        je      retcpu                  ;       Y:
        mov     ah,FAST_                ;       N: assume FAST speed
        cmp     al,FAST_SP              ;       Q: FAST speed?
        je      retcpu                  ;       Y:
        xor     ah,ah                   ;          ax = COUNT
        mov     cx,50                   ;          cx = 50 - COUNT + 2
        sub     cx,ax                   ;
        inc     cx                      ;
        inc     cx                      ;
        mov     ah,COUNT_               ;          return COUNT speed
        jmp     short retcpu            ;
S_set:
        mov     ah,AUTO_                ;          assume AUTO speed
        test    al,A_BIT                ;       Q: is it AUTO speed?
        jnz     retcpu                  ;       Y:
        mov     ah,HIGH_                ;       N: must be HIGH speed
retcpu:
        mov     al,ah                   ;          return info in al
        xor     ah,ah                   ;          return info in ax
        ret                             ;       *** RETURN ***
read_cpu        endp page ;*****************************************************************
;       Determine the attached keyboard
;-----------------------------------------------------------------
read_kbd        proc    near
        call    getbyte                 ;          read COMPAQ special 8042 byte
        mov     ah,-1                   ;       Q: 8042 timeout?
        jz      kbdout                  ;       Y: return -1
        mov     ah,KBD_11               ;       N: assume 11 bit keyboard
        test    al,KBD_TYPE             ;       Q: 11 bit keyboard indeed?
        jz      kbdout                  ;       Y:
        mov     ah,KBD_9                ;       N: return 9 bit keyboard
kbdout:
        mov     al,ah                   ;          al = keyboard type
        xor     ah,ah                   ;          ax = keyboard type
        ret                             ;       *** RETURN ***
read_kbd        endp ROM     ends
        end
Microsoft (R) Macro Assembler Version 4.00         8/7/86  10:26:25

KSUBS   Copyright (c) 1982,83,84,85,86 COMPAQ Computer Corp.   Page    1-1
```

```
                page    58,132
                title   KSUBS -- Copyright (c) 1982,83,84,85,86 COMPAQ Computer Corp.
;****************************************************************
;
;       Name:   KSUBS -- Keyboard I/O ROM Support
;
;       Group:  ROM
;
;       Revision:  A
;
;       Date:   May 25, 1986
;
;       Author: Lance Pontiff
;
;****************************************************************
;
;       CHANGES:
;
;       DATE        REVISION    DESCRIPTION
;       --------    --------    -----------
;       05/25/86    Original    New module for 386 ROM.
;
;****************************************************************
```

```
;
; FUNCTIONAL DESCRIPTION:
;
; This module contains keyboard support routines.
;

.286P
        page
;
; Publics
;
        public  _get_key
        public  chk_key
        public  read_status
        public  old_key
        public  new_key
        public  new_status
        public  set_typematic
        public  put_key
        public  set_cpu
        public  read_cpu
        public  read_kbd ;
; Externals
;
        extrn   getbyte:near
        extrn   chkbuf:near             ; check key buffer static
        extrn   chkLED:near             ; update kbd LEDs if necessary
        extrn   ts_kbd:near             ; kbd use semaphore
        extrn   kbdrdy:near             ; wait til 8042 is ready extrn   ram400:word             ; ram segment
        extrn   keybit1:byte            ; keyboard bit status
        extrn   keybit2:byte            ; other keyboard ststus bits
        extrn   enhbits:byte            ; enhanced kbd status bits
        extrn   keybfbeg:word           ; actual start of keyboard buffer
        extrn   keybfend:word           ; actual end of buffer
        extrn   keybftop:word           ; holds addr of keyboard buffer
        extrn   keybfbot:word           ; addr of end of keyboard buffer
        extrn   keyhead:word            ; holds keyboard buffer head
        extrn   keytail:word            ; holds keyboard buffer tail
        extrn   kbd_led:byte            ; kbd LEDs ram indicator C       include key_def.equ
C ;
C ;    Equates for 8042 keyboard controller.
C ;
C       KEY_STATUS      =       64H     ; 8042 status registers (read-only).
C       KEY_OUT_BUFF    =       60H     ; 8042 output buffer (read-only).
C       KEY_IN_BUFF     =       60H     ; 8042 input buffer (write-only).
C       KEY_CMD         =       64H     ; 8042 command register.
C ;
C ;    Equates for KEY_CMD
C ;
C       KCMD_RD         =       20H     ; Read 8042 command byte.
C       KCMD_WT         =       60H     ; Next byte is a command.
C       KCMD_SELF_TEST  =       0AAH    ; Keyboard self test command.
C       KCMD_INTF_TEST  =       0ABH    ; Keyboard interface test.
C       KCMD_DIAG_DUMP  =       0ACH    ; Keyboard diagnostic dump.
C       KCMD_DIS_KBD    =       0ADH    ; 
C       KCMD_ENABLE     =       0AEH    ; Enable keyboard command.
C       KCMD_RD_INPUT   =       0C0H    ; Read keyboard input port.
C       KCMD_RD_OUTPUT  =       0D0H    ; Read keyboard output port.
C       KCMD_WT_OUTPUT  =       0D1H    ; Write keyboard output port.
C       KCMD_RD_TINPUTS =       0E0H    ; Read keyboard T inputs.
C       KCMD_PULSE_OUT  =       0F0H    ; Pulse output port.
C ;
C ;------ Keyboard Commands
C ;
C       KCMD_RESET      =       0FFh    ; Reset keyboard.
C       KCMD_RESEND     =       0FEH    ; Resend transmission.
C       KCMD_NOP        =       0FDH    ; NOP.
C       KCMD_DEFAULT    =       0F6H    ; Set default values.
C       KCMD_DIS_KBD    =       0F5H    ; Disable keyboard.
C       KCMD_ENA_KBD    =       0F4H    ; Enable keyboard.
C       KCMD_SETTYPE    =       0F3H    ; Set typematic rate.
C       KCMD_ECHO       =       0EEH    ; Echo characters.
C       KCMD_LEDS       =       0EDH    ; Reset mode LED's.
C ;
C ;      Below are special commands for the COMPAQ 8042.
C ;      These 8042 commands are not IBM AT compatible.
C ;
C       CPU_HIGH        =       0A3H    ; Enable 386 CPU speed variation
C       CPU_READ        =       0A5H    ; Read CPU speed and attached keyboard
C ;
C ;      When the special COMPAQ 8042 command "CPU READ" above is
C ;      issued to the 8042, a byte of information with the definitions
C ;      below is returned.  All other bit positions are undefined.
C ;
C       HIGH_CPU        =       00000100B       ; CPU currently set to high speed
C       SLOW_CPU        =       00001000B       ; CPU currently set to slow speed
C       FAST_CPU        =       00001100B       ; CPU currently set to fast speed
C       KBD_TYPE        =       00100000B       ; 0/1 = 11 bit keyboard/9bit keyboard
C ;
C ;      Below are the count values used to regulate the 386 CPU speed.
C ;
C       COMM_SP         =       24h     ; COMMON speed count value - 286/6 MHz
```

```
= 0022              C   FAST_SP         =   22h             ; FAST speed count value   - 286/8  MHz
= 0000              C   HIGH_SP         =   00h             ; HIGH speed count value   - 386/16 MHz
= 0031              C   IBMPC_SP        =   31h             ; approximate PC speed
                    C   ;
                    C   ;   Below are defines to represent the various 386 speeds.
                    C   ;
= 0000              C   COMMON_         =   0
= 0001              C   FAST_           =   1
= 0002              C   HIGH_           =   2
= 0003              C   TOGGLE_         =   3
= 0008              C   AUTO_           =   8
= 0009              C   COUNT_          =   9
                    C   ;
                    C   ;   DMA page 94h is used to maintain the current values of the AUTO bit,
                    C   ;   SPEED bit, and the COUNT value as defined below.
                    C   ;
= 0080              C   A_BIT           =   10000000b
= 0040              C   S_BIT           =   01000000b
= 003F              C   CNTMSK          =   00111111b
                    C   ;
                    C   ;   Initial 8042 command setup
                    C   ;
= 0050              C   INIT_KSETUP     =   050H            ; PC compatible, disable kbd,
                    C                                       ; Inhibit override, system flag,
                    C                                       ; enable output buffer interrupt.
= 0045              C   FIN_SETUP       =   045H            ; Do not override key lock.
                    C   ;
= 0055              C   KEY_TEST_OK     =   055H            ; Successful self test response.
                    C   ;
                    C   ;   Equates for KEY_STATUS
                    C   ;
= 0001              C   KSTAT_OUT_FULL  =   00000001B       ; 8042 output buffer full.
= 0002              C   KSTAT_IN_FULL   =   00000010B       ; 8042 input buffer full.
= 0004              C   KSTAT_SYS_FLAG  =   00000100B       ; 8042 system flag.
= 0008              C   KSTAT_CMD_DATA  =   00001000B       ; 8042 cmd or data mode.
= 0010              C   KSTAT_INHIBIT   =   00010000B       ; 8042 keyboard inhibit flag.
= 0020              C   KSTAT_TTO       =   00100000B       ; 8042 transmit time out.
= 0040              C   KSTAT_RTO       =   01000000B       ; 8042 receive time out.
= 0080              C   KSTAT_P_ERROR   =   10000000B       ; 8042 parity error.
                    C   ;
                    C   ;   Equates for KEY_INPUT
                    C   ;
= 0080              C   KIN_KEY_LOCK    =   10000000B       ; Keyboard lock switch.
= 0040              C   KIN_P_DISPLAY   =   01000000B       ; Primary display.
= 0020              C   KIN_MANUF       =   00100000B       ; Manufacturing jumper.
= 0010              C   KIN_CPU_SPEED   =   00010000B       ; CPU speed 0=AUTO 1=HIGH
= 0004              C   KIN_287         =   00000100B       ; 287 present 0=TRUE 1=FALSE
                    C   ;
                    C   ;   Equates for KEY_OUTPUT
                    C   ;
= 0001              C   KOUT_CPU_RESET  =   00000001B       ; CPU reset.
= 0002              C   KOUT_A20        =   00000010B       ; A20 output.
= 000C              C   KOUT_CPU_SPEED  =   00001100B       ; CPU speed - x0=slow 01=high 11=fast
= 0010              C   KOUT_OUT_FULL   =   00010000B       ; Output buffer full.
= 0020              C   KOUT_IN_FULL    =   00100000B       ; Input buffer full.
= 0040              C   KOUT_CLK_OUT    =   01000000B       ; Keyboard output clock.
= 0080              C   KOUT_DATA_OUT   =   10000000B       ; Keyboard data output.
                    C   ;
= 0004              C   K_CPU_HIGH      =   00000100B       ; High CPU speed
= 0008              C   K_CPU_SLOW      =   00001000B       ; Slow CPU speed
= 000C              C   K_CPU_FAST      =   00001100B       ; Fast CPU speed
                    C   ;
                    C   ;   Input for KEYBIT1 keyboard variable in RAM 40:17
                    C   ;
= 0080              C   INSRTON         =   80H             ;INS        MODE IN EFFECT
= 0040              C   CAPSLOK         =   40H             ;CAPS_LOCK  MODE IN EFFECT
= 0020              C   NUMLOCK         =   20H             ;NUM_LOCK   MODE IN EFFECT
= 0010              C   SCRLOCK         =   10H             ;SCROLL_LOCK MODE IN EFFECT
= 0008              C   ALTKEY          =   08H             ;ALT        KEY IS BEING HELD DOWN
= 0004              C   CTLKEY          =   04H             ;CTRL       KEY IS BEING HELD DOWN
= 0002              C   LEFTSHF         =   02H             ;LEFT_SHIFT KEY BEING HELD DOWN
= 0001              C   RIGTSHF         =   01H             ;RIGHT_SHIFT KEY BEING HELD DOWN
                    C   ;
                    C   ;   Input for KEYBIT2 keyboard variable in RAM 40:18
                    C   ;
= 0080              C   INSKEY          =   80H             ;INS         KEY BEING HELD DOWN
= 0040              C   CAPKEY          =   40H             ;CAPS_LOCK   KEY BEING HELD DOWN
= 0020              C   NUMKEY          =   20H             ;NUM_LOCK    KEY BEING HELD DOWN
= 0010              C   SCRLKEY         =   10H             ;SCROLL_LOCK KEY BEING HELD DOWN
= 0008              C   MOWKEY          =   08H             ;CTRL+NUM_LOCK MODE IN EFFECT
= 0004              C   SYSREQ          =   04H             ;SYS_REQ     KEY BEING HELD DOWN
= 0002              C   LEFTALT         =   02H             ;LEFT ALT    KEY IS DOWN
= 0001              C   LEFTCTRL        =   01H             ;LEFT CTRL   KEY IS DOWN
                    C   ;
                    C   ;   Bit definitions for ENHBITS variable in RAM 40:96
                    C   ;
= 0080              C   RID_IP          =   80H             ;READ_ID_IN_PROGRESS
= 0040              C   RID_1ST         =   40H             ;RECEIVED FIRST ID BYTE
= 0020              C   F_NUM_LK        =   20H             ;FORCE NUM LOCK ON
= 0010              C   ENH_KBD         =   10H             ;ENHANCED KEYBOARD IS INSTALLED
= 0008              C   RIGTALT         =   08H             ;RIGHT ALT KEY IS DOWN
= 0004              C   RIGTCTRL        =   04H             ;RIGHT CTRL KEY IS DOWN
= 0002              C   GOT_E0          =   02H             ;LAST CODE WAS 'E0' CODE
= 0001              C   GOT_E1          =   01H             ;LAST CODE WAS 'E1' CODE
                    C   ;
                    C   ;   Bit definitions for KBD_LED variable in RAM 40:97
                    C   ;
```

```
= 0040              C   KCMD_IP         =   40H         ;KEYBOARD COMMAND IN PROGRESS
= 0020              C   IP_287          =   20H         ;287 ERROR FIXUP IN PROGRESS
= 0010              C   RCVD_ACK        =   10H         ;RECEIVED ACK FROM KEYBOARD
= 0004              C   CAP_LED         =   04H         ;CAPS LOCK   LED IS ON
= 0002              C   NUM_LED         =   02H         ;NUM LOCK    LED IS ON
= 0001              C   SCRL_LED        =   01H         ;SCROLL LOCK LED IS ON
                    C   ;
                    C           include flag_def.equ
                    C   ;
                    C   ;       80286 flag equates
                    C   ;
= 0200              C   I               =   0200H       ; INTERRUPT ENABLE FLAG
= 0080              C   S               =   0080H       ; SIGN FLAG
= 0040              C   Z               =   0040H       ; ZERO FLAG
= 0001              C   C               =   0001H       ; CARRY FLAG C           include pop_f.mac
                    C   pop_f   macro   addr            ; Simulate pop flag.
                    C           local   new_pc
                    C           local   do_iret
                    C   ;
                    C           push    cs              ; Save CS in stack.
                    C           call    do_iret         ; Go pop flags.
                    C           jmp     new_pc          ; Continue normal code.
                    C   do_iret:
                    C           iret                    ; Will pop cs:ip, flags.
                    C   new_pc:
                    C           ENDM C           include cnt_def.equ
                    C   ;**********************************************************
                    C   ;       8254 programmable interval timers
                    C   ;**********************************************************
                    C   ;
                    C   ;       PC XT/AT Compatible timer
                    C   ;
                    C   ;**********************************************************
= 0040              C   CNT_0           =   40H         ; 8254's COUNTER 0 I/O ADDRESS
= 0041              C   CNT_1           =   41H         ; 8254's COUNTER 1 I/O ADDRESS
= 0042              C   CNT_2           =   42H         ; 8254's COUNTER 2 I/O ADDRESS
= 0043              C   CNT_MODE        =   43H         ; 8254's MODE REGISTER I/O ADDRESS
                    C   ;
= 0036              C   CNT0_MODE       =   36H         ; SEL CNT_0, LD LSB_FIRST, SQUARE WAVE
= 0000              C   CNT0_SETUP      =   0000H       ; INTR TIMER DIVISOR FOR 18.2 Hz
= 0054              C   CNT1_MODE       =   54H         ; COUNTER 1, LSB, MODE 2, BIN COUNT
= 0012              C   CNT1_SETUP      =   12H         ; REFRESH COUNT DIVISOR, 2 BYTES.
= 00B6              C   CNT2_MODE       =   0B6H        ; SEL CNT_2, LSB FIRST, SQUARE WAVE
= 0533              C   CNT2_SETUP      =   0533H       ; INITIAL TIMER 2 DIVISOR.
                    C   ;
= 0000              C   LATCH_CNT0      =   00H         ; CMD TO LATCH CNT_0'S COUNTER.
= 0040              C   LATCH_CNT1      =   40H         ; CMD TO LATCH CNT_1'S COUNTER.
= 0080              C   LATCH_CNT2      =   80H         ; CMD TO LATCH CNT_2'S COUNTER.
                    C   ;
                    C   ;**********************************************************
                    C   ;       COMPAQ defined failsafe timer
                    C   ;
                    C   ;       Timer 0 is gated into NMI to interrupt applications that run with
                    C   ;           interrupts disabled.
                    C   ;       Timer 1 is not defined.
                    C   ;       Timer 2 is used to put the processor in slow mode by generating
                    C   ;           lots of refresh cycles.
                    C   ;
                    C   ;**********************************************************
= 0048              C   FCNT_0          =   48H         ; 8254's COUNTER 0 I/O ADDRESS
= 0049              C   FCNT_1          =   49H         ; 8254's COUNTER 1 I/O ADDRESS
= 004A              C   FCNT_2          =   4AH         ; 8254's COUNTER 2 I/O ADDRESS
= 004B              C   FCNT_MODE       =   4BH         ; 8254's MODE REGISTER I/O ADDRESS
                    C   ;
= 0012              C   FCNT0_MODE      =   12H         ; COUNTER 0, LSB FIRST, ONE-SHOT
= 0022              C   FCNT0_SETUP     =   22H
= 0042              C   FCNT1_MODE      =   42H         ; COUNTER 1, LSB FIRST, ONE-SHOT
= 0022              C   FCNT1_SETUP     =   22H
= 0092              C   FCNT2_MODE      =   92H         ; COUNTER 2, LSB FIRST, ONE-SHOT
= 0022              C   FCNT2_SETUP     =   22H ; Local Equates
                        ;
= 00F0                  SET_SPEED       equ 0F0h        ;   set CPU speed
= 00F1                  READ_SPEED      equ 0F1h        ;   read current CPU speed
= 00F2                  GET_TYPE        equ 0F2h        ;   determine keyboard type = 0000                  KBD_11          equ 0           ;   11 bit keyboard in use
= 0001                  KBD_9           equ 1           ;   9 bit keyboard in use 0000                    ROM     segment byte public 'ROM'
                                assume  cs:ROM, ds:seg_ram400
                                page
                        ;**********************************************************
                        ;       Read character from keyboard
                        ;----------------------------------------------------------
0000                    get_key proc    near
0000  E8 0000 E                 call    chkLED          ;       update LEDs if necessary
0003                    getkey:
0003  FA                        cli                     ;;;     mask interrupts
0004  E8 0000 E                 call    chkbuf          ;;; Q:  key available?
```

```
0007  FB                            sti                           ;;;  enable interrupts
0008  75 0E                         jnz       gotkey              ;    Y: ax = key, si=si+2
000A  B8 9002                       mov       ax,9002h            ;    N: Perform keyboard Device Wait
000D  F8                            clc                           ;       default = ROM timeout
000E  CD 15                         int       15h                 ;
0010                      wait_key:
0010  FA                            cli                           ;;;  disable interrupts
0011  E8 0000 E                     call      chkbuf              ;;;  Q: key available?
0014  FB                            sti                           ;;;  enable interrupts
0015  90                            nop                           ;;;  allow interrupts to occur
0016  74 F8                         jz        wait_key            ;    N: wait for a key
                                                                  ;    Y: place key in queue
;*************************************************************************************
;         Following code performs keyboard queue wrapping
;-------------------------------------------------------------------------------------
0018                      gotkey:
0018  3B 36 0000 E                  cmp       si,[keybfbot]       ;;;  do we need to loop around?
001C  75 04                         jne       savehead            ;;;  N: leave alone
001E  8B 36 0000 E                  mov       si,[keybftop]       ;;;  Y: set to top of buffer
0022                      savehead:
0022  89 36 0000 E                  mov       [keyhead],si        ;;;  save new head pointer
0026  FB                            sti                           ;    allow interrupts
0027  C3                            ret                           ;    *** RETURN ***
                          get_key   endp
                                    page
;*************************************************************************************
;         Check status of buffer
;-------------------------------------------------------------------------------------
0028                      chk_key   proc      near
0028  E8 0000 E                     call      chkLED              ;    update kbd LEDs if necessary
002B  FA                            cli                           ;    mask interrupts
002C  E8 0000 E                     call      chkbuf              ;;;  check buffer status
002F  FB                            sti                           ;;;
0030  C3                            ret                           ;    *** RETURN ***
                          chk_key   endp ;*************************************************************************************
;         Return shift status in al register
;-------------------------------------------------------------------------------------
0031                      read_status proc    near
0031  A0 0000 E                     mov       al,[keybit1]        ;    get shift status byte
0034  C3                            ret                           ;    *** RETURN ***
                          read_status endp
                                    page ;         Return with ZF=0 if the key in ax can be converted to an older
;         compatible key scan/ascii pair with the converted key in ax.
;         Return with ZF=1 otherwise.
;
;         Algorithm is as follows:
;
;         1. If ah = 00h then return ax unmodified
;         2. If ax = e00d then ax = 1c0d
;         3. If ax = e02f then ax = 352f
;         4. If ah > 84h then cannot convert key
;         5. If al = f0h then cannot convert key
;         6. If al = e0h then al = 0
0035                      old_key   proc      near
0035  80 FC 00                      cmp       ah,0                ;    Q: ALT <num> <num> <num> key?
0038  74 23                         je        oldret              ;    Y:
003A  3D E00D                       cmp       ax,0e00dh           ;    Q: new Enter key?
003D  75 05                         jne       not_enter           ;    N:
003F  B8 1C0D                       mov       ax,1c0dh            ;    Y: convert_key
0042  EB 19                         jmp       short oldret        ;
0044                      not_enter:
0044  3D E02F                       cmp       ax,0e02fh           ;    Q: new Keypad / key?
0047  75 05                         jne       not_slash           ;    N:
0049  B8 352F                       mov       ax,352fh            ;    Y: convert key
004C  EB 0F                         jmp       short oldret        ;
004E                      not_slash:
004E  80 FC 84                      cmp       ah,84h              ;    Q: new extened code?
0051  77 0F                         ja        no_key              ;    Y: cannot convert key
0053  3C F0                         cmp       al,0F0h             ;    Q: new extended code?
0055  74 08                         je        no_key              ;    Y: cannot convert key
0057  3C E0                         cmp       al,0e0h             ;    Q: redundant keypad key?
0059  75 02                         jne       oldret              ;    N:
005B  B0 00                         mov       al,0                ;    Y: convert to old code
005D                      oldret:
005D  BE FFFF                       mov       si,-1               ;    make ZF=0
0060  EB 02                         jmp       short ret_old       ;
0062                      no_key:
0062  33 F6                         xor       si,si               ;    make ZF=1
0064                      ret_old:
0064  85 F6                         test      si,si               ;    set/reset ZF
0066  C3                            ret                           ;    *** RETURN ***
                          old_key   endp
                                    page ;         If the ASCII code is f0h, replace it with 0.
;
0067                      new_key   proc      near
```

```
0067  80 FC 00              cmp     ah,0              ;  Q: ALT <num> <num> <num> key?
0069A 74 06                 je      not_filler        ;  Y:
006C  3C F0                 cmp     al,0F0h           ;  Q: new ALT extended code?
006E  75 02                 jne     not_filler        ;  N:
0070  B0 00                 mov     al,0              ;  Y: replace f0h with 0:
0072                not_filler:
0072  C3                    ret                       ;  *** RETURN ***
                    new_key endp ;
                    ;   Return the new status information associated with the enhanced
                    ;   keyboard.
                    ;
0073                new_status proc near
0073  A0 0000 E             mov     al,keybit2        ;  get left ALT and CTRL status
0076  24 03                 and     al,3              ;  mask off other stuff
0078  8A 26 0000 E          mov     ah,enhbits        ;  get right ALT and CTRL status
007C  80 E4 0C              and     ah,0Ch            ;  mask off other stuff
007F  0A E0                 or      ah,al             ;  ah = left and right ALT and CTRL
0081  A0 0000 E             mov     al,keybit1        ;  get old shift status byte
0084  C3                    ret                       ;  *** RETURN ***
                    new_status endp
                    page
                    ;
                    ;   Set keyboard typematic rate/delay.  Send keyboard command F3
                    ;   followed by the rate/delay byte.
                    ;
0085                set_typematic proc near
0085  3C 05                 cmp     al,5              ;  Q: al is 5? (mandatory!)
0087  75 58                 jne     bad_type          ;  N: don't do function
0089  80 FF 03              cmp     bh,3              ;  Q: legal delay value?
008C  77 56                 ja      bad_type          ;  N:
008E  80 FB 1F              cmp     bl,31             ;  Q: legal rate value?
0091  77 51                 ja      bad_type          ;  N:
0093  51                    push    cx                ;  Y: protect cx
0094                kbd_wait:
0094  E8 0000 E             call    ts_kbd            ;  Q: kbd command in progress?
0097  75 FB                 jnz     kbd_wait          ;  Y: wait til finished
0099  80 26 0000 E EF       and     kbd_led,not RCVD_ACK  ;  N: reset ack received
009E  E8 0000 E             call    kbdrdy            ;  wait til 8042 is ready
00A1  B0 F3                 mov     al,0F3h           ;  get set typematic kbd command
00A3  E6 60                 out     60h,al
00A5  B9 FFFF               mov     cx,-1             ;  timeout value
00A8                getack1:
00A8  F6 06 0000 E 10       test    kbd_led,RCVD_ACK  ;  Q: received ACK?
00AD  75 08                 jnz     getack1           ;  Y:
00AF  E2 F7                 loop    getack1           ;  N: keep waiting
00B1  E8 0000 E             call    kbdrdy            ;  *** TIMEOUT ***
00B4  B0 F4                 mov     al,0F4h           ;  get kbd enable command
00B6  E6 60                 out     60h,al            ;  send it to kbd
00B8  EB 24                 jmp     short reset_ip
00BA                gotack1:
00BA  80 26 0000 E EF       and     kbd_led,not RCVD_ACK  ;  reset received ACK flag
00BF  E8 0000 E             call    kbdrdy            ;  make sure kbd ready
00C2  8A C7                 mov     al,bh             ;  get delay value
00C4  C0 E0 05              shl     al,5              ;  shift to bits 6 and 5
00C7  0A C3                 or      al,bl             ;  mask in rate value
00C9  E6 60                 out     60h,al            ;  send rate/delay value
00CB  B9 FFFF               mov     cx,-1             ;  get timeout value
00CE                getack2:
00CE  F6 06 0000 E 10       test    kbd_led,RCVD_ACK  ;  Q: received ACK?
00D3  75 09                 jnz     reset_ip          ;  Y:
00D5  E2 F7                 loop    getack2           ;  N: keep waiting
00D7  E8 0000 E             call    kbdrdy            ;  *** TIMEOUT ***
00DA  B0 F4                 mov     al,0F4h           ;  get kbd enable command
00DC  E6 60                 out     60h,al            ;  send it to kbd
00DE                reset_ip:
00DE  80 26 0000 E BF       and     kbd_led,not KCMD_IP  ;  reset kbd command in progress
00E3  59                    pop     cx                ;  restore cx
00E4                bad_type:
00E4  C3                    ret                       ;  *** RETURN ***
                    set_typematic endp
                    page
                    ;
                    ;   Place the scan code/character specified in register CH and CL,
                    ;   respectively, into the keyboard buffer.  If successful, return
                    ;   with AL = 0 and CF = 0.  If the buffer is full, return with
                    ;   AL = 1 and CF = 1.
                    ;
00E5                put_key proc near
00E5  FA                    cli                       ;;; disable interrupts
00E6  8B 36 0000 E          mov     si,keytail        ;;; get next available slot
00EA  89 0C                 mov     [si],cx           ;;; place pair in kbd_buffer
00EC  46                    inc     si                ;;; get next available slot
00ED  46                    inc     si                ;;;
00EE  3B 36 0000 E          cmp     si,keybfbot       ;;; Q: need to wrap around?
00F2  75 04                 jne     savetail          ;;; N: save new tail
00F4  8B 36 0000 E          mov     si,keybftop       ;;; Y: get new tail
00F8                savetail:
00F8  3B 36 0000 E          cmp     si,keyhead        ;;; Q: buffer was full?
00FC  74 09                 je      kbdfull           ;;; Y: don't update tail
00FE  89 36 0000 E          mov     keytail,si        ;;; N: set new tail
0102  32 C0                 xor     al,al             ;;; note success
0104  F8                    clc                       ;;;
0105  EB 03                 jmp     short put_end     ;;;
0107                kbdfull:
0107  B0 01                 mov     al,1              ;;; note failure
```

```
 0109  F9                         stc                             ;;;
 010A                      put_end:
 010A  FB                         sti                             ;;;  enable interrupts
 010B  C3                         ret                             ;    *** RETURN ***
                          put_key endp
                                  page
;*********************************************************************
;       Set the CPU speed according to the value in al
;---------------------------------------------------------------------
 010C                      set_cpu proc    near
 010C  50                         push    ax                      ;    protect ax
 010D  3C 09                      cmp     al,AUTO_                ;    Q: set AUTO speed?
 010F  74 4F                      je      set_auto                ;    Y:
 0111  3C 09                      cmp     al,COUNT_               ;    Q: set COUNT speed?
 0113  74 57                      je      set_count               ;    Y:
 0115  84 C0                      test    al,al                   ;    Q: set to common speed?
 0117  75 0E                      jne     chk_fast                ;    N:
 0119  E4 86                      in      al,SPEEDIO              ;    Y: get speed info
 011B  24 BF                      and     al,not S_BIT            ;       reset the S bit
 011D  24 C0                      and     al,not CNTMSK           ;       clear COUNT field
 011F  0C 24                      or      al,COMM_SP              ;       set COUNT to COMMON
 0121  E6 86                      out     SPEEDIO,al              ;
 0123  B4 24                      mov     ah,COMM_SP              ;       get COMMON speed count
 0125  EB 64                      jmp     short setout            ;
 0127                      chk_fast:
 0127  FE C8                      dec     al                      ;    Q: set to FAST speed?
 0129  75 0E                      jne     chk_high                ;    N:
 012B  E4 86                      in      al,SPEEDIO              ;    Y: get speed info
 012D  24 BF                      and     al,not S_BIT            ;       reset the S bit
 012F  24 C0                      and     al,not CNTMSK           ;       clear COUNT field
 0131  0C 22                      or      al,FAST_SP              ;       set COUNT to FAST
 0133  E6 86                      out     SPEEDIO,al              ;
 0135  B4 22                      mov     ah,FAST_SP              ;       get FAST speed count
 0137  EB 52                      jmp     short setout            ;
 0139                      chk_high:
 0139  FE C8                      dec     al                      ;    Q: set to HIGH speed?
 013B  75 0C                      jne     chk_toggle              ;    N:
 013D  E4 86                      in      al,SPEEDIO              ;    Y: get speed info
 013F  24 7F                      and     al,not A_BIT            ;       reset the A bit
 0141  0C 40                      or      al,S_BIT                ;       set the S bit
 0143  E6 86                      out     SPEEDIO,al              ;
 0145  B4 00                      mov     ah,HIGH_SP              ;       get HIGH speed count
 0147  EB 42                      jmp     short setout            ;
 0149                      chk_toggle:
 0149  FE C8                      dec     al                      ;    Q: toggle CPU speed?
 014B  75 53                      jne     setret                  ;    N:
 014D  E4 86                      in      al,SPEEDIO              ;    Y: get speed info
 014F  B4 00                      mov     ah,0                    ;       assume HIGH speed needed
 0151  A8 40                      test    al,S_BIT                ;    Q: already in HIGH speed?
 0153  74 05                      jz      xor_S                   ;    N: set to HIGH speed
 0155  8A E0                      mov     ah,al                   ;    Y: get COUNT value
 0157  80 E4 3F                   and     ah,CNTMSK               ;    Y: mask off A and S bits
 015A                      xor_S:
 015A  34 40                      xor     al,S_BIT                ;       toggle the S bit
 015C  E6 86                      out     SPEEDIO,al              ;
 015E  EB 2D                      jmp     short setout            ;
 0160                      set_auto:
 0160  E4 86                      in      al,SPEEDIO              ;       get speed info
 0162  24 3F                      and     al,not (A_BIT+S_BIT)    ;
 0164  0C C0                      or      al,(A_BIT+S_BIT)        ;       set the A and S bits
 0166  E6 86                      out     SPEEDIO,al              ;
 0168  B4 00                      mov     ah,HIGH_SP              ;
 016A  EB 1F                      jmp     short setout            ;       get HIGH speed count
 016C                      set_count:
 016C  83 F9 01                   cmp     cx,1                    ;    Q: cx < 1?
 016F  72 2F                      jb      setret                  ;    Y: bad COUNT, don't use
 0171  83 F9 32                   cmp     cx,50                   ;    Q: cx > 50?
 0174  77 2A                      ja      setret                  ;    Y: bad count, don't use
 0176  B8 0032                    mov     ax,50                   ;       COUNT = 50 - cx + 2
 0179  2B C1                      sub     ax,cx                   ;
 017B  40                         inc     ax                      ;
 017C  40                         inc     ax                      ;
 017D  8A E0                      mov     ah,al                   ;       ah = COUNT
 017F  E4 86                      in      al,SPEEDIO              ;       get speed info
 0181  24 BF                      and     al,not S_BIT            ;       reset the S bit
 0183  24 C0                      and     al,not CNTMSK           ;       clear COUNT field
 0185  0A C4                      or      al,ah                   ;       set COUNT to COMMON
 0187  E6 86                      out     SPEEDIO,al              ;
 0189  EB 00                      jmp     short setout            ;
 018B                      setout:
 018B  B0 92                      mov     al,92h                  ;       set timer 2 command
 018D  FA                         cli                             ;;;    disable interrupts
 018E  E6 43                      out     FCNT_MODE,al            ;;;
 0190  EB 00                      jmp     $+2                     ;;;
 0192  EB 00                      jmp     $+2                     ;;;
 0194  EB 00                      jmp     $+2                     ;;;
 0196  80 FC 00                   cmp     ah,HIGH_SP              ;;;  Q: set to HIGH speed?
 0199  74 04                      je      no_cnt                  ;;;  Y: don't set timer 2
 019B  8A C4                      mov     al,ah                   ;;;  N: get counter value
 019D  E6 4A                      out     FCNT_2,al               ;;;    set counter value
 019F                      no_cnt:
 019F  FB                         sti                             ;;;    enable interrupts
 01A0                      setret:
 01A0  58                         pop     ax                      ;      restore ax
 01A1  C3                         ret                             ;      *** RETURN ***
                          set_cpu endp
                                  page
;*********************************************************************
```

```
                              ;   Read the current CPU speed
                              ;----------------------------------------
01A2                          read_cpu   proc    near
01A2  E4 86                          in      al,SPEEDIO
01A4  A8 40                          test    al,S_BIT            ;   Q: HIGH speed?
01A6  75 1B                          jnz     S_set               ;   Y:
01A8  B4 00                          mov     ah,COMMON_          ;   N: assume COMMON speed
01AA  24 3F                          and     al,not (A_BIT+S_BIT) ;    mask off A and S bits
01AC  3C 24                          cmp     al,COMM_SP          ;   Q: COMMON speed?
01AE  74 1B                          je      retcpu              ;   Y:
01B0  B4 01                          mov     ah,FAST_            ;   N: assume FAST speed
01B2  3C 22                          cmp     al,FAST_SP          ;   Q: FAST speed?
01B4  74 15                          je      retcpu              ;   Y:
01B6  32 E4                          xor     ah,ah               ;      ax = COUNT
01B8  B9 0032                        mov     cx,50                     cx = 50 - COUNT + 2
01BB  2B C8                          sub     cx,ax
01BD  41                             inc     cx
01BE  41                             inc     cx
01BF  B4 09                          mov     ah,COUNT_           ;      return COUNT speed
01C1  EB 08                          jmp     short retcpu
01C3                          S_set:
01C3  B4 08                          mov     ah,AUTO_            ;      assume AUTO speed
01C5  A8 80                          test    al,A_BIT            ;   Q: is it AUTO speed?
01C7  75 02                          jnz     retcpu              ;   Y:
01C9  B4 02                          mov     ah,HIGH_            ;   N: must be HIGH speed
01CB                          retcpu:
01CB  8A C4                          mov     al,ah               ;      return info in al
01CD  32 E4                          xor     ah,ah               ;      return info in ax
01CF  C3                             ret                         ;   *** RETURN ***
                              read_cpu   endp
                                         page ;********************************************************
                              ;   Determine the attached keyboard
                              ;--------------------------------------------------------
01D0                          read_kbd   proc    near
01D0  E8 0000 E                       call    getbyte             ;      read COMPAQ special 8042 byte
01D3  B4 FF                           mov     ah,-1               ;   Q: 8042 timeout?
01D5  74 08                           jz      kbdout              ;   Y: return -1
01D7  B4 00                           mov     ah,KBD_11           ;   N: assume 11 bit keyboard
01D9  A8 20                           test    al,KBD_TYPE         ;   Q: 11 bit keyboard indeed?
01DB  74 02                           jz      kbdout              ;   Y:
01DD  B4 01                           mov     ah,KBD_9            ;   N: return 9 bit keyboard
01DF                          kbdout:
01DF  8A C4                           mov     al,ah               ;      al = keyboard type
01E1  32 E4                           xor     ah,ah               ;      ax = keyboard type
01E3  C3                              ret                         ;   *** RETURN ***
                              read_kbd   endp 01E4                          ROM       ends
                                        end
Macros:

N a m e                      Lines

POP_F . . . . . . . . . . . . . .        7

Segments and Groups:

N a m e                      Size   Align   Combine Class

ROM . . . . . . . . . . . . . . .      01E4   BYTE    PUBLIC  'ROM'

Symbols:

N a m e                      Type    Value   Attr

ALTKEY . . . . . . . . . . . . . .     Number  0008
AUTO_  . . . . . . . . . . . . . .     Number  0008
A_BIT  . . . . . . . . . . . . . .     Number  0080

BAD_TYPE . . . . . . . . . . . .       L NEAR  00E4    ROM

C  . . . . . . . . . . . . . . . .     Number  0001
CAPKEY . . . . . . . . . . . . . .     Number  0040
CAPSLOK  . . . . . . . . . . . . .     Number  0040
CAP_LED  . . . . . . . . . . . . .     Number  0004
CHKBUF . . . . . . . . . . . . . .     L NEAR  0000            External
CHKLED . . . . . . . . . . . . . .     L NEAR  0000            External
CHK_FAST . . . . . . . . . . . . .     L NEAR  0127    ROM
CHK_HIGH . . . . . . . . . . . . .     L NEAR  0139    ROM
CHK_KEY  . . . . . . . . . . . . .     N PROC  0028    ROM     Global  Length = 0009
CHK_TOGGLE . . . . . . . . . . . .     L NEAR  0149    ROM
CNT0_MODE  . . . . . . . . . . . .     Number  0036
CNT0_SETUP . . . . . . . . . . . .     Number  0000
CNT1_MODE  . . . . . . . . . . . .     Number  0054
CNT1_SETUP . . . . . . . . . . . .     Number  0012
CNT2_MODE  . . . . . . . . . . . .     Number  00B6
CNT2_SETUP . . . . . . . . . . . .     Number  0533
CNTMSK . . . . . . . . . . . . . .     Number  003F
CNT_0  . . . . . . . . . . . . . .     Number  0040
CNT_1  . . . . . . . . . . . . . .     Number  0041
CNT_2  . . . . . . . . . . . . . .     Number  0042
CNT_MODE . . . . . . . . . . . . .     Number  0043
COMMON_  . . . . . . . . . . . . .     Number  0000
COMM_SP  . . . . . . . . . . . . .     Number  0024
COUNT_ . . . . . . . . . . . . . .     Number  0009
CPU_HIGH . . . . . . . . . . . . .     Number  00A3
CPU_READ . . . . . . . . . . . . .     Number  00A5
CTRLKEY  . . . . . . . . . . . . .     Number  0004
```

| Symbol | Type | Value | Attr | Notes |
|---|---|---|---|---|
| ENHBITS | V BYTE | 0000 | External | |
| FNM_PRO | Number | 0010 | | |
| F0_1 | | | | |
| FAST_CPU | Number | 000C | | |
| FAST_SP | Number | 0022 | | |
| FCNT0_MODE | Number | 0012 | | |
| FCNT0_SETUP | Number | 0022 | | |
| FCNT1_MODE | Number | 0042 | | |
| FCNT1_SETUP | Number | 0022 | | |
| FCNT2_MODE | Number | 0092 | | |
| FCNT2_SETUP | Number | 0022 | | |
| FCNT_0 | Number | 0048 | | |
| FCNT_1 | Number | 0049 | | |
| FCNT_2 | Number | 004A | | |
| FCNT_MODE | Number | 004B | | |
| FIN_SETUP | Number | 0045 | | |
| F_NUM_LK | Number | 0020 | | |
| GETACK1 | L NEAR | 00A9 | ROM | |
| GETACK2 | L NEAR | 00CE | ROM | |
| GETBYTE | L NEAR | 0000 | External | |
| GETKEY | L NEAR | 0003 | ROM | |
| GET_KEY | N PROC | 0000 | ROM | Global Length = 0028 |
| GET_TYPE | Number | 00F2 | | |
| GOTACK1 | L NEAR | 00BA | ROM | |
| GOTKEY | L NEAR | 0018 | ROM | |
| GOT_E0 | Number | 0002 | | |
| GOT_E1 | Number | 0001 | | |
| HIGH_ | Number | 0002 | | |
| HIGH_CPU | Number | 0004 | | |
| HIGH_SP | Number | 0000 | | |
| I | Number | 0200 | | |
| IBMPC_SP | Number | 0031 | | |
| INIT_KSETUP | Number | 005D | | |
| INSKEY | Number | 0090 | | |
| INSRTON | Number | 0080 | | |
| IP_287 | Number | 0020 | | |
| KBDFULL | L NEAR | 0107 | ROM | |
| KBDOUT | L NEAR | 01DF | ROM | |
| KBDRDY | L NEAR | 0000 | External | |
| KBD_11 | Number | 0000 | | |
| KBD_8 | Number | 0001 | | |
| KBD_LED | V BYTE | 0000 | External | |
| KBD_TYPE | Number | 0020 | | |
| KBD_WAIT | L NEAR | 0094 | ROM | |
| KCMD_DEFAULT | Number | 00F6 | | |
| KCMD_DIAG_DUMP | Number | 00AC | | |
| KCMD_DISABLE | Number | 00AD | | |
| KCMD_DIS_KBD | Number | 00F5 | | |
| KCMD_ECHO | Number | 00EE | | |
| KCMD_ENABLE | Number | 00AE | | |
| KCMD_ENA_KBD | Number | 00F4 | | |
| KCMD_INDICATOR | Number | 00ED | | |
| KCMD_ID | Number | 00F2 | | |
| KCMD_LEDS | Number | 00ED | | |
| KCMD_NOP | Number | 00FD | | |
| KCMD_PULSE_OUT | Number | 00F0 | | |
| KCMD_RD | Number | 0020 | | |
| KCMD_RD_INPUT | Number | 00C0 | | |
| KCMD_RD_OUTPUT | Number | 00D0 | | |
| KCMD_RD_TINPUTS | Number | 00E0 | | |
| KCMD_RESEND | Number | 00FE | | |
| KCMD_RESET | Number | 00FF | | |
| KCMD_SELF_TEST | Number | 00AA | | |
| KCMD_SETTYPE | Number | 00F3 | | |
| KCMD_WT | Number | 0060 | | |
| KCMD_WT_OUTPUT | Number | 00D1 | | |
| KEYBFBEG | V WORD | 0000 | External | |
| KEYBFBOT | V WORD | 0000 | External | |
| KEYBFEND | V WORD | 0000 | External | |
| KEYBFTOP | V WORD | 0000 | External | |
| KEYBIT1 | V BYTE | 0000 | External | |
| KEYBIT2 | V BYTE | 0000 | External | |
| KEYHEAD | V WORD | 0000 | External | |
| KEYTAIL | V WORD | 0000 | External | |
| KEY_CMD | Number | 0064 | | |
| KEY_IN_BUFF | Number | 0060 | | |
| KEY_OUT_BUFF | Number | 0060 | | |
| KEY_STATUS | Number | 0064 | | |
| KEY_TEST_OK | Number | 0055 | | |
| KIN_287 | Number | 0004 | | |
| KIN_CPU_SPEED | Number | 0010 | | |
| KIN_KEY_LOCK | Number | 0090 | | |
| KIN_MANUF | Number | 0020 | | |
| KIN_P_DISPLAY | Number | 0040 | | |
| KOUT_A20 | Number | 0002 | | |
| KOUT_CLK_OUT | Number | 0040 | | |
| KOUT_CPU_RESET | Number | 0001 | | |
| KOUT_CPU_SPEED | Number | 000C | | |
| KOUT_DATA_OUT | Number | 0080 | | |
| KOUT_IN_FULL | Number | 0020 | | |
| KOUT_OUT_FULL | Number | 0010 | | |
| KSTAT_CMD_DATA | Number | 0008 | | |
| KSTAT_INHIBIT | Number | 0010 | | |
| KSTAT_IN_FULL | Number | 0002 | | |

| Symbol | Type | Value | Location | Notes |
|---|---|---|---|---|
| KSTAT_OUT_FULL | | 0001 | | |
| KSTAT_P_ERROR | Number | 0080 | | |
| KSTAT_RTO | Number | 0040 | | |
| KSTAT_SYS_FLAG | Number | 0004 | | |
| KSTAT_TTO | Number | 0020 | | |
| K_CPU_FAST | Number | 000C | | |
| K_CPU_HIGH | Number | 0004 | | |
| K_CPU_SLOW | Number | 0008 | | |
| LATCH_CNT0 | Number | 0000 | | |
| LATCH_CNT1 | Number | 0040 | | |
| LATCH_CNT2 | Number | 0080 | | |
| LATCH | | | | |
| LEFTCTRL | Number | 0001 | | |
| LEFTSHF | Number | 0002 | | |
| NEW_KEY | N PROC | 0067 | ROM | Global Length = 000C |
| NEW_STATUS | N PROC | 0073 | ROM | Global Length = 0012 |
| NOT_ENTER | L NEAR | 0044 | ROM | |
| NOT_FILLER | L NEAR | 0072 | ROM | |
| NOT_SLASH | L NEAR | 004E | ROM | |
| NO_CNT | L NEAR | 019F | ROM | |
| NO_KEY | L NEAR | 0062 | ROM | |
| NUMKEY | Number | 0020 | | |
| NUMLOCK | Number | 0020 | | |
| NUM_LED | Number | 0002 | | |
| OLDRET | L NEAR | 005D | ROM | |
| OLD_KEY | N PROC | 0035 | ROM | Global Length = 0032 |
| PUT_END | L NEAR | 010A | ROM | |
| PUT_KEY | N PROC | 00E5 | ROM | Global Length = 0027 |
| RAM400 | V WORD | 0000 | | External |
| RCVD_ACK | Number | 0010 | | |
| READ_CPU | N PROC | 01A2 | ROM | Global Length = 002E |
| READ_KBD | N PROC | 01D0 | ROM | Global Length = 0014 |
| READ_SPEED | Number | 00F1 | | |
| READ_STATUS | N PROC | 0031 | ROM | Global Length = 0004 |
| RESET_IP | L NEAR | 00DE | ROM | |
| RETCPU | L NEAR | 01CB | ROM | |
| RET_OLD | L NEAR | 0064 | ROM | |
| RID_1ST | Number | 0040 | | |
| RID_IP | Number | 0080 | | |
| RIDTALT | Number | 0008 | | |
| RIGTCTRL | Number | 0004 | | |
| RIGTSHF | Number | 0001 | | |
| S | Number | 0080 | | |
| SAVEHEAD | L NEAR | 0022 | ROM | |
| SAVETAIL | L NEAR | 00F8 | ROM | |
| SCRLKEY | Number | 0010 | | |
| SCRLOCK | Number | 0010 | | |
| SCRL_LED | Number | 0001 | | |
| SETOUT | L NEAR | 0189 | ROM | |
| SETRET | L NEAR | 01A0 | ROM | |
| SET_AUTO | L NEAR | 0160 | ROM | |
| SET_COUNT | L NEAR | 016C | ROM | |
| SET_CPU | N PROC | 010C | ROM | Global Length = 0096 |
| SET_SPEED | Number | 00F0 | | |
| SET_TYPEMATIC | N PROC | 0085 | ROM | Global Length = 0060 |
| SLOW_CPU | Number | 0008 | | |
| SPEEDIO | Number | 008A | | |
| SYSREQ | Number | 0004 | | |
| S_BIT | Number | 0040 | | |
| S_SET | | | ROM | |
| TOGGLE_ | Number | 0003 | | |
| TS_KBD | L NEAR | 0000 | | External |
| WAIT_KEY | L NEAR | 0010 | ROM | |
| WOWKEY | Number | 0008 | | |
| XOR_S | L NEAR | 015A | ROM | |
| Z | Number | 0040 | | |

```
678 Source  Lines
682 Total   Lines
214 Symbols

44390 Bytes symbol space free

0 Warning Errors
 0 Severe  Errors
```

APPENDIX O

TIMER SOURCE CODE

```
;****************************************************************************
;
;    Name:     TIMER - Hardware Timer Interrupt  INT 8
;
;    Group:    ROM
;
```

```
;   Revision:   A
;
;   Date:       May 25, 1986
;
;   Author:     Lance Pontiff
;
;****************************************************************
;
;   CHANGES:
;
;     DATE        REVISION              DESCRIPTION
;     --------    --------    ---------------------------------------
;     01/28/85    original    Adapted from DeskPro Rev E ROM.
;
;****************************************************************
;
;   FUNCTIONAL DESCRIPTION:
;
;       Hardware timer interrupt routine.  Interrupts about 18.2 times
;       per second.
;               Increments 32 bit timer counter (timems, timels)
;               If counter = 1800b0h then resets to zero and sets
;                       timerol to 1 to indicate 24 passed
;               Check floppy motor time out counter.  If counted down
;                       to zero turns off motor drive
;               Enables 8259a interrupt controller again
;               Does timer tick int 1ch for user routine
;               Returns from interrupt
;
;       Since the user could put a long program in, interrupts
;       are enabled thus using the 8259a
;
;**************************************************************** page
;
;   Publics
;
        public  _timer              ;   system timer interrupt entry
;
;   Externals
;
        extrn   ram400:word         ;   ram segment
        extrn   timels:word         ;   low word of timer count
        extrn   timems:word         ;   high word of timer count
        extrn   timerol:byte        ;   timer rolled past 24 hrs if 1
        extrn   timeout:byte        ;   disk motor timeout
        extrn   motor:byte          ;   disk motor status
;
;   Equates
;
        include pic_def.equ         ;   8259a PIC equates
        include disk_def.equ        ;   765-related equates
        include key_def.equ
        include cnt_def.equ page page
;****************************************************************
;
;       Call interrupt 1c which points to a dummy interrupt return if
;       the user has not specified a subroutine to be called periodically.
;
;       Unwind interrrupt controller before we call user routine
;****************************************************************
.ointlc:
;
; Perform INT 1CH, send EOI to PIC, last restore stack to original state. (glb)

int     1ch                 ;;; go to user timer routine mov     al,EOI              ;;; reset master interrupt chip
        out     PIC1_CMD,al         ;;;

pop     dx                  ;;; restore used registers
```

```
        pop     ax                      ;;;
        pop     ds                      ;;;

iret                            ;;;     *** RETURN ***

;************************************************************************
;       S Y S T E M   T I M E R   I N T E R R U P T   E N T R Y   P O I N T
;------------------------------------------------------------------------

;       This interrupt occurs 18.2 times per second
;
timer   proc    far
        push    ds                      ;;;     Push registers this order
        push    ax                      ;;;     save used registers
        push    dx                      ;;;

mov     ax,seg ram400           ;;;     load ds to point to ram area
        mov     ds,ax                   ;;;
;************************************************************************
;       Increment the 32 bit counter
;************************************************************************
        inc     [timels]                ;;; Q:  bump the 1s word, rollover?
        jnz     chk24                   ;;;  N: branch to 24 hour check
        inc     [timems]                ;;;  Y: ripple carry
chk24:
        cmp     [timems],18h            ;;; Q:  reached 24 hour count 1800b0h?
        jnz     chkdisk                 ;;;  N: branch if not at 24 hour count
        mov     ax,00b0h                ;;;  Y: prepare to compare
        sub     ax,[timels]             ;;; Q:  high reached?
        jnz     chkdisk                 ;;;  N: branch if not at 24 hour count
                                        ;;;  Y: count reached 1800b0h 24 hours
        mov     [timels],ax             ;;;     reset 32 bit counter
        mov     [timems],ax             ;;;
        inc     ax                      ;;;     ax=1
        mov     [timerol],al            ;;;     set 24 hour flag
;************************************************************************
;       Check if disk motors running
;************************************************************************
chkdisk:
        mov     al,[timeout]            ;;;     get timeout count
        cmp     al,-1                   ;;; Q:  max count?
        jne     check_to                ;;;  N: check for timeout
        test    [motor],7               ;;; Q:  any motors running?
        jz      check_to                ;;;  N:
        in      al,SPEEDIO
        test    al,A_BIT                ;;; Q:  AUTO bit set?
        jz      check_to                ;;;  N: don't slow CPU down
        test    al,S_BIT                ;;; Q:  CPU in HIGH speed?
        jz      check_to                ;;;  N:
        mov     al,92h                  ;;;  Y: set CPU to FAST speed
        out     FCNT_MODE,al            ;;;
        jmp     $+2                     ;;;
        jmp     $+2                     ;;;
        jmp     $+2                     ;;;
        mov     al,FAST_SP              ;;;     get FAST speed count
        out     FCNT_2,al               ;;;
check_to:
        dec     [timeout]               ;;; Q:  disk timeout?
        jnz     gointlc                 ;;;  N:
        mov     al,MOTOR_OFF_DA         ;;;  Y: turn off motors, leave dma on
        mov     dx,DIGOUTREG            ;;;
        out     dx,al                   ;;;
        test    [motor],7               ;;; Q:  any motors running?
        jz      mtroff                  ;;;  N:
        in      al,SPEEDIO              ;;;  Y: get speed information
        test    al,A_BIT                ;;; Q:  AUTO bit set?
        jz      mtroff                  ;;;  N: don't slow CPU down
        test    al,S_BIT                ;;; Q:  CPU in HIGH speed?
        jz      mtroff                  ;;;  N:
        mov     al,92h                  ;;;  Y: set CPU to HIGH speed
        out     FCNT_MODE,al            ;;;
mtroff:
        and     [motor],0f0h            ;;;     turn off motor status bits
        jmp     gointlc
timer   endp
```

```
;OM     ends
        end
.AGE    55,132
;*********************************************************************
;TITLE   MODE_SPE (C)Copyright COMPAQ Computer Corporation 1983,84,85,86
;*********************************************************************
;
;   Title:      MODE - COMPAQ DOS 3.1
;
;   Module:     MODE_SPE
;
;   Version:    3.10
;
;   Date:       MARCH 8, 1985
;
;   Author:     Randy Spurlock
;               (From V2.10 by Caldwell Crosswy)
;
;*********************************************************************
;   CHANGES:
;
;       DATE        REVISION        DESCRIPTION
;       --------    --------        -----------------------------------
;       03/08/85    Original
;       06/05/86    3.10            EGH - Added 386 speed commands
;*********************************************************************
;   Functional Description:
;
;   This module handles the speed options of the MODE utility. This module
;   is called when the main module determines that the speed option format
;   has been selected.
;*********************************************************************
        SUBTTL  Code Segment
        PAGE
;*********************************************************************
;               Define the Code Segment for this module               ;
;---------------------------------------------------------------------;
CODE    SEGMENT BYTE PUBLIC 'CODE'
        ASSUME  CS:CODE,DS:CODE,ES:CODE,SS:CODE
        SUBTTL  Include Files
        PAGE
;---------------------------------------------------------------------;
;               Process any Include Files needed by this module       ;
;---------------------------------------------------------------------;
INCLUDE BIOS.MAC                        ;Include BIOS macros
INCLUDE DOS.EQU                         ;Include DOS equates
INCLUDE DOS.MAC                         ;Include DOS macros
INCLUDE MODE.EQU                        ;Include MODE equates
INCLUDE MODE.MAC                        ;Include MODE macros
        SUBTTL  Internals/Externals
        PAGE
;---------------------------------------------------------------------;
;               Define any Internals/Externals needed by this module  ;
;---------------------------------------------------------------------;
        PUBLIC  MODE_SPE                ;SPEED options(MODE_SPE)
        EXTRN   GET_PARM:NEAR           ;Get parameter routine
        EXTRN   MATCH:NEAR              ;Match string routine
        EXTRN   ASC_BIN:NEAR            ;ASCII to binary routine
        EXTRN   BIN_ASC:NEAR            ;Binary to ASCII routine
        EXTRN   MOV_BLK:NEAR            ;Move block routine
        EXTRN   DISPLAY:NEAR            ;Message display routine
        EXTRN   DEL_TAB_4:WORD          ;Delimiter table offset
        EXTRN   COMMAND_LINE:WORD       ;Command line area
        EXTRN   PARAMETER:WORD          ;Parameter storage area
        EXTRN   SPE_SIZE:ABS            ;Speed table entry size
        EXTRN   SPE_TABLE:NEAR          ;Speed string table
        EXTRN   SPD_TABLE:WORD          ;Speed value table
        EXTRN   STR_TABLE:WORD          ;Speed string table
        EXTRN   SPE_LENGTH:ABS          ;Speed string length
        EXTRN   MACHINE_TYPE:BYTE       ;Machine type byte
        EXTRN   INVALID_PARMS:WORD      ;Invalid parameters msg.
        EXTRN   SPEED_MSG:WORD          ;Speed setting msg.
        EXTRN   SPEED_STRING:WORD       ;Speed offset in msg.
        SUBTTL  Equates
        PAGE
```

```
;----------------------------------------------------------------;
;          Define any special equates needed by this module      ;
;----------------------------------------------------------------;
  OM              EQU     00H             ;Common speed value
  AS              EQU     01H             ;Fast speed value
  IG              EQU     02H             ;High speed value
  IT              EQU     08H             ;Auto speed value
  ET              EQU     09H             ;Set speed value
  ET_SPEED        EQU     0F0H            ;Set speed func. code
  IT_SPEED        EQU     0F1H            ;Get speed func. code
  URBO_IN_PORT    EQU     062H            ;Turbo input port addr.
 URBO_OUT_PORT    EQU     0CFH            ;Turbo output port addr.
  PEED_MASK       EQU     01H             ;Speed bit mask value
  PE_MIN          EQU     01              ;Minimum 386 speed value
  PE_MAX          EQU     50              ;Maximum 386 speed value DE_SPE          PROC    NEAR            ;Define the entry point
        TEST    DS:[MACHINE_TYPE],COMPAQ  ;Check for a COMPAQ
        JNZ     TYPE_CHECK                ;Jump if a COMPAQ type
        JMP     SPE_RETURN                ;Go return if not COMPAQ YPE_CHECK        LABEL   NEAR            ;Here to check type
        TEST    DS:[MACHINE_TYPE],PORT_PLUS ;Check for a portable/plus
        JZ      CONT_SPEED                ;Jump if not portable/plus
        JMP     SPE_RETURN                ;Invalid type, go return ONT_SPEED       LABEL   NEAR            ;Here to continue speed
        MOV     AL,PARM_TERM              ;Get parm. terminator
        MOV     AH,BUFF_TERM              ;Get buffer terminator
        MOV     BX,OFFSET DEL_TAB_4       ;Get delimiter table
        MOV     CL,PARM_SIZE              ;Get buffer size
        XOR     CH,CH                     ;Use the buffer size
        XOR     DX,DX                     ;Zero starting offset
        MOV     SI,OFFSET COMMAND_LINE    ;Get input offset
        MOV     DI,OFFSET PARAMETER       ;Get parameter offset
        CALL    GET_PARM                  ;Try to get a parameter
        JC      INVALID                   ;Jump if no parameters MOV     AL,PARM_TERM              ;Get parm. terminator
        MOV     AH,BUFF_TERM              ;Get buffer terminator
        CALL    GET_PARM                  ;Try to get a parameter
        JC      SHOW_SPEED                ;Go get speed if none TEST    AL,AL                     ;Check for a null parm.
        JNZ     SPE_CHK                   ;Jump if not null parm.
        MOV     AL,PARM_TERM              ;Get parm. terminator
        MOV     AH,BUFF_TERM              ;Get buffer terminator
        CALL    GET_PARM                  ;Try to get actual parm.
        JC      SHOW_SPEED                ;Jump if no parameters OR      AL,AL                     ;Check for null parm.
        JZ      INVALID                   ;Jump if null entered PE_CHK           LABEL   NEAR            ;Here to check speed
        MOV     AH,SPE_SIZE               ;Get speed table size
        MOV     AL,PARM_TERM              ;Get parm. terminator
        MOV     SI,OFFSET SPE_TABLE       ;Get speed table offset
        CALL    MATCH                     ;Check for a match
        JNC     SET_SPD                   ;Go set speed MOV     SI,OFFSET PARAMETER       ;Get parameter offset
        MOV     AL,PARM_TERM              ;Get parameter term.
        CALL    ASC_BIN                   ;Convert the parameter
        JC      INVALID                   ;Jump if non-numeric CMP     AX,SPE_MIN                ;Check against minimum
        JB      INVALID                   ;Jump if below minimum
        CMP     AX,SPE_MAX                ;Check against maximum
        JA      INVALID                   ;Jump if above maximum CBW                               ;Extend AL to AX
        MOV     CX,AX                     ;Put speed value into CX
        MOV     AL,4                      ;Set speed match SET_SPD           LABEL   NEAR            ;Here to set speed
        CBW                               ;Extend AL to AX
```

```
        MOV       BX,AX                      ;Move AX to BX
;
        TEST      DS:[MACHINE_TYPE],DESKPRO  ;Check for a deskpro
        JZ        SPC_SPEED                  ;Jump if not a deskpro
;
STD_SPEED         LABEL    NEAR              ;Here for deskpro type
        CMP       AL,FAS                     ;Check for fast speed
        JG        SPE_RETURN                 ;Jump if greater than fast
;
        MOV       AL,BYTE PTR DS:[SPD_TABLE+BX]
        OUT       TURBO_OUT_PORT,AL          ;Set the requested speed
        JMP       SHORT SPE_RETURN           ;Go return to caller SPC_SPEED        LABEL    NEAR              ;Here for magnum type
        TEST      DS:[MACHINE_TYPE],LIGHTNING;Check for a lightning
        JNZ       SET_SPC                    ;Jump if lightning
        CMP       AL,HIG                     ;Check for high speed
        JG        SPE_RETURN                 ;Jump if greater than high
;
SET_SPC           LABEL    NEAR
        MOV       AL,BYTE PTR DS:[SPD_TABLE+BX]
        MOV       AH,SET_SPEED               ;Get set speed code
        KEYBOARD                             ;Set the requested speed
        JMP       SHORT SPE_RETURN           ;Go return to caller
;
INVALID           LABEL    NEAR              ;Here if invalid parameters
        MOV       DX,OFFSET INVALID_PARMS    ;Get error msg. offset
        CALL      DISPLAY                    ;Display the error msg.
        JMP       SHORT SPE_RETURN           ;Go return to caller HOW_SPEED         LABEL    NEAR              ;Here to get speed
        TEST      DS:[MACHINE_TYPE],DESKPRO  ;Check for a deskpro
        JZ        SPC_GET                    ;Jump if not a deskpro STD_GET           LABEL    NEAR              ;Here for a deskpro
        IN        AL,TURBO_IN_PORT           ;Input status byte
        AND       AL,SPEED_MASK              ;Mask off all but speed
        JMP       SHORT GET_STR              ;Go get speed string
;
SPC_GET           LABEL    NEAR              ;Here for a magnum
        MOV       AH,GET_SPEED               ;Get speed function code
        KEYBOARD                             ;Get current speed
        CMP       AL,SET                     ;Set speed value?
        JNE       GET_STR                    ;Go get string
        CALL      BIN_ASC                    ;Convert value to ASCII
        XCHG      AL,AH                      ;Exchange digits
        MOV       DI,OFFSET SPEED_STRING     ;Get offset into msg.
        STOSW                                ;Store value in message
        JMP       SHORT DIS_SPEED            ;Go display speed
GET_STR           LABEL    NEAR              ;Here to get speed str.
        SHL       AL,1                       ;Shift for index value
        CBW                                  ;Extend to a full word
        MOV       BX,AX                      ;Move index to BX reg.
        MOV       SI,DS:[STR_TABLE+BX]       ;Get pointer to speed
        MOV       AX,SPE_LENGTH              ;Get speed msg. length
        XCHG      AL,AH                      ;Put length in AH
        MOV       DI,OFFSET SPEED_STRING     ;Get offset into msg.
        CALL      MOV_BLK                    ;Move speed to message DIS_SPEED         LABEL    NEAR              ;Here to display speed
        MOV       DX,OFFSET SPEED_MSG        ;Get speed msg. offset
        CALL      DISPLAY                    ;Display the message SPE_RETURN        LABEL    NEAR              ;Here to return
        RET                                  ;Return to the caller MODE_SPE          ENDP                       ;End of MODE_SPE proc.
CODE              ENDS                       ;End of the code segment
                  END                        ;End of mode_spe module
```

```
; Name:     TIMER - Hardware Timer Interrupt  INT 8
;
; Group:    ROM
;
; Revision: A
;
; Date:     May 25, 1986
;
; Author:   Lance Pontiff
;
;************************************************************************
;
; CHANGES:
;
;   DATE      REVISION        DESCRIPTION
;
;   01/28/85  original        Adapted from DeskPro Rev E ROM.
;
;************************************************************************
;
; FUNCTIONAL DESCRIPTION:
;
;       Hardware timer interrupt routine.  Interrupts about 18.2 times
;       per second.
;       Increments 32 bit timer counter (timems, timels).
;       If counter = 1800b0h then resets to zero and sets
;               timerol to 1 to indicate 24 passed
;       Check floppy motor time out counter.  If counted down
;               to zero turns off motor drive
;       Enables 8259a interrupt controller again
;       Does timer_tick int 1ch for user routine
;       Returns from interrupt
;
;       Since the user could put a long program in, interrupts
;       are enabled thus using the 8259a
;
;************************************************************************
        page
;
; Publics
;
        public  _timer          ; system timer interrupt entry
;
; Externals
;
        extrn   ram400:word     ; ram segment
        extrn   timels:word     ; low word of timer count
        extrn   timems:word     ; high word of timer count
        extrn   timerol:byte    ; timer rolled past 24 hrs if 1
        extrn   timeout:byte    ; disk motor timeout
        extrn   motor:byte      ; disk motor status
;
; Equates
;
        include pic_def.equ     ; 8259a PIC equates
;************************************************************************
;       8259 programmable interrupt controllers
;************************************************************************
;
;       Master interrupt controller parameters
;
PIC1_CMD        =       20H     ; 8259A command register.
PIC1_INIT       =       21H     ; 8259A initialization register.
PIC1_STAT       =       20H     ; 8259A status (who interrupted)
PIC1_MASK       =       21H     ; 8259A operation control word #1.

PIC1_ICW1_VAL   =       11H     ; Edge trig, 8 interval, cascade, ICW4.
PIC1_ICW2_VAL   =       08H     ; Interrupt vector address.
PIC1_ICW3_VAL   =       04H     ; Slave id.
PIC1_ICW4_VAL   =       01H     ; 8086 mode, norm EOI, non-buf, no nest.

;       Slave interrupt controller parameters

PIC2_CMD        =       0A0H    ; 8259A command register.
PIC2_INIT       =       0A1H    ; 8259A initialization register.
PIC2_STAT       =       0A0H    ; 8259A status (who interrupted)
PIC2_MASK       =       0A1H    ; 8259A operation control word #1.

PIC2_ICW1_VAL   =       11H     ; Edge trig, 8 interval, cascade, ICW4.
PIC2_ICW2_VAL   =       70H     ; Interrupt vector address.
PIC2_ICW3_VAL   =       02H     ; Master id.
PIC2_ICW4_VAL   =       01H     ; 8086 mode, norm EOI, non-buf, no nest.

MASK_DISABLE    =       0FFH    ; Mask register, no levels allowed.
READ_ISR        =       0BH     ; Command to read PIC In-Service-Reg.
EOI             =       20H     ; End-Of-Interrupt (non-specific).

IRQ0_ENABLE     =       11111110B ; Mask to enable IRQ0.
IRQ1_ENABLE     =       11111101B ; Mask to enable IRQ1.
IRQ2_ENABLE     =       11111011B ; Mask to enable IRQ2.
IRQ3_ENABLE     =       11110111B ; Mask to enable IRQ3.

IRQ4_ENABLE     =       11101111B ; Mask to enable IRQ4.
IRQ5_ENABLE     =       11011111B ; Mask to enable IRQ5.
IRQ6_ENABLE     =       10111111B ; Mask to enable IRQ6.
IRQ7_ENABLE     =       01111111B ; Mask to enable IRQ7.

IRQ8_ENABLE     =       11111110B ; Mask to enable IRQ8.
IRQ9_ENABLE     =       11111101B ; Mask to enable IRQ9.
IRQ10_ENABLE    =       11111011B ; Mask to enable IRQ10.
```

```
= 00F7          C   IRQ11_ENABLE    =   11110111B       ; Mask to enable IRQ11.
= 00EF          C   IRQ12_ENABLE    =   11101111B       ; Mask to enable IRQ12.
= 00DE          C   IRQ13_ENABLE    =   11011111B       ; Mask to enable IRQ13.
= 00BF          C   IRQ14_ENABLE    =   10111111B       ; Mask to enable IRQ14.
= 007F          C   IRQ15_ENABLE    =   01111111B       ; Mask to enable IRQ15.
                C   ;
                C           include disk_def.equ        ;       765-related equates
                C   ;***************************************************************
                C   ;           765_(18272)_disk_controller
                C   ;***************************************************************
                C   ;
= 03F2          C   DIGOUTREG       =   03f2h           ; Digital output register's i/o address
= 03F7          C   DIGINREG        =   03f7h           ; Digital input register's i/o address
= 0080          C   DSKCHG          =   80h             ; Change line - ms bit of diginreg
= 03F4          C   SREG765         =   03f4h           ; 765's status register i/o address
= 03F5          C   DREG765         =   03f5h           ; 765's data register i/o address
= 0080          C   MULTI_TRACK     =   80h             ; Increment to next track bit
= 0000          C   RESET           =   00h             ; Reset the 765 device
= 000C          C   NOT_RESET       =   0ch             ; Release reset
= 000C          C   MOTOR_OFF_DA    =   0ch             ; Motors off, enable dma+int, sel drv a
= 001C          C   MOTOR_ON        =   1ch             ; Turn the drive motor on
= 03F2          C   DISKSEL         =   03f2h           ; Disk select register
                C   ;
                C           include key_def.equ         ;
                C   ;
                C   ;       Equates for 8042 keyboard controller.
                C   ;
= 0064          C   KEY_STATUS      =   64H             ; 8042 status registers (read-only).
= 0060          C   KEY_OUT_BUFF    =   60H             ; 8042 output buffer (read-only).
= 0060          C   KEY_IN_BUFF     =   60H             ; 8042 input buffer (write-only).
= 0064          C   KEY_CMD         =   64H             ; 8042 command register.
                C   ;
                C   ;       Equates_for_KEY_CMD
                C   ;
= 0020          C   KCMD_RD         =   20H             ; Read 8042 command byte.
= 0060          C   KCMD_WT         =   60H             ; Next byte is a command.
= 00AA          C   KCMD_SELF_TEST  =   0AAH            ; Keyboard self test command.
= 00AB          C   KCMD_INTF_TEST  =   0ABH            ; Keyboard interface test.
= 00AC          C   KCMD_DIAG_DUMP  =   0ACH            ; Keyboard diagnostic dump.
= 00AD          C   KCMD_DISABLE    =   0ADH            ; Disable keyboard command.
= 00AE          C   KCMD_ENABLE     =   0AEH            ; Enable keyboard command.
= 00C0          C   KCMD_RD_INPUT   =   0C0H            ; Read keyboard input port.
= 00D0          C   KCMD_RD_OUTPUT  =   0D0H            ; Read keyboard output port.
= 00D1          C   KCMD_WT_OUTPUT  =   0D1H            ; Write keyboard output port.
= 00E0          C   KCMD_RD_T_INPUTS =  0E0H            ; Read keyboard T inputs.
= 00F0          C   KCMD_RD_T_OUT   =   0F0H            ; Gate output port.
                C   ;
                C   ;       Keyboard Commands
                C   ;
= 00FF          C   KCMD_RESET      =   0FFH            ; Reset keyboard.
= 00FE          C   KCMD_RESEND     =   0FEH            ; Resend transmission.
= 00FD          C   KCMD_NOP        =   0FDH            ; NOP.
= 00F6          C   KCMD_DEFAULT    =   0F6H            ; Set default values.
= 00F5          C   KCMD_DIS_KBD    =   0F5H            ; Disable keyboard.
= 00F4          C   KCMD_ENA_KBD    =   0F4H            ; Enable keyboard.
= 00F3          C   KCMD_SETTYPE    =   0F3H            ; Set typematic rate.
= 00EE          C   KCMD_ECHO       =   0EEH            ; Echo characters.
= 00ED          C   KCMD_LEDS       =   0EDH            ; Reset mode LED's.
                C   ;
                C   ;       Below are special commands for the COMPAQ 8042.
                C   ;       These 8042 commands are not IBM AT compatible.
                C   ;
= 00A3          C   CPU_HIGH        =   0A3H            ; Enable 386 CPU speed variation
= 00A5          C   CPU_READ        =   0A5H            ; Read CPU speed and attached keyboard
                C   ;
                C   ;       When the special COMPAQ 8042 command "CPU READ" above is
                C   ;       issued to the 8042, a byte of information with the definitions
                C   ;       below is returned. All other bit positions are undefined.
                C   ;
= 0004          C   HIGH_CPU        =   00000100B       ; CPU currently set to high speed
= 0008          C   SLOW_CPU        =   00001000B       ; CPU currently set to slow speed
= 000C          C   FAST_CPU        =   00001100B       ; CPU currently set to fast speed
= 0020          C   KBD_TYPE        =   00100000B       ; 0/1 - 11 bit keyboard/8bit keyboard
                C   ;
                C   ;       Below are the count values used to regulate the 386 CPU speed.
                C   ;
= 0024          C   COMM_SP         =   24h             ; COMMON speed count value - 286/6  MHz
= 0022          C   FAST_SP         =   22h             ; FAST speed count value   - 286/8  MHz
= 0000          C   HIGH_SP         =   00h             ; HIGH speed count value   - 386/16 MHz
= 0031          C   IBMPC_SP        =   31h             ; approximate PC speed
                C   ;
                C   ;       Below are defines to represent the various 386 speeds.
                C   ;
= 0000          C   COMMON_         =   0
= 0001          C   FAST_           =   1
= 0002          C   HIGH_           =   2
= 0003          C   TOGGLE_         =   3
= 0008          C   AUTO_           =   8
= 0009          C   COUNT_          =   9
                C   ;
                C   ;       DMA page 86h is used to maintain the current values of the AUTO bit,
                C   ;       SPEED bit, and the COUNT value as defined below.
                C   ;
= 0086          C   SPEEDIO         =   86h
= 0080          C   A_BIT           =   10000000b
= 0040          C   S_BIT           =   01000000b
= 003F          C   CBITS           =   00111111b
                ;
                ;       Initial 8042 command setup
                ;
```

```
= 0050          C   INIT_KSETUP   =   05DH            ; PC compatible, disable kbd,
                C                                     ; Inhibit override, system flag,
                C                                     ; enable output buffer interrupt.
= 0045          C   FIN_SETUP     =   045H            ; Do not override key lock.
                C ;
= 0055          C   KEY_TEST_OK   =   055H            ; Successful self test response.
                C ;
                C ;      Equates for KEY_STATUS
                C ;
= 0001          C   KSTAT_OUT_FULL  =  00000001B      ; 8042 output buffer full.
= 0002          C   KSTAT_IN_FULL   =  00000010B      ; 8042 input buffer full.
= 0004          C   KSTAT_SYS_FLAG  =  00000100B      ; 8042 system flag.
= 0008          C   KSTAT_CMD_DATA  =  00001000B      ; 8042 cmd or data mode.
= 0010          C   KSTAT_INHIBIT   =  00010000B      ; 8042 keyboard inhibit flag.
= 0020          C   KSTAT_TTO       =  00100000B      ; 8042 transmit time out.
= 0040          C   KSTAT_RTO       =  01000000B      ; 8042 receive time out.
= 0080          C   KSTAT_P_ERROR   =  10000000B      ; 8042 parity error.
                C ;
                C ;      Equates for KEY_INPUT
                C ;
= 0080          C   KIN_KEY_LOCK   =   10000000B      ; Keyboard lock switch.
= 0040          C   KIN_P_DISPLAY  =   01000000B      ; Primary display.
= 0020          C   KIN_MANUF      =   00100000B      ; Manufacturing jumper.
= 0010          C   KIN_CPU_SPEED  =   00010000B      ; CPU speed 0=AUTO 1=HIGH
= 0004          C   KIN_287        =   00000100B      ; 287 present 0=TRUE 1=FALSE
                C ;
                C ;      Equates for KEY_OUTPUT
                C ;
= 0001          C   KOUT_CPU_RESET =   00000001B      ; CPU reset.
= 0002          C   KOUT_A20       =   00000010B      ; A20 output.
= 000C          C   KOUT_CPU_SPEED =   00001100B      ; CPU speed - x0=slow 01=high 11=fast
= 0010          C   KOUT_OUT_FULL  =   00010000B      ; Output buffer full.
= 0020          C   KOUT_IN_FULL   =   00100000B      ; Input buffer full.
= 0040          C   KOUT_CLK_OUT   =   01000000B      ; Keyboard output clock.
= 0080          C   KOUT_DATA_OUT  =   10000000B      ; Keyboard data output.
                C ;
= 0004          C   K_CPU_HIGH     =   00000100B      ; High CPU speed
= 0008          C   K_CPU_SLOW     =   00001000B      ; Slow CPU speed
= 000C          C   K_CPU_FAST     =   00001100B      ; Fast CPU speed
                C ;
                C ;   Input for KEYBIT1 keyboard variable in RAM 40:17
                C ;
= 0080          C   INSRTON        =   80H            ;INS         MODE IN EFFECT
= 0040          C   CAPSLOK        =   40H            ;CAPS_LOCK   MODE IN EFFECT
= 0020          C   NUMLOCK        =   20H            ;NUM_LOCK    MODE IN EFFECT
= 0010          C   SCRLOCK        =   10H            ;SCROLL_LOCK MODE IN EFFECT
= 0008          C   ALTKEY         =   08H            ;ALT         KEY BEING HELD DOWN
= 0004          C   CTRLKEY        =   04H            ;CTRL        KEY BEING HELD DOWN
= 0002          C   LEFTSHF        =   02H            ;LEFT SHIFT  KEY BEING HELD DOWN
= 0001          C   RIGTSHF        =   01H            ;RIGHT SHIFT KEY BEING HELD DOWN
                C ;
                C ;   Input for KEYBIT2 keyboard variable in RAM 40:18
                C ;
= 0040          C   CAPKEY         =   40H            ;CAPS_LOCK   KEY BEING HELD DOWN
= 0020          C   NUMKEY         =   20H            ;NUM_LOCK    KEY BEING HELD DOWN
= 0010          C   SCRLKEY        =   10H            ;SCROLL_LOCK KEY BEING HELD DOWN
= 0008          C   WOWKEY         =   08H            ;CTRL+NUM_LOCK MODE IN EFFECT
= 0004          C   SYSREQ         =   04H            ;SYS REQ     KEY BEING HELD DOWN
= 0002          C   LEFTALT        =   02H            ;LEFT ALT    KEY IS DOWN
= 0001          C   LEFTCTRL       =   01H            ;LEFT CTRL   KEY IS DOWN
                C ;
                C ;      Bit definitions for ENHBITS variable in RAM 40:96
                C ;
= 0080          C   RID_IP         =   80H            ;READ ID IN PROGRESS
= 0040          C   RID_1ST        =   40H            ;RECEIVED FIRST ID BYTE
= 0020          C   F_NUM_LK       =   20H            ;FORCE NUM LOCK ON
= 0010          C   ENH_KBD        =   10H            ;ENHANCED KEYBOARD IS INSTALLED
= 0008          C   RIGTALT        =   08H            ;RIGHT ALT KEY IS DOWN
= 0004          C   RIGTCTRL       =   04H            ;RIGHT CTRL KEY IS DOWN
= 0002          C   GOT_E0         =   02H            ;LAST CODE WAS 'E0' CODE
= 0001          C   GOT_E1         =   01H            ;LAST CODE WAS 'E1' CODE
                C ;
                C ;      Bit definitions for KBD_LED variable in RAM 40:97
                C ;
= 0040          C   KCMD_IP        =   40H            ;KEYBOARD COMMAND IN PROGRESS
= 0020          C   IP_287         =   20H            ;287 ERROR FIXUP IN PROGRESS
= 0010          C   RCVD_ACK       =   10H            ;RECEIVED ACK FROM KEYBOARD
= 0004          C   CAP_LED        =   04H            ;CAPS LOCK   LED IS ON
= 0002          C   NUM_LED        =   02H            ;NUM LOCK    LED IS ON
= 0001          C   SCRL_LED       =   01H            ;SCROLL LOCK LED IS ON
                C ;
                C         include cnt_def.equ
                C ;*****************************************************************
                C ;      8254 programmable interval timers
                C ;*****************************************************************
                C ;
                C ;      PC XT/AT Compatible timer
                C ;
                C ;*****************************************************************
= 0040          C   CNT_0          =   40H            ; 8254's COUNTER 0 I/O ADDRESS
= 0041          C   CNT_1          =   41H            ; 8254's COUNTER 1 I/O ADDRESS
= 0042          C   CNT_2          =   42H            ; 8254's COUNTER 2 I/O ADDRESS
= 0043          C   CNT_MODE       =   43H            ; 8254's MODE REGISTER I/O ADDRESS
                C ;
= 0036          C   CNT0_MODE      =   36H            ; SEL CNT_0, LD LSB FIRST, SQUARE WAVE
= 0000          C   CNT0_SETUP     =   00000H         ; INTR TIMER DIVISOR FOR 19.2 Hz
```

```
= 0054              C   CNT1_MODE       =   54H         ; COUNTER 1, LSB, MODE 2, BIN COUNT
= 0012              C   CNT1_SETUP      =   12H         ; REFRESH COUNT DIVISOR, 2 BYTES.
= 00B6              C   CNT2_MODE       =   0B6H        ; SEL CNT_2, LSB FIRST, SQUARE WAVE
= 0523              C   CNT2_SETUP      =   0523H       ; INITIAL TIMER 2 DIVISOR.
                    C   ;
= 0000              C   LATCH_CNT0      =   00H         ; CMD TO LATCH CNT_0'S COUNTER.
= 0040              C   LATCH_CNT1      =   40H         ; CMD TO LATCH CNT_1'S COUNTER.
= 0080              C   LATCH_CNT2      =   80H         ; CMD TO LATCH CNT_2'S COUNTER.
                    C   ;
                    C   ;
                    C   ;   COMPAQ defined failsafe timer
                    C   ;
                    C   ;   Timer 0 is gated into NMI to interrupt applications that run with
                    C   ;       interrupts disabled.
                    C   ;   Timer 1 is not defined.
                    C   ;   Timer 2 is used to put the processor in slow mode by generating
                    C   ;       lots of refresh cycles.
                    C   ;
                    C   ;*****************************************************************
                    C   ;
= 0048              C   FCNT_0          =   48H         ; 8254's COUNTER 0 I/O ADDRESS
= 0049              C   FCNT_1          =   49H         ; 8254's COUNTER 1 I/O ADDRESS
= 004A              C   FCNT_2          =   4AH         ; 8254's COUNTER 2 I/O ADDRESS
= 004B              C   FCNT_MODE       =   4BH         ; 8254's MODE REGISTER I/O ADDRESS
                    C   ;
= 0012              C   FCNT0_MODE      =   12H         ; COUNTER 0, LSB FIRST, ONE-SHOT
= 0022              C   FCNT0_SETUP     =   22H
= 0042              C   FCNT1_MODE      =   42H         ; COUNTER 1, LSB FIRST, ONE-SHOT
= 0022              C   FCNT1_SETUP     =   22H
= 0092              C   FCNT2_MODE      =   92H         ; COUNTER 2, LSB FIRST, ONE-SHOT
= 0022              C   FCNT2_SETUP     =   22H
                    C   ;

0000                    page
                    ROM  segment byte public 'ROM'
                         assume cs:ROM, ds:seg ram400
                         page
                    ;*****************************************************************
                    ;
                    ;   Call interrupt 1c which points to a dummy interrupt return if
                    ;       the user has not specified a subroutine to be called periodically
                    ;
                    ;   Unwind interrupt controller before we call user routine
                    ;*****************************************************************
0000                gointic:
                    ;
                    ; Perform INT_1CH, send EOI to PIC, last restore stack to original state. (glb)
                    ;
0000  CD 1C                 int     1ch             ;;; go to user timer routine
                    ;
0002  B0 20                 mov     al,EOI          ;;; reset master interrupt chip
0004  E6 20                 out     PIC1_CMD,al     ;;;
                    ;
0006  5A                    pop     dx              ;;; restore used registers
0007  58                    pop     ax              ;;;
0008  1F                    pop     ds              ;;;
                    ;
0009  CF                    iret                    ;;; *** RETURN ***

;*****************************************************************
                    ;       S Y S T E M   T I M E R   I N T E R R U P T   E N T R Y   P O I N T
                    ;-----------------------------------------------------------------
                    ;
                    ;       This interrupt occurs 18.2 times per second
                    ;
000A                _timer  proc    far
000A  1E                    push    ds              ;;; Push registers this order
000B  50                    push    ax              ;;; save used registers
000C  52                    push    dx              ;;;

000D  B8 ---- E             mov     ax,seg ram400   ;;; load ds to point to ram area
0010  8E D8                 mov     ds,ax           ;;;
                    ;*****************************************************************
                    ;       Increment the 32 bit counter
                    ;*****************************************************************
0012  FF 06 0000 E          inc     [timels]        ;;; Q: bump the ls word, rollover?
0016  75 04                 jnz     chk24           ;;; N: branch to 24 hour check
0018  FF 06 0000 E          inc     [timems]        ;;; Y: ripple carry
001C                chk24:
001C  83 3E 0000 E 18       cmp     [timems],18h    ;;; Q: reached 24 hour count 1800b0h?
0021  75 13                 jnz     chkdisk         ;;; N: branch if not at 24 hour count
0023  B8 00B0               mov     ax,00b0h        ;;; Y: prepare to compare
0026  2B 06 0000 E          sub     ax,[timels]     ;;; Q: high reached?
002A  75 0A                 jnz     chkdisk         ;;; N: branch if not at 24 hour count
                                                    ;;; Y: count reached 1800b0h 24 hours
002C  A3 0000 E             mov     [timels],ax     ;;;     reset 32 bit counter
002F  A3 0000 E             mov     [timems],ax     ;;;
0032  4U                    inc     ?               ;;;
0033  ?  0000 E             ?       [timems],?      ;;;

;*****************************************************************
                    ;       Check if disk motors running
                    ;*****************************************************************
0036                chkdisk:
0036  A0 0000 E             mov     al,[timeout]    ;;; get timeout count
0039  3C FF                 cmp     al,-1           ;;; Q: max count?
003B  75 1F                 jne     check_to        ;;; N: check for timeout
003D  F6 06 0000 E 07       test    [motor],7       ;;; Q: any motors running?
0042  74 18                 jz      check_to        ;;; N:
```

```
0044  E4 96                              in      al,SPEEDIO          ;;;     get speed information
0046  A8 80                              test    al,A_BIT            ;;; Q:  AUTO bit set?
0048  74 12                              jz      check_to            ;;; N:  don't slow CPU down
004A  A8 40                              test    al,S_BIT            ;;; Q:  CPU in HIGH speed?
004C  74 0E                              jz      check_to            ;;; N:
004E  B0 92                              mov     al,92h              ;;; Y:  set CPU to FAST speed
0050  E6 4B                              out     FCNT_MODE,al        ;;;
0052  EB 00                              jmp     $+2                 ;;;
0054  EB 00                              jmp     $+2                 ;;;
0056  EB 00                              jmp     $+2                 ;;;
0058  B0 22                              mov     al,FAST_SP          ;;;     get FAST speed count
005A  E6 4A                              out     FCNT_2,al           ;;;
005C                          check_to:
005C  FE 0E 0000 E                       dec     [timeout]           ;;; Q:  disk timeout?
0060  75 9E                              jnz     gointic             ;;; N:
0062  B0 0C                              mov     al,MOTOR_OFF_DA     ;;; Y:  turn off motors, leave dma on
0064  BA 03F2                            mov     dx,DIGOUTREG        ;;;
0067  EE                                 out     dx,al               ;;;
0068  F6 06 0000 E 07                    test    [motor],7           ;;; Q:  any motors running?
006D  74 0E                              jz      mtroff              ;;; N:
006F  E4 86                              in      al,SPEEDIO          ;;; Y:  get speed information
0071  A8 80                              test    al,A_BIT            ;;; Q:  AUTO bit set?
0073  74 08                              jz      mtroff              ;;; N:  don't slow CPU down
0075  A8 40                              test    al,S_BIT            ;;; Q:  CPU in HIGH speed?
0077  74 04                              jz      mtroff              ;;; N:
0079  B0 92                              mov     al,92h              ;;; Y:  set CPU to HIGH speed
007B  E6 4B                              out     FCNT_MODE,al        ;;;
007D                          mtroff:
007D  80 26 0000 E F0                    and     [motor],0F0h        ;;;     turn off motor status bits
0082  E9 0000 R                          jmp     gointic
                              _timer  endp 0085                          ROM     ends
                                      end
```

Microsoft (R) Macro Assembler  Version 4.00       8/7/86 10:26:43

TIMER   Copyright (c) 1982,83,84,85,86 COMPAQ Computer Corp.   Symbols-1

Segments and Groups:

| Name | Size | Align | Combine | Class |
|---|---|---|---|---|
| ROM | 0085 | BYTE | PUBLIC | 'ROM' |

Symbols:

| Name | Type | Value | Attr |
|---|---|---|---|
| ALTKEY | Number | 0008 | |
| AUTO_ | Number | 0008 | |
| A_BIT | Number | 0080 | |
| CAPKEY | Number | 0040 | |
| CAPSLOK | Number | 0040 | |
| CAP_LED | Number | 0004 | |
| CHECK_TO | L NEAR | 005C | ROM |
| CHK24 | L NEAR | 001C | ROM |
| CHKDISK | L NEAR | 0036 | ROM |
| CN10_MODE | Number | 0036 | |
| CNT0_SETUP | Number | 0000 | |
| CNT1_MODE | Number | 0054 | |
| CNT1_SETUP | Number | 0012 | |
| CNT2_MODE | Number | 00B6 | |
| CNT2_SETUP | Number | 0533 | |
| CNTMSK | Number | 003F | |
| CNT_0 | Number | 0040 | |
| CNT_1 | Number | 0041 | |
| CNT_2 | Number | 0042 | |
| CNT_MODE | Number | 0043 | |
| COMMON_ | Number | 0000 | |
| COMM_SP | Number | 0024 | |
| COUNT_ | Number | 0009 | |
| CPU_HIGH | Number | 00A3 | |
| CPU_READ | Number | 00A5 | |
| CTRLKEY | Number | 0004 | |
| DIGINREG | Number | 03F7 | |
| DIGOUTREG | Number | 03F2 | |
| DISKSEL | Number | 03F2 | |
| DREG765 | Number | 03F5 | |
| DSKCHG | Number | 0080 | |
| ENH_LBO | Number | 0010 | |
| EOI | Number | 0020 | |
| FAST_ | Number | 0001 | |
| FAST_CPU | Number | 000C | |
| FAST_SP | Number | 0022 | |
| FCNT0_MODE | Number | 0012 | |
| FCNT0_SETUP | Number | 0022 | |
| FCNT1_MODE | Number | 0040 | |
| FCNT1_SETUP | Number | | |
| FCNT2_MODE | Number | 0092 | |
| FCNT2_SETUP | Number | 0022 | |
| FCNT_0 | Number | 0048 | |
| FCNT_1 | Number | 0049 | |
| FCNT_2 | Number | 004A | |
| FCNT_MODE | Number | 004B | |

```
FIN_SETUP  . . . . . . . . . . . .     Number   0045
F_NUM_LK . . . . . . . . . . . .       Number   0020

GOINT1C . . . . . . . . . . . . .      L NEAR   0000    ROM
GOT_E0 . . . . . . . . . . . . .       Number   0002
GOT_E1 . . . . . . . . . . . . .       Number   0001

HIGH_ . . . . . . . . . . . . .        Number   0002
HIGH_CPU . . . . . . . . . . . .       Number   0004
HIGH_SP  . . . . . . . . . . . .       Number   0000

IBMPC_SP . . . . . . . . . . . .       Number   0031
INIT_FSETUP  . . . . . . . . . .       Number   005D
INSKEY . . . . . . . . . . . . .       Number   0080
INSRTON  . . . . . . . . . . . .       Number   0080
IP_297 . . . . . . . . . . . . .       Number   0020
IRQ0_ENABLE  . . . . . . . . . .       Number   00FE
IRQ10_ENABLE . . . . . . . . . .       Number   00FB
IRQ11_ENABLE . . . . . . . . . .       Number   00F7
IRQ12_ENABLE . . . . . . . . . .       Number   00EF
IRQ13_ENABLE . . . . . . . . . .       Number   00DF
IRQ14_ENABLE . . . . . . . . . .       Number   00BF
IRQ15_ENABLE . . . . . . . . . .       Number   007F
IRQ1_ENABLE  . . . . . . . . . .       Number   00FD
IRQ2_ENABLE  . . . . . . . . . .       Number   00FB
IRQ3_ENABLE  . . . . . . . . . .       Number   00F7
IRQ4_ENABLE  . . . . . . . . . .       Number   00EF
IRQ5_ENABLE  . . . . . . . . . .       Number   00DF
IRQ6_ENABLE  . . . . . . . . . .       Number   00BF
IRQ7_ENABLE  . . . . . . . . . .       Number   007F
IRQ8_ENABLE  . . . . . . . . . .       Number   00FE
IRQ9_ENABLE  . . . . . . . . . .       Number   00FD KBD_TYPE . . . . . . . . . . . .       Number   0020
KCMD_DEFAULT . . . . . . . . . .       Number   00F6
KCMD_DIAG_DUMP . . . . . . . . .       Number   00AC
KCMD_DISABLE . . . . . . . . . .       Number   00AD
KCMD_DIS_KBD . . . . . . . . . .       Number   00F5
KCMD_ECHO  . . . . . . . . . . .       Number   00EE
KCMD_ENABLE  . . . . . . . . . .       Number   00AE
KCMD_ENA_KBD . . . . . . . . . .       Number   00F4
KCMD_INTF_TEST . . . . . . . . .       Number   00AB
KCMD_IP  . . . . . . . . . . . .       Number   0040
KCMD_LEDS  . . . . . . . . . . .       Number   00ED
KCMD_NOP . . . . . . . . . . . .       Number   00E0
KCMD_PULSE_OUT . . . . . . . . .       Number   00E0
KCMD_RD  . . . . . . . . . . . .       Number   00E0
KCMD_RD_TIMER  . . . . . . . . .       Number   00E0
KCMD_RD_OUTPUT . . . . . . . . .       Number   00D0
KCMD_RD_TINPUTS  . . . . . . . .       Number   00E0
KCMD_RESEND  . . . . . . . . . .       Number   00FE
KCMD_RESET . . . . . . . . . . .       Number   00FF
KCMD_SELF_TEST . . . . . . . . .       Number   00AA
KCMD_SETTYPE . . . . . . . . . .       Number   00F3
KCMD_WT  . . . . . . . . . . . .       Number   0060
KCMD_WT_OUTPUT . . . . . . . . .       Number   00D1
KEY_CMD  . . . . . . . . . . . .       Number   0064
KEY_IN_BUFF  . . . . . . . . . .       Number   0060
KEY_OUT_BUFF . . . . . . . . . .       Number   0060
KEY_STATUS . . . . . . . . . . .       Number   0064
KEY_TEST_OK  . . . . . . . . . .       Number   0055
KIN_287  . . . . . . . . . . . .       Number   0004
KIN_CPU_SPEED  . . . . . . . . .       Number   0010
KIN_KEY_LOCK . . . . . . . . . .       Number   0080
KIN_MANUF  . . . . . . . . . . .       Number   0020
KIN_P_DISPLAY  . . . . . . . . .       Number   0040
KOUT_A20 . . . . . . . . . . . .       Number   0002
KOUT_CLK_OUT . . . . . . . . . .       Number   0040
KOUT_CPU_RESET . . . . . . . . .       Number   0001
KOUT_CPU_SPEED . . . . . . . . .       Number   000C
KOUT_DATA_OUT  . . . . . . . . .       Number   0080
KOUT_IN_FULL . . . . . . . . . .       Number   0020
KOUT_OUT_FULL  . . . . . . . . .       Number   0010
KSTAT_CMD_DATA . . . . . . . . .       Number   0008
KSTAT_INHIBIT  . . . . . . . . .       Number   0010
KSTAT_IN_FULL  . . . . . . . . .       Number   0002
KSTAT_OUT_FULL . . . . . . . . .       Number   0001
KSTAT_P_ERROR  . . . . . . . . .       Number   0080
KSTAT_RTO  . . . . . . . . . . .       Number   0040
KSTAT_SYS_FLAG . . . . . . . . .       Number   0004
KSTAT_TTO  . . . . . . . . . . .       Number   0020
K_CPU_FAST . . . . . . . . . . .       Number   000C
K_CPU_HIGH . . . . . . . . . . .       Number   0004
K_CPU_SLOW . . . . . . . . . . .       Number   0008

LATCH_CNT0 . . . . . . . . . . .       Number   0000
LATCH_CNT1 . . . . . . . . . . .       Number   0040
LATCH_CNT2 . . . . . . . . . . .       Number   0080
LEFTALT  . . . . . . . . . . . .       Number   0002
LEFTCTRL . . . . . . . . . . . .       Number   0001
LEFTSHF  . . . . . . . . . . . .       Number   0002

MASK_DISABLE . . . . . . . . . .       Number   00FF
MOTOR  . . . . . . . . . . . . .       V BYTE   0000        External
MOTOR_OFF_DA . . . . . . . . . .       Number   000C
MOTOR_ON . . . . . . . . . . . .       Number   001C
MTROFF . . . . . . . . . . . . .       L NEAR   007D    ROM
MULTI_TRACK  . . . . . . . . . .       Number   0080
```

```
NOT_RESET . . . . . . . . . . . . .      Number  000C
NMIKEY  . . . . . . . . . . . . . .      Number  0020
NMIPORT . . . . . . . . . . . . . .      Number  0070
NUM_LED . . . . . . . . . . . . . .      Number  0002

PIC1_CMD  . . . . . . . . . . . . .      Number  0020
PIC1_ICW1_VAL . . . . . . . . . . .      Number  0011
PIC1_ICW2_VAL . . . . . . . . . . .      Number  0008
PIC1_ICW3_VAL . . . . . . . . . . .      Number  0004
PIC1_ICW4_VAL . . . . . . . . . . .      Number  0001
PIC1_INIT . . . . . . . . . . . . .      Number  0021
PIC1_MASK . . . . . . . . . . . . .      Number  0021
PIC1_STAT . . . . . . . . . . . . .      Number  0020
PIC2_CMD  . . . . . . . . . . . . .      Number  00A0
PIC2_ICW1_VAL . . . . . . . . . . .      Number  0011
PIC2_ICW2_VAL . . . . . . . . . . .      Number  0070
PIC2_ICW3_VAL . . . . . . . . . . .      Number  0002
PIC2_ICW4_VAL . . . . . . . . . . .      Number  0001
PIC2_INIT . . . . . . . . . . . . .      Number  00A1
PIC2_MASK . . . . . . . . . . . . .      Number  00A1
PIC2_STAT . . . . . . . . . . . . .      Number  00A0

RAM400  . . . . . . . . . . . . . .      V WORD  0000        External
RCVD_ACK  . . . . . . . . . . . . .      Number  0010
READ_ISR  . . . . . . . . . . . . .      Number  000B
RESET . . . . . . . . . . . . . . .      Number  0000
RID_1ST . . . . . . . . . . . . . .      Number  0040
RID_IP  . . . . . . . . . . . . . .      Number  0080
RIGTALT . . . . . . . . . . . . . .      Number  0008
RIGTCTRL  . . . . . . . . . . . . .      Number  0004
RIGTSHF . . . . . . . . . . . . . .      Number  0001

SCRLKEY . . . . . . . . . . . . . .      Number  0010
SCRLOCK . . . . . . . . . . . . . .      Number  0010
SCRL_LED  . . . . . . . . . . . . .      Number  0001
SLOW_CPU  . . . . . . . . . . . . .      Number  0008
SPEEDIO . . . . . . . . . . . . . .      Number  0086
SREG765 . . . . . . . . . . . . . .      Number  03F4
SYSREG  . . . . . . . . . . . . . .      Number  0004
S_BIT . . . . . . . . . . . . . . .      Number  0040

TIMELS  . . . . . . . . . . . . . .      V WORD  0000        External
TIMEMS  . . . . . . . . . . . . . .      V WORD  0000        External
TIMEOUT . . . . . . . . . . . . . .      V BYTE  0000        External
TIMEROL . . . . . . . . . . . . . .      V BYTE  0000        External
TOGGLE_ . . . . . . . . . . . . . .      Number  0003

UNGKEY  . . . . . . . . . . . . . .      Number  0008

_TIMER  . . . . . . . . . . . . . .      F PROC  000A   ROM    Global Length = 0078

434 Source Lines
    433 Total  Lines
    204 Symbols

44492 Bytes symbol space free
    0 Severe Errors
```

APPENDIX P

PAL 16L8B LISTING

```
16L8_                                         PAL DESIGN SPECIFICATION
D4-RM32 108053-001                            PAUL R. CULLEY   04/02/86
D4 PAGE RAM BOARD M32 decode logic
Copyright Compaq Computer Houston, Texas 1986

A31   A23   A22   A21   A20   A19   A18   A17   FA20  GND
 /2M   /M32A /M32B /ROM  /512K /640K /1M   /8M   /M32C VCC

IF (/A22 * /A21) M32A =
    /A31*/A23*/A22*/A21*/A20*/A19*/A18                     ;000000-03FFFF  256K
  + /A31* A23*/A22*/A21*      /A19*/A18*  /FA20            ;000000-03FFFF  256K
  + /A31*/A23*/A22*/A21*/A20*/A19* A18*            512K    ;040000-07FFFF  256K
  + /A31*/A23*/A22*/A21*/A20* A19*/A18*/A17        640K    ;080000-09FFFF  128K
  + /A31*/A23*/A22*/A21*/A20* A19* A18* A17*       ROM     ;0E0000-0FFFFF  128K
  + /A31*/A23*/A22*/A21* A20*                      1M      ;100000-1FFFFF  1M
  + /A31* A23*/A22*/A21*                           8M      ;800000+9FFFFF  2M

IF (A22 * /A21) M32B =
    /A31*/A23* A22*/A21*                             2M    ;400000-5FFFFF  2M
  + A31* A23* A22*/A21*/A20*/A19*/A18*/A17                 ;DIAG 8000000h 128K

IF (A21) M32C =
    /A31*/A23* A22* A21* A20*/A19* A18*      /512K         ;F40000-F7FFFF  256K
  + /A31*/A23* A22* A21* A20* A19*/A18*/A17* /640K         ;F80000-F9FFFF  128K
  + /A31*/A23* A22* A21* A20* A19*/A18* A17                ;FA0000-FBFFFF  128K
  + /A31*/A23* A22* A21* A20* A19* A18                     ;FC0000-FFFFFF  256K
  + /A31*/A23* A22* A21*                           8M      ;600000-7FFFFF  2M
  + /A31*/A23*/A22* A21*                           2M      ;200000-3FFFFF  2M

FUNCTION TABLE
```

```
A31 A23 A22 A21 A20 A19 A18 A17 FA20 /512K /640K /1M /2M /8M /ROM
/M32A /M32B /M32C
;
;                                   / / /
;              F              M M M
;A A A A A A A A   5 6     R  3 3 3
;3 2 2 2 2 1 1 1 2 1 4 2 0 2 2 2
;1 3 2 1 0 9 8 7 0   2 0 M M M A B C
 H H H L L L L L L   L L L L L   Z L Z  DIAG
 H L H L H L L L L   L L L L L   Z H Z  OFF
 H L H H L L L L H   H L L L L L Z Z H  OFF
 H L L L L L L L H   L L L L L   H Z Z  OFF
 L L L L L L L H     L L L L L   L Z Z  256K
 L L L L H L L L L   L L L L L   L Z Z  256K
 L L L L L L H L L   L L L L L   L Z Z  512K
 L L L L L H L L L   L L L L L   L Z Z  640K
 L L L L L L H H L   L L L L L   L Z Z  128K AT 0E0000h
 L H H H H L H L L   H L L L L   Z Z L  256K AT F40000h
 L H H H H H L L L   H H L L L L Z Z L  128K AT F80000h
 L H H H H H L H L   L L L L L   Z Z L  128K AT FA0000h
 L H H H H H L L L   L L L L L   Z Z L  256K AT FC0000h
 L L L L H H H H H   L L L L L   L Z Z  1M AT 100000h
 L L L H L L L L L   L L L L L   Z Z L  2M AT 200000h
 L L H L L L L L L   L L L L L   Z L Z  2M AT 400000h
 L L H H L L L L L   L L L L L   Z Z L  2M AT 600000h
 L H L L L L L L L   L L L L L   L Z Z  2M AT 800000h
 L H L L L L L L L   L L L L H L H Z Z  2M AT 800000h OFF
 L L L H L L L L L   L L L H L L Z Z H  2M AT 200000h OFF
 L L L L H L L L H   L L H L L L H Z Z  1M AT 100000h OFF
 L L L L L L L L L   L L L L L   L L L  ALL OFF
DESCRIPTION

This PAL is used in the D4 (386) memory board to decode addresses within the
memory space and assert the M32* signal. It does all the decoding for all the
expected options according to the following jumper settings.

512K 640K                                1M
H    H    256K    000000-03FFFFh         H      NO EXTENDED MEMORY
L    H    512K    000000-07FFFFh         L      1024K  100000-1FFFFFh
L    L    640K    000000-9FFFFFh
H    L    ****    ILLEGAL 8M 2M
H  H   OK
H  L   2048K   200000-3FFFFFh
L  H   6144K   400000-9FFFFFh  (NOTE: The 8 Meg board asserts both 8M and 2M
L  L   8192K   200000-9FFFFFh   strobes)

When FA20 is low, the address line A20 should be considered to be low.
When FA20 is high, A20 is decoded as usual.
The above set of m32 outputs are wire ORed to form the signal M32*. The
actual equation for M32 is shown below.

M32 =
   /A31*/A23*/A22*/A21*/A20*/A19*/A18                     ;000000-03FFFF 256K
 + /A31*/A23*/A22*/A21*      /A19*/A18*    /FA20          ;000000-03FFFF 256K
 + /A31*/A23*/A22*/A21*/A20*/A19* A18*            512K    ;040000-07FFFF 256K
 + /A31*/A23*/A22*/A21*/A20* A19*/A18*/A17* 640K          ;080000-09FFFF 128K
 + /A31*/A23*/A22*/A21*/A20* A19* A18* A17* ROM           ;0E0000-0FFFFF 128K
 + /A31* A23* A22* A21* A20*/A19* A18*            /512K   ;F40000-F7FFFF 256K
 + /A31* A23* A22* A21* A20* A19*/A18*/A17*640K           ;F80000-F9FFFF 128K
 + /A31* A23* A22* A21* A20* A19*/A18* A17                ;FA0000-FBFFFF 128K
 + /A31* A23* A22* A21* A20* A19* A18                     ;FC0000-FFFFFF 256K
 + /A31*/A23*/A22*/A21* A20*                       1M     ;100000-1FFFFF 1M
 + /A31*/A23*/A22* A21*                            2M     ;200000-3FFFFF 2M
 + /A31*/A23* A22*/A21*                            8M     ;400000-5FFFFF 2M
 + /A31*/A23* A22* A21*                            8M     ;600000-7FFFFF 2M
 + /A31* A23*/A22*/A21*                            8M     ;800000-9FFFFF 2M
 + /A31* A23* A22*/A21*/A20*/A19*/A18*/A17                ;DIAG 80C0000h 128K

PAL16L8B                                   PAL DESIGN SPECIFICATION
D4-RRAS 108054-001                         PAUL R. CULLEY    05/20/86
D4 PAGE RAM BOARD RAS decode logic
Copyright Compaq Computer Houston, Texas 1986

A31   A23  A22  A21  A20  A19    A18    A17  FA20 GND
/RFSH /RS0 /MWE /MRD /WEO /PARRD /PARWR /ROM /RS1 VCC

RS0 =
  /A31* /A23* /A22* /A21* /A20* /A19                      ;00000000H 512K
+ /A31* /A23* /A22* /A21* /FA20* /A19                     ;00100000H 512K
+ /A31* /A23* /A22* /A21* /A20*  A19* /A18* /A17          ;00080000H 128K
+ /A31* /A23* /A22* /A21* /A20*  A19*  A18*  A17          ;000E0000H 128K
+ /A31*  A23*  A22*  A21*  A20                            ;00F00000H 1024K
+  RFSH                                                   ; REFRESH

RS1 =
  /A31* /A23* /A22* /A21*  A20*  FA20                     ;00100000H 1024K
+  RFSH                                                   ; REFRESH

PARWR =
  MWE* A31*  A23*  A22* /A21* /A20* /A19* /A18*  A17      ;80C00000H 128K

PARRD =
  MRD* A31*  A23*  A22* /A21* /A20* /A19* /A18*  A17      ;80C00000H 128K

WEO =
  MWE*/A31* /A23* /A22* /A21*           /A19              ;00000000H 512K
```

```
+MWE*/A31* /A23* /A22* /A21* /A20* A19* /A18* /A17    ;00080000H 128K
+MWE*/A31* /A23* /A22* /A21* /A20* A19* /A18* /A17* /ROM ;000E0000H 128K
+MWE*/A31* /A23* A22* A21* A20* /A19* A18          ;00F40000H 256K
+MWE*/A31* A23* A22* A21* A20* A19* /A18           ;00F80000H 256K
+MWE*/A31* A23* A22* A21* A20* A19* A18* /A17      ;00FC0000H 128K
+MWE*/A31* A23* A22* A21* A20* A19* A18* A17* /ROM ;00FE0000H 128K
```

FUNCTION TABLE

```
A31 A23 A22 A21 A20 A19 A18 A17 FA20 /ROM /MWE /MRD /RFSH
/RS0 /RS1 /PARWR /PARRD /WEO
;
;                       /      P P
;                    F /  /R  / /R R /
;A A A A A A A A R  M M F  R R R R W
;3 2 2 2 2 1 1 1 2 0 W R S  S S W R E
;1 3 2 1 0 9 8 7 0 H E O M  0 1 R D 0
-----------------------------------
 L L L L L L L L H L  L H H  L H H H L 000000H 512K
 L L L L H L L L L L  L H H  L H H H L 100000H 512K
 L L L L L H L L H L  L H H  L H H H L 080000H 128K
 L L L L L H H H H L  L H H  L H H H H 0E0000H 128K
 L L L L L H H H H H  L H H  L H H H L 0E0000H 128K
 L H H H L H L H L    L H H  L H H H L F40000H 256K
 L H H H H L L H L    L H H  L H H H L F80000H 256K
 L H H H H H L H L    L H H  L H H H L FC0000H 128K
 L H H H H H H H H L  L H H  L H H H H FE0000H 128K
 L H H H H H H H H    L H H  L H H H L FE0000H 128K
 L L L L H L L L H    H H H  H L H H H 100000H 1024K
 H H H L L L L L H L  L H H  H H L H H 80C00000H 128K
 H H H L L L L L H L  H L H  H H H L H 80C00000H 128K
 H H H H H H H H H L  H H L  L L H H H REFRESH
```

DESCRIPTION

This PAL is used in the D4 (386) memory board to decode the RAS signals and the parity read and write logic.

APPENDIX Q

PAL DESIGN DATA

```
PAL16L8A
D4-SROMA 108135-001                    PAL DESIGN SPECIFICATION
                                       PAUL R. CULLEY  06/26/86
System ROM decode logic
Copyright 1986 Compaq Computer Houston, Texas BALE    LA23   LA22   LA21 LA20 LA19  LA18  LA17  SA16  GND
/MRDC /ROM1OE /RFSH /M32 /M16E /ROM /ROMEN /LOWEN /ROM2OE VCC M16E  = /LA23*/LA22*/LA21*/LA20* LA19* LA18* LA17   ;00E0000h-00FFFFFh
      + LA23* LA22* LA21* LA20* LA19* LA18* LA17    ;0FE0000h-0FFFFFFh
      + M32

ROM   = /LA23*/LA22*/LA21*/LA20* LA19* LA18* LA17* BALE ;00E0000h-00FFFFFh
      + LA23* LA22* LA21* LA20* LA19* LA18* LA17* BALE  ;0FE0000h-0FFFFFFh
      + /LA23*/LA22*/LA21*/LA20* LA19* LA18* LA17* ROM  ;DEGLITCH
      + LA23* LA22* LA21* LA20* LA19* LA18* LA17* ROM   ;DEGLITCH
      + /BALE* ROM                                      ;LATCH TERM

ROM1OE = ROM * SA16 * MRDC              ;00F0000h-00FFFFFh
                                        ;0FF0000h-0FFFFFFh

ROM2OE = ROM * /SA16 * MRDC             ;00E0000h-00EFFFFh
                                        ;0FE0000h-0FEFFFFh

ROMEN  = ROM * MRDC                     ;BUFFER ENABLE

LOWEN = /LA23* /LA22* /LA21* /LA20* BALE   ;BOTTOM ONE MEGABYTE AND BALE
      + /LA23* /LA22* /LA21* /LA20* LOWEN  ;DEGLITCH TERM
      + /BALE* LOWEN                       ;LATCH TERM
      + RFSH                               ;AND REFRESH
```

FUNCTION TABLE

```
BALE LA23 LA22 LA21 LA20 LA19 LA18 LA17 SA16 /MRDC /RFSH /M32
/ROM /ROM1OE /ROM2OE /ROMEN /M16E /LOWEN

;                    R R
;                    O O  R  L
;B L L L L L L L S M R   M M O M O
;A A A A A A A A R F M   R 1 2 M 1 W
;L 2 2 2 2 1 1 1 0 3 S 3 O O E 6 E
;E 3 2 1 0 9 8 7 6 C H 2 M E E N E N
-----------------------------------
 H L L L L L L L H H L  H H H L L  ;INACTIVE
 L L L L L L L L H H H  H H H H L  ;INACTIVE
 L L L L L L H H H H H  H H H.L L  ;ROM2 ADDRESS, NO READ, NO ALE
 H L L L L H H L H H H  L H H L L  ;ROM2 ADDRESS, NO READ, ALE
 L L L L L L H H H H L  L H L L H L ;ROM2 READ, HOLD ADDRESS ON ROM
 H L L L L L L L H H H  H H H H L  ;INACTIVE
 L L L L L L L L H H H  H H H H L  ;INACTIVE
 L L L L L L H H H H    H H H L L  ;ROM1 ADDRESS, NO READ, NO ALE
 H H H H H H H H H H    L H H H H  ;ROM1 ADDRESS, NO READ, ALE
 L H H H L L H L H H    L L H L H H ;ROM1 READ, HOLD ADDRESS ON ROM
```

```
H L L L L L L L H H H H    H H H H H L    ;INACTIVE
H H L L L H H H H H H      H H H H H H    ;INACTIVE
H L H L L H H H H H H      H H H H H H    ;INACTIVE
H L L H L H H H H H H      H H H H H H    ;INACTIVE
H L L L H H H H H H H      H H H H H H    ;INACTIVE
H L L L L L H H H H L      H H H H H L    ;INACTIVE
H L L L L H L H H H H      H H H H H L    ;INACTIVE
H L L L L H H L H H H      H H H H H L    ;INACTIVE
H L H H H H H H H H H      H H H H H H    ;INACTIVE
H H L H H H H H H H H      H H H H H H    ;INACTIVE
H H H L H H H H H H H      H H H H H H    ;INACTIVE
H H H H L H H H H H H      H H H H H H    ;INACTIVE
H H H H H L H H H H H      H H H H H H    ;INACTIVE
H H H H H H L H H H L H    H H H H H L    ;INACTIVE
H H H H H H H L H H H H    H H H H H H    ;INACTIVE
```

DESCRIPTION

This PAL is used in the D4 (386) processor board to decode ROM addresses
within the two ranges OFE0000h-OFFFFFFh and 00E0000h-00FFFFFh. It also
generates the signal that controls the ROM data buffer RD<15..0> and the
signal M16 (memory is 16 bits) during ROM accesses.
The signal LOWEN* is generated by this PAL to indicate when the low one
megabyte of the system is being accessed.

APPENDIX R

TESTHRAM SOURCE CODE

Microsoft (R) Macro Assembler Version 4.00          8/13/86 11:49:46
TESTHRAM      Copyright (C) 1985,86 COMPAQ Computer Corp.       Page   1-1

```
                page    58,132
                title   TESTHRAM       Copyright (C) 1985,86 COMPAQ Computer Corp.
;*************************************************************************
;
; Name:     TESTHRAM - Test LIGHTNING high memory
;
; Group:    ROM
;
; Revision: C
;
; Date:     5/15/86
;
; Author:   O L Brasher
;
;*************************************************************************
;
; Changes:
;
;   Date        Revision    Description
;   --------    --------    -----------
;   05/15/86    Original    Adapted from Deskpro 286 Rev. E.
;   06/24/86    B           Display base/high 1M as KB OK.  (glb)
;   07/18/86    C           Update bp on exiting TestHighSysMem.  (glb)
;
;*************************************************************************
;
; Functional Description:
;    This module sizes LIGHTNING high memory based on the diagnostic byte
;    of the 32-bit memory board and tests the highest 128k of memory.
;
;*************************************************************************
286P
                page
;*************************************************************************
;
;   Public Declarations
;
;*************************************************************************
;
                public  SizeHighMem         ; Size all of high memory
                public  TestHighSysMem      ; Test high system memory
                public  MovSysROM           ; Move System ROM to high system memory
                public  Set32Break          ; Set 32-bit break segments
                public  ReadDIAG            ; Read DIAG byte into ah 0000        ROM     SEGMENT BYTE PUBLIC 'ROM'
                ASSUME  cs:ROM
;
;*************************************************************************
;
;   External References
;
;*************************************************************************
;
                extrn   MemTest:near        ; Memory test
;
;*************************************************************************
;
;   Includes
;
;*************************************************************************
```

```
                           C    .list
─────────────────────────────────────────────────────────────────────────────────
                           C            include ppi_def.equ
                           C    ;*****************************************************************
                           C    ;
                           C    ;    Port 61H uses discrete buffers to provide some of the same
                           C    ;    signals provided on the COMPAQs and DESKPRO by the 8255
                           C    ;    programmable peripheral interface (PPI).  Since all memory
                           C    ;    in Magnum resides on a peripheral card, no parity errors are
                           C    ;    generated from the mother board.
                           C    ;
                           C    ;*****************************************************************
 = 0061                    C    PPI              =      61H          ; Input portion of old PPI.
 = 0061                    C    PPO              =      61H          ; Output portion of old PPI.
                           C    ;
                           C    ;    BIT equates for INPUT port at 61H (old PPI port B)
                           C    ;
 = 0001                    C    PPI_SPKR_GATE    =      00000001B    ; Bit 0 = timer 2 output enable gate.
 = 0002                    C    PPI_SPKR_DATA    =      00000010B    ; Bit 1 = speaker data.
 = 0004                    C    PPI_ENB_PCHECK   =      00000100B    ; Bit 2 = Not used in Magnum.
 = 0008                    C    PPI_ENB_IOCHECK  =      00001000B    ; Bit 3 = parity check enable.
 = 0010                    C    PPI_REFRSH       =      00010000B    ; Bit 4 = refresh input.
 = 0020                    C    PPI_TOUT         =      00100000B    ; Bit 5 = timer 2 output.
 = 0040                    C    PPI_IOCHECK      =      01000000B    ; Bit 6 = parity error on bus.
 = 0080                    C    PPI_PCHECK       =      10000000B    ; Bit 7 = Not used in Magnum.
                           C    ;
                           C    ;    Bit equates for OUTPUT port at 61H (old PPI port B)
                           C    ;    0=enabled, for pcheck and iocheck.
                           C    ;
 = 0001                    C    PPO_SPKR_GATE    =      00000001B    ; Bit 0 = timer 2 output enable gate.
 = 0002                    C    PPO_SPKR_DATA    =      00000010B    ; Bit 1 = speaker data output.
 = 0004                    C    PPO_ENB_PCHECK   =      00000100B    ; Bit 2 = Not used in Magnum.
 = 0008                    C    PPO_ENB_IOCHECK  =      00001000B    ; Bit 3 = parity check enable.
                           C    ;
 = 000C                    C    PPO_INIT         =      00001100B    ; Initially, disable everything.

.list
                                ;
                                page
                                ;*****************************************************************
                                ;
                                ;    SizeHighMem     High memory is felt from HIGH_MAX_SEG down to
                                ;                    HIGH_MIN_SEG (a span of 1M bytes)
                                ;
                                ;    Entry:  CPU is in protected mode
                                ;            32-bit LIGHTNING memory board is installed
                                ;            DS contains DATA descriptor
                                ;
                                ;    Exit:   High_Segment = starting segment of high user memory
                                ;            High_Size    = Size in kbytes of high user memory
                                ;
                                ;    Regs:   ax, bx, cx, di
                                ;
                                ;*****************************************************************
 0000                           SizeHighMem      proc    near
                                ;
 0000  B8 0050                  mov      ax,DIAGSEL              ; Move DIAG selector to ax
 0003  1E                       push     ds                      ; Preserve ds
 0004  8E D8                    mov      ds,ax                   ; Set ds to diag byte descriptor 0006  C6 06 0000 FE            mov      byte ptr ds:[0],0FFh    ; Reset ROM replace, write protect 000B  1F                       pop      ds                      ; Restore ds 000C  C7 06 0081 R 0000        mov      [High_Size],0000h       ; Defaults for High_Size, High_User_Seg
 0012  C6 06 0080 R FA          mov      [High_Segment],HIGH_USER_SEG ;    Feel for high memory size
                                ;
 0017  33 DB                    xor      bx,bx                   ; bx will hold kbytes found
 0019  B1 FF                    mov      cl,HIGH_MAX_SEG         ; cl is starting segment
 001B  B5 F0                    mov      ch,HIGH_MIN_SEG         ; ch is last segment to check 001D  33 FF                    xor      di,di                   ; Working offset
 001F  06                       push     es                      ; Preserve es
                                ;
 0020                           SizeHighMem_Loop:
 0020  88 0E 004C R             mov      [RAM_desc.base_high],cl ; Set descriptor to target segment
 0024  B8 0048                  mov      ax,RAMSEL
 0027  8E C0                    mov      es,ax                   ; Load selector
                                ;
 0029  26: C7 05 0000           mov      word ptr es:[di],0000h  ; Reset the first word
                                                                 ; Set the second word
 002E  26: C7 45 02 FFFF        mov      word ptr es:[di+2],0FFFFh 0034  FC                       cld
 0035  FC                       cld                              ; Charge the bus to FC
 0036  26: 8B 05                mov      ax,es:[di]              ; Read the first word
 0039  FC                       cld
 003A  FC                       cld                              ; Charge the bus to FC
 003B  FC                       cld
 003C  FC                       cld
 003D  FC                       cld
 003E  0B C0                    or       ax,ax                   ; Q: Is RAM at this segment?
 0040  26: 89 05                mov      es:[di],ax              ; Clear any parity error from board
 0043  74 04                    jz       Size_1                  ; Y: RAM found at this segment
                                                                 ; N:
```

```
0045  FE C1                              inc     cl                              ; Increment cl to last good segment
0047  EB 0B                              jmp     short Size_2                    ; Jump to continue 0049                          Size_1:
0049  83 C3 40                           add     bx,64                           ; Add 64k bytes to bx
004C  3A CD                              cmp     cl,ch                           ; Q: Last segment tested?
004E  74 04                              je      Size_2                          ; Y: Exit high memory sizing loop
                                                                                 ; N:
0050  FE C9                              dec     cl                              ; Dec cl to next segment to check
0052  EB CC                              jmp     SizeHighMem_Loop                ; Continue in loop to size high memory 0054                          Size_2:
0054  81 EB 0080                         sub     bx,HIGH_SYS_SIZE                ; Subtract high system memory
0058  76 08                              jbe     Size_3                          ; Q: System size or less found? Y: Jump 005A  89 1E 0081 R                       mov     [High_Size],bx                  ; Store high user size
005E  88 0E 0080 R                       mov     [High_Segment],cl               ; Store high user segment 0062                          Size_3:
0062  07                                 pop     es                              ; Restore es
0063  C3                                 ret                                     ; *** Return ***

SizeHighMem  endp
                                  page
;****************************************************************
;
;       TestHighSysMem  Test High System Memory
;
;       Entry:  CPU is in protected mode
;               32-bit LIGHTNING memory board is installed
;               DS contains DATA descriptor
;
;       Exit:   ax == 0000h if no high system memory errors
;               ax != 0000h if high system memory errors detected
;                       Base_Err.badhigh - hi  8 bits of error address
;                       Base_Err.badlow  - lo 16 bits of error address
;                       Base_Err.badbit  - erroneous bad bits
;
;****************************************************************
0064                          TestHighSysMem  proc    near 0064  B4 FE                              mov     ah,HIGH_SYS_SEG                 ; Segment of high system memory
0066  C7 06 0076 R 0080                  mov     Test_Size,HIGH_SYS_SIZE         ; Size of high system memory
                                                                                 ; Set 32-bit memory break segment
006C  C6 06 0083 R FF                    mov     memory_break,HIGH_MAX_SEG
      (B)                                mov     Kb_Mesg,FALSE                   ; Do not display "KB OK" message
0071  C6 06 0086 R 01                    mov     Kb_Mesg,TRUE                    ; Display "KB OK" message       (B)
0076  BD 0080                            mov     bp,BASE_MIN                     ; Set bp to minimum base memory (B)
0079  E8 0000 E                          call    MemTest                         ; Test_Test_Size of memory starting
                                                                                 ;   at segment in ah
007C  81 C5 0080                         add     bp,BASE_MIN                     ; Update bp, KB OK              (C)

0080  0B C0                              or      ax,ax                           ; Q: High system memory error?
0082  74 12                              jz      TestHighSysMem_Exit             ; N: Jump to exit if not
                                                                                 ; Y:
0084  88 2E 005A R                       mov     Base_Err.badhigh,ch             ; Store error address, bad data bits
0088  89 16 005B R                       mov     Base_Err.badlow,dx
008C  88 0E 005D R                       mov     Base_Err.badbit,cl
0090  81 0E 0058 R 0041                  or      Test_Status,(B_ERR + HALT_ERR)

0096                          TestHighSysMem_Exit:
0096  C3                                 ret                                     ; *** Return ***

TestHighSysMem  endp
                                  page
;****************************************************************
;
;       MovSysROM       Move System ROM to high memory set up high memory
;                       allocation table.
;
;       Entry:  CPU is in protected mode
;               32-bit LIGHTNING memory board is installed
;               DS contains DATA descriptor
;
;       Exit:   00F0000h - 00FFFFFh is copied to
;               0FF0000h - 0FFFFFFh
;               RAM_desc, DIAG_desc modified
;
;****************************************************************
0097                          MovSysROM       proc    near 0097  B0 7F                              mov     al,MEM_7F                       ; Update power-up sequence
0099  E6 84                              out     u_dma,al
                                                                                 ; Modify DIAG_desc to be the source
                                                                                 ; descriptor and RAM_desc to be the
                                                                                 ; destination descriptor.

;       Set up DIAG 386 descriptor

009B  C7 06 0050 R FFFF                  mov     [DIAG_desc.limit_386],FULL_SIZE
00A1  C7 06 0052 R 0000                  mov     [DIAG_desc.base_low_386],0
00A7  C6 06 0054 R 0F                    mov     [DIAG_desc.base_386],SYS_ROM_SEG
00AC  C6 06 0055 R 92                    mov     [DIAG_desc.access_386],DS_acc
00B1  C6 06 0056 R 00                    mov     [DIAG_desc.gd_limit_386],DIAG_GD_LIMIT
00B6  C6 06 0057 R 00                    mov     [DIAG_desc.base_high_386],0
```

```
                                        ; Set up RAM descriptor

00BB  C7 06 0048 R FFFF      mov     [RAM_desc.limit],FULL_SIZE
00C1  C7 06 004A R 0000      mov     [RAM_desc.base_low],0
00C7  C6 06 004C R FF        mov     [RAM_desc.base_high],HIGH_MAX_SEG
00CC  C6 06 004D R 92        mov     [RAM_desc.access],DS_acc
00D1  C7 06 004E R 0000      mov     [RAM_desc.res],0

00D7  06                     push    es                      ; Preserve es, ds
00D8  1E                     push    ds 00D9  B8 0050                mov     ax,DIAGSEL
00DC  8E D8                  mov     ds,ax                   ; ds -> System ROM selector
00DE  B8 0048                mov     ax,RAMSEL
00E1  8E C0                  mov     es,ax                   ; es -> high system RAM selector 00E3  33 F6                  xor     si,si                   ; Zero si, di
00E5  33 FF                  xor     di,di 00E7  B9 4000                mov     cx,16384                ; Number of words in a segment 00EA  FC                     cld                             ; String op's forward OSP
00EB  66                db   66h                             ; 16/32 operand size prefix
00EC  F3/ A5                 rep     movsw                   ; Word move System ROM to high memory 00EE  BB FFE0                mov     bx,ALLOC_PTR            ; Move allocation table pointer to di
00F1  8B 3F                  mov     di,[bx]                 ; mov di,[0FFFE0h]

00F3  BB FFE2                mov     bx,CPU_REV_PTR          ; Move cpu revision pointer to bx
00F6  8B 37                  mov     si,[bx]                 ; mov si,[0FFFE2h]

00F8  1F                     pop     ds                      ; Restore ds

; Set up DIAG 386 descriptor for DIAG byte access

00F9  C7 06 0050 R 0001      mov     [DIAG_desc.limit_386],DIAG_LIMIT
00FF  C7 06 0052 R 0000      mov     [DIAG_desc.base_low_386],DIAG_BASE_LOW
0105  C6 06 0054 R C0        mov     [DIAG_desc.base_386],DIAG_BASE
010A  C6 06 0055 R 92        mov     [DIAG_desc.access_386],DIAG_ACCESS
010F  C6 06 0056 R 00        mov     [DIAG_desc.gd_limit_386],DIAG_GD_LIMIT
0114  C6 06 0057 R 80        mov     [DIAG_desc.base_high_386],DIAG_BASE_HIGH 0119  8B 1E 0081 R           mov     bx,[High_Size]          ; Move high user memory to bx 011D  1E                     push    ds                      ; Preserve ds
011E  B8 0050                mov     ax,DIAGSEL
0121  8E D8                  mov     ds,ax                   ; ds -> DIAG byte selector 0123  E4 61                  in      al,PPI                  ; Read parity enable/disable
0125  50                     push    ax                      ; Preserve on stack
0126  0C 08                  or      al,(PPI_ENB_IOCHECK)    ; Disable I/O parity check
0128  E6 61                  out     PPO,al 012A  A0 0000                mov     al,byte ptr ds:[0]      ; Read diag byte
012D  C6 06 0000 FF          mov     byte ptr ds:[0],0FFh    ; Reset pending parity 0132  24 F0                  and     al,0F0h                 ; Mask bits 3:0 of diag byte
0134  26: 88 45 01           mov     es:[di.INSTALL],al      ; Store diag byte in INSTALL 0139  58                     pop     ax                      ; Restore I/O parity check to previous
0139  E6 61                  out     PPO,al                  ;   value 013B  26: C6 05 10           mov     es:[di.ALLOC_FE],FREE_FE ; Set ALLOC_FE to all free
013F  C1 E3 06               shl     bx,6                    ; Convert segments to paragraphs
0142  26: 89 5D 02           mov     es:[di.HIGH_TOTAL],bx   ; Set total high user memory
0146  26: 89 5D 04           mov     es:[di.HIGH_AVAIL],bx   ; Set available high user memory
014A  B5 FE                  mov     ch,HIGH_SYS_SEG
014C  32 C9                  xor     cl,cl                   ; cx = segment address
014E  C1 E1 04               shl     cx,4                    ; Convert cx to 1M paragraph offset
0151  26: 89 4D 06           mov     es:[di.HIGH_START],cx   ; Set starting segment 0155  8B FE                  mov     di,si                   ; Move cpu revision pointer to di
                             mov_ax_gs                       ; Get component, revision from gs
0157  8C E8                1  db     8Ch, 0E8h
0159  26: 88 25             mov     es:[di.COMPONENT],ah     ; Store component
015C  26: 89 45 01           mov     es:[di.CPU_REVISION],al ; Store revision 0160  B9 7FFF                mov     cx,(SYS_ROM_SIZE - 1)   ; Recalculate ROM checksum
0163  BE 8000                mov     si,SYS_ROM_OFFSET
0166  32 E4                  xor     ah,ah
0168  FC                     cld                             ; String op's increment 0169                  MovSysROM_Loop:
0169  26: AC                 lods    byte ptr es:[si]        ; Read a byte
016B  02 E0                  add     ah,al                   ; Add in to checksum
016D  E2 FA                  loop    MovSysROM_Loop          ; Add all (ROM - 1) bytes 016F  F6 D4                  not     ah                      ; Complement the checksum
0171  FE C4                  inc     ah                      ; Increment checksum
0173  26: 88 24              mov     es:[si],ah              ; Store checksum ; Replace System ROM and write protect
0176  C6 06 0000 FC          mov     byte ptr ds:[0],NOT (WRITEABLE + NOREPLACE)
017B  1F                     pop     ds                      ; Now executing out of RAM
017C  07                     pop     es 017D  C3                     ret                             ; * Return *
```

```
                    MovSysROM       endp
                    ;
                            page
                    ;***************************************************************
                    ;       Set32Break      Set base and extended memory 32-bit/16-bit
                    ;                       break segments.  Determined via DIAG byte.
                    ;
                    ;       Entry:  CPU is in protected mode
                    ;               32-bit LIGHTNING memory board is installed
                    ;               DS contains DATA descriptor
                    ;
                    ;       Exit:   base_32_break = base segment of 32-bit memory break
                    ;               ext_32_break  = ext segment of 32-bit memory break
                    ;
                    ;***************************************************************
                    ;
017E                Set32Break      proc    near
                    ;
017E  E8 01C0 R             call    ReadDIAG           ; Read DIAG byte into ah
0181  8A EC                 mov     ch,ah              ; ch == [DIAG]
                    ;
0183  BB 0280               mov     bx,640             ; Determine base memory 32-bit break
0186  F6 C5 20              test    ch,J640            ; Q: 640k jumper active?
0189  74 08                 jz      set_base_break     ; Y: Set base break to 640k
                                                       ; N:
018B  BB 0200               mov     bx,512
018E  F6 C5 10              test    ch,J512            ; Q: 512k jumper active?
0191  74 03                 jz      set_base_break     ; Y: Set base break to 512k
                                                       ; N:
0193  BB 0100               mov     bx,256             ; Default to 256k base break
                    ;
0196                set_base_break:
0196  B8 0400               mov     ax,1024            ; Convert kb in bx to segment in dl
0199  F7 E3                 mul     bx
019B  FE CA                 dec     dl                 ; Make dl (segment - 1)
019D  88 16 0084 R          mov     [base_32_break],dl
                    ;
01A1  BB 0400               mov     bx,1024            ; Determine extended memory break
01A4  F6 C5 40              test    ch,J1MEG           ; Q: 1 Meg jumper active?
01A7  75 08                 jnz     set_ext_break      ; N: Set break to 1 Meg
                                                       ; Y:
01A9  BB 0800               mov     bx,2*1024          ; Set bx to 2 Meg break address
01AC  F6 C5 80              test    ch,J2MEG           ; Q: 2 Meg jumper active?
01AF  75 03                 jnz     set_ext_break      ; N: Set break to 2 Meg
                                                       ; Y:
01B1  BB 2800               mov     bx,10*1024         ; Set break address to 10 Meg
                    ;
01B4                set_ext_break:
01B4  B8 0400               mov     ax,1024            ; Convert kb in bx to segment in dl
01B7  F7 E3                 mul     bx
01B9  FE CA                 dec     dl                 ; Make dl (segment - 1)
01BB  88 16 0085 R          mov     [ext_32_break],dl  ; Save extended 32-bit break segment
                    ;
01BF  C3                    ret                        ; *** Return ***
                    ;
                    Set32Break      endp
                            page
                    ;***************************************************************
                    ;       ReadDIAG        Read DIAG byte.
                    ;
                    ;       Entry:  CPU is in protected mode
                    ;               32-bit LIGHTNING memory board is installed
                    ;               DS contains DATA descriptor
                    ;
                    ;       Exit:   ah == [DIAG]
                    ;
                    ;       Regs:   ax
                    ;
                    ;***************************************************************
                    ;
01C0                ReadDIAG        proc    near
                    ;
                    ;       Set up DIAG 386 descriptor for DIAG byte access
                    ;
01C0  C7 06 0050 R 0001     mov     [DIAG_desc.limit_386],DIAG_LIMIT
01C6  C7 06 0052 R 0000     mov     [DIAG_desc.base_low_386],DIAG_BASE_LOW
01CC  C6 06 0054 R C0       mov     [DIAG_desc.base_3861,DIAG_BASE
01D1  C6 06 0055 R 92       mov     [DIAG_desc.access_386],DIAG_ACCESS
01D6  C6 06 0056 R 00       mov     [DIAG_desc.gd_limit_386],DIAG_GD_LIMIT
01DB  C6 06 0057 R 80       mov     [DIAG_desc.base_high_386],DIAG_BASE_HIGH
                    ;
01E0  1E                    push    ds                 ; Preserve ds
01E1  B8 0050               mov     ax,DIAGSEL
01E4  8E D8                 mov     ds,ax              ; ds -> DIAG byte selector
                    ;
01E6  E4 61                 in      al,PPI             ; Read parity enable/disable
01E8  8A E0                 mov     ah,al              ; Save current PPI setting in ah
01EA  0C 08                 or      al,(PPI_ENB_IOCHECK) ; Disable I/O parity check
01EC  E6 61                 out     PPO,al
                    ;
01EE  A0 0000               mov     al,byte ptr ds:[0] ; Read diag byte into al
01F1  C6 06 0000 FF         mov     byte ptr ds:[0],0FFh ; Reset pending parity
                    ;
01F6  86 E0                 xchg    ah,al              ; Move DIAG byte to al, PPI to al
01F8  E6 61                 out     PPO,al             ; Set PPI to original setting
```

```
01FA  1F                              pop     ds              ; Restore ds
01FB  C3                              ret                     ; *** Return ***
                                ReadDIAG        endp
01FC                            ROM     ends
                                        end
```

Microsoft (R) Macro Assembler  Version 4.00                8/13/86 11:49:46
TESTHRAM        Copyright (C) 1985,86 COMPAQ Computer Corp.        Symbols-1

Macros:

| N a m e | Lines |
|---|---|
| MOV_AX_GS | 1 |
| MOV_CR0_EAX | 1 |
| MOV_EAX_CR0 | 1 |
| MOV_GS_AX | 1 |
| MOV_GS_DX | 1 |
| OSP | 1 |
| POP_FS | 1 |
| POP_GS | 1 |
| PUSH_FS | 1 |
| PUSH_GS | 1 |

Structures and Records:

| N a m e | Width Shift | # fields Width | Mask | Initial |
|---|---|---|---|---|
| CPU_REV_COM | 0002 | 0002 | | |
| COMPONENT | 0000 | | | |
| CPU_REVISION | 0001 | | | |
| DESC | 0008 | 0005 | | |
| LIMIT | 0000 | | | |
| BASE_LOW | 0002 | | | |
| BASE_HIGH | 0004 | | | |
| ACCESS | 0005 | | | |
| RES | 0006 | | | |
| DESC_386 | 0008 | 0006 | | |
| LIMIT_386 | 0000 | | | |
| BASE_LOW_386 | 0002 | | | |
| BASE_386 | 0004 | | | |
| ACCESS_386 | 0005 | | | |
| GD_LIMIT_386 | 0006 | | | |
| BASE_HIGH_386 | 0007 | | | |
| HIGH_MEMORY | 0008 | 0005 | | |
| ALLOC_FE | 0000 | | | |
| INSTALL | 0001 | | | |
| HIGH_TOTAL | 0002 | | | |
| HIGH_AVAIL | 0004 | | | |
| HIGH_START | 0006 | | | |
| MEM_ERR | 0004 | 0003 | | |
| BADHIGH | 0000 | | | |
| BADLOW | 0001 | | | |
| BADBIT | 0003 | | | |
| TIG_DESC | 0008 | 0005 | | |
| OFFST | 0000 | | | |
| CS_SEL | 0002 | | | |
| TIG_UN | 0004 | | | |
| TIG_ACC | 0005 | | | |
| TIG_RES | 0006 | | | |

Segments and Groups:

| N a m e | Size | Align | Combine | Class |
|---|---|---|---|---|
| DATA | 021D | AT | 1C00 | |
| ROM | 01FC | BYTE | PUBLIC | 'ROM' |

Symbols:

| N a m e | Type | Value | Attr |
|---|---|---|---|
| A20OFF | Number | 00DD | |
| A20_ERR | Number | 0010 | |
| A20_ON | Number | 00DF | |
| ALLOC_PTR | Number | FFE0 | |
| ASC_ZERO | Number | 0030 | |
| BASE_32_BREAK | L BYTE | 0084 | DATA |
| BASE_ERR | L 0004 | 005A | DATA |
| BASE_FIRST | Number | 0002 | |
| BASE_HAL_ERR | L 0004 | 005E | DATA |
| BASE_LAST | Number | 0009 | |
| BASE_MIN | Number | 0080 | |
| BASE_SEG_INCR | Number | 0001 | |
| BCS_DESC | L 0008 | 0038 | DATA |
| BHAL_ERR | Number | 0004 | |
| BRAM_40 | Number | 0040 | |
| BRAM_41 | Number | 0041 | |
| BRAM_42 | Number | 0042 | |
| BRAM_43 | Number | 0043 | |
| BRAM_44 | Number | 0044 | |
| BRAM_45 | Number | 0045 | |
| BRAM_46 | Number | 0046 | |
| BRAM_47 | Number | 0047 | |

| Symbol | Type | Value | Attr | Notes |
|---|---|---|---|---|
| RAM_SEG | Number | 0040 | | |
| RSEL | Number | 0020 | | |
| T_B9 | Number | 00B9 | | |
| T_BA | Number | 00BA | | |
| T_BB | Number | 00BB | | |
| T_BC | Number | 00BC | | |
| _ERR | Number | 0001 | | |
| MEM_D0 | Number | 00D0 | | |
| MEM_D1 | Number | 00D1 | | |
| MEM_D2 | Number | 00D2 | | |
| MEM_D3 | Number | 00D3 | | |
| MEM_D4 | Number | 00D4 | | |
| MOS_BASE | L WORD | 006A | DATA | |
| MOS_EXT | L WORD | 006C | DATA | |
| MOS_SIZE | L WORD | 006E | DATA | |
| :ON | Number | 0004 | | |
| PU_REV_PTR | Number | FFE2 | | |
| SSEL | Number | 0030 | | |
| S_ACC | Number | 009A | | |
| S_DESC | L 0008 | 0030 | DATA | |
| ATA_SEG | Number | 1C00 | | |
| IAGSEL | Number | 0050 | | |
| IAG_2F | Number | 002F | | |
| IAG_ACCESS | Number | 0092 | | |
| IAG_BASE | Number | 00C0 | | |
| IAG_BASE_HIGH | Number | 0080 | | |
| IAG_BASE_LOW | Number | 0000 | | |
| IAG_DESC | L 0008 | 0050 | DATA | |
| IAG_GD_LIMIT | Number | 0000 | | |
| IAG_LIMIT | Number | 0001 | | |
| IGIT_LEN | Number | 0005 | | |
| ISP_STRING | L WORD | 0087 | DATA | Length = 0008 |
| DK_A0 | Number | 00A0 | | |
| DK_A1 | Number | 00A1 | | |
| DK_A2 | Number | 00A2 | | |
| DK_A3 | Number | 00A3 | | |
| DK_A4 | Number | 00A4 | | |
| DK_A5 | Number | 00A5 | | |
| DK_A6 | Number | 00A6 | | |
| DK_A7 | Number | 00A7 | | |
| DK_A8 | Number | 00A8 | | |
| DK_A9 | Number | 00A9 | | |
| DK_AA | Number | 00AA | | |
| DK_AB | Number | 00AB | | |
| DK_AC | Number | 00AC | | |
| DK_AD | Number | 00AD | | |
| DK_AE | Number | 00AE | | |
| DK_AF | Number | 00AF | | |
| DPL0 | Number | 0000 | | |
| DPL1 | Number | 0020 | | |
| DPL2 | Number | 0040 | | |
| DPL3 | Number | 0060 | | |
| DSSEL | Number | 0018 | | |
| DS_ACC | Number | 0092 | | |
| DS_DESC | L 0008 | 0018 | DATA | |
| EHAL_ERR | Number | 0008 | | |
| EM | Number | 0004 | | |
| ERR_RST | Number | 0003 | | |
| ES_DESC | L 0008 | 0020 | DATA | |
| EXT_32_BREAK | L BYTE | 0085 | DATA | |
| EXT_ERR | L 0004 | 0062 | DATA | |
| EXT_FIRST | Number | 0010 | | |
| EXT_HAL_ERR | L 0004 | 0066 | DATA | |
| EXT_LAST | Number | 00FD | | |
| EXT_MIN | Number | 0000 | | |
| EXT_SEG_INCR | Number | 0001 | | |
| EX_DOWN | Number | 0004 | | |
| E_ERR | Number | 0002 | | |
| FALSE | Number | 0000 | | |
| FOUND_ | L WORD | 0070 | DATA | |
| FOUND_EXT | L WORD | 0072 | DATA | |
| FOUND_SIZE | L WORD | 0074 | DATA | |
| FREE_FE | Number | 0010 | | |
| FULL_SIZE | Number | FFFF | | |
| FX_B0 | Number | 00B0 | | |
| FX_B1 | Number | 00B1 | | |
| FX_B2 | Number | 00B2 | | |
| FX_B3 | Number | 00B3 | | |
| FX_B4 | Number | 00B4 | | |
| FX_B5 | Number | 00B5 | | |
| FX_B6 | Number | 00B6 | | |
| FX_B7 | Number | 00B7 | | |
| FX_B9 | Number | 00B8 | | |
| GDT | L 0008 | 0000 | DATA | |
| GDTLIM | Number | 0057 | | |
| GDTSEL | Number | 0008 | | |
| GDT_DESC | L 0008 | 0008 | DATA | |
| GOOD_SIZE | L WORD | 0078 | DATA | |
| HALT_ERR | Number | 0040 | | |
| HAL_ERR | Number | 0002 | | |
| HIGH_MAX_SEG | Number | 00FF | | |
| HIGH_MIN_SEG | Number | 00F0 | | |

| Name | Type | Value | Section | Notes |
|---|---|---|---|---|
| HIGH_SEGMENT | L BYTE | 0080 | DATA | |
| HIGH_SIZE | L WORD | 0081 | DATA | |
| HIGH_SYS_SEG | Number | 00FE | | |
| HIGH_SYS_SIZE | Number | 0080 | | |
| HIGH_USER_SEG | Number | 00FA | | |
| HIGH_USER_SIZE | Number | 0100 | | |
| IDTSEL | Number | 0010 | | |
| IDT_DESC | L 0008 | 0010 | DATA | |
| IG_ACC | Number | 0086 | | |
| IRQ0_SEL | Number | 0008 | | |
| IRQ9_SEL | Number | 0070 | | |
| J1MEG | Number | 0040 | | |
| J2MEG | Number | 0080 | | |
| J512 | Number | 0010 | | |
| J640 | Number | 0020 | | |
| KBD_TO | Number | 1000 | | |
| KB_MESG | L BYTE | 0086 | DATA | |
| KEY_80 | Number | 0080 | | |
| KEY_81 | Number | 0081 | | |
| KEY_82 | Number | 0082 | | |
| KEY_83 | Number | 0083 | | |
| KEY_84 | Number | 0084 | | |
| KEY_86 | Number | 0086 | | |
| KEY_87 | Number | 0087 | | |
| KEY_88 | Number | 0088 | | |
| KEY_89 | Number | 0089 | | |
| KEY_8A | Number | 008A | | |
| KEY_8B | Number | 008B | | |
| KEY_8C | Number | 008C | | |
| KEY_8D | Number | 008D | | |
| MEMORY_BREAK | L BYTE | 0083 | DATA | |
| MEMTEST | L NEAR | 0000 | ROM | External |
| MEM_60 | Number | 0060 | | |
| MEM_61 | Number | 0061 | | |
| MEM_62 | Number | 0062 | | |
| MEM_63 | Number | 0063 | | |
| MEM_64 | Number | 0064 | | |
| MEM_65 | Number | 0065 | | |
| MEM_66 | Number | 0066 | | |
| MEM_67 | Number | 0067 | | |
| MEM_68 | Number | 0068 | | |
| MEM_69 | Number | 0069 | | |
| MEM_6A | Number | 006A | | |
| MEM_6B | Number | 006B | | |
| MEM_6C | Number | 006C | | |
| MEM_6D | Number | 006D | | |
| MEM_6E | Number | 006E | | |
| MEM_6F | Number | 006F | | |
| MEM_70 | Number | 0070 | | |
| MEM_71 | Number | 0071 | | |
| MEM_72 | Number | 0072 | | |
| MEM_73 | Number | 0073 | | |
| MEM_74 | Number | 0074 | | |
| MEM_7C | Number | 007C | | |
| MEM_7D | Number | 007D | | |
| MEM_7E | Number | 007E | | |
| MEM_7F | Number | 007F | | |
| MM_ERR | Number | 0080 | | |
| MOVSYSROM | N PROC | 0097 | ROM | Global Length = 00E7 |
| MOVSYSROM_LOOP | L NEAR | 0169 | ROM | |
| MP | Number | 0002 | | |
| M_DMA | Number | 0085 | | |
| M_RESET_00 | Number | 0000 | | |
| M_RUN_01 | Number | 0001 | | |
| NOREPLACE | Number | 0001 | | |
| NORMAL | Number | 0007 | | |
| OK_MEM | Number | 0000 | | |
| OK_RST | Number | 0002 | | |
| OPT_E0 | Number | 00E0 | | |
| OPT_E1 | Number | 00E1 | | |
| OPT_E2 | Number | 00E2 | | |
| OPT_E3 | Number | 00E3 | | |
| PE | Number | 0001 | | |
| PPI | Number | 0061 | | |
| PPI_ENB_IOCHECK | Number | 0008 | | |
| PPI_ENB_PCHECK | Number | 0004 | | |
| PPI_IOCHECK | Number | 0040 | | |
| PPI_PCHECK | Number | 0080 | | |
| PPI_REFRSH | Number | 0010 | | |
| PPI_SPKR_DATA | Number | 0002 | | |
| PPI_SPKR_GATE | Number | 0001 | | |
| PPI_T2OUT | Number | 0020 | | |
| PPO | Number | 0061 | | |
| PPO_ENB_IOCHECK | Number | 0008 | | |
| PPO_ENB_PCHECK | Number | 0004 | | |
| PPO_INIT | Number | 000C | | |
| PPO_SPKR_DATA | Number | 0002 | | |
| PPO_SPKR_GATE | Number | 0001 | | |
| PRES | Number | 0080 | | |
| PROT_75 | Number | 0075 | | |
| PROT_76 | Number | 0076 | | |

| Symbol | Type | Value | Location | Notes |
|---|---|---|---|---|
| PROT_77 | Number | 0077 | | |
| PROT_78 | Number | 0078 | | |
| PROT_79 | Number | 0079 | | |
| PROT_7A | Number | 007A | | |
| PROT_7B | Number | 007B | | |
| RAMI_30 | Number | 0030 | | |
| RAMI_31 | Number | 0031 | | |
| RAMI_32 | Number | 0032 | | |
| RAMI_33 | Number | 0033 | | |
| RAMI_34 | Number | 0034 | | |
| RAMI_35 | Number | 0035 | | |
| RAMI_36 | Number | 0036 | | |
| RAMI_37 | Number | 0037 | | |
| RAMI_38 | Number | 0038 | | |
| RAMI_39 | Number | 0039 | | |
| RAMI_3A | Number | 003A | | |
| RAMI_3B | Number | 003B | | |
| RAMSEL | Number | 0048 | | |
| RAM_DESC | L | 0008 0048 | DATA | |
| RAM_ERR_BEEPS | Number | 0000 | | |
| RAM_IDT | L BYTE | 009D | DATA | |
| RAM_IDTLIM | Number | 017F | | |
| RD | Number | 0002 | | |
| READDIAG | N PROC | 01C0 | ROM | Global Length = 003C |
| RESET_00 | Number | 0000 | | |
| RESET_01 | Number | 0001 | | |
| RESET_02 | Number | 0002 | | |
| RESET_03 | Number | 0003 | | |
| RESET_04 | Number | 0004 | | |
| RESET_05 | Number | 0005 | | |
| RESET_06 | Number | 0006 | | |
| RESET_07 | Number | 0007 | | |
| RESET_08 | Number | 0008 | | |
| RESET_09 | Number | 0009 | | |
| RESET_0A | Number | 000A | | |
| RESET_0B | Number | 000B | | |
| RESET_0C | Number | 000C | | |
| RESET_0F | Number | 000F | | |
| RST286 | Number | 00FE | | |
| RUN_10 | Number | 0010 | | |
| RUN_11 | Number | 0011 | | |
| RUN_12 | Number | 0012 | | |
| RUN_13 | Number | 0013 | | |
| RUN_14 | Number | 0014 | | |
| RUN_15 | Number | 0015 | | |
| RUN_16 | Number | 0016 | | |
| RUN_17 | Number | 0017 | | |
| SANITY_OD | Number | 000D | | |
| SANITY_OE | Number | 000E | | |
| SAN_10 | Number | 0010 | | |
| SAN_11 | Number | 0011 | | |
| SAN_12 | Number | 0012 | | |
| SAN_13 | Number | 0013 | | |
| SAN_14 | Number | 0014 | | |
| SAN_15 | Number | 0015 | | |
| SAN_16 | Number | 0016 | | |
| SAN_17 | Number | 0017 | | |
| SAN_18 | Number | 0018 | | |
| SAN_19 | Number | 0019 | | |
| SAN_1A | Number | 001A | | |
| SAN_1B | Number | 001B | | |
| SAN_1C | Number | 001C | | |
| SAN_1D | Number | 001D | | |
| SAN_1E | Number | 001E | | |
| SAN_1F | Number | 001F | | |
| SAN_20 | Number | 0020 | | |
| SAN_21 | Number | 0021 | | |
| SAN_22 | Number | 0022 | | |
| SAN_23 | Number | 0023 | | |
| SAN_24 | Number | 0024 | | |
| SAN_25 | Number | 0025 | | |
| SAN_26 | Number | 0026 | | |
| SAN_27 | Number | 0027 | | |
| SAN_28 | Number | 0028 | | |
| SAN_29 | Number | 0029 | | |
| SAN_2A | Number | 002A | | |
| SAN_2B | Number | 002B | | |
| SAN_2C | Number | 002C | | |
| SAN_2D | Number | 002D | | |
| SB_90 | Number | 0090 | | |
| SB_91 | Number | 0091 | | |
| SB_92 | Number | 0092 | | |
| SB_93 | Number | 0093 | | |
| SB_94 | Number | 0094 | | |
| SB_95 | Number | 0095 | | |
| SB_96 | Number | 0096 | | |
| SEG_512 | Number | 00F4 | | |
| SEG_640 | Number | 00F8 | | |
| SET32BREAK | N PROC | 017E | ROM | Global Length = 0042 |
| SET_BASE_BREAK | L NEAR | 0196 | ROM | |
| SET_EXT_BREAK | L NEAR | 01B4 | ROM | |
| SIZEHIGHMEM | N PROC | 0000 | ROM | Global Length = 0073 |
| SIZEHIGHMEM_LOOP | L NEAR | 0020 | ROM | |
| SIZE_1 | L NEAR | 0049 | ROM | |
| SIZE_1MEG | Number | 0400 | | |
| SIZE_2 | L NEAR | 0054 | ROM | |

| | | | | |
|---|---|---|---|---|
| SIZE_2MEG | | Number | 0800 | |
| SIZE_3 | | L NEAR | 0062 | ROM |
| SIZE_512 | | Number | 0100 | |
| SIZE_640 | | Number | 0080 | |
| SIZE_8MEG | | Number | 2000 | |
| SIZE_BASE | | L WORD | 007A | DATA |
| SIZE_EXT | | L WORD | 007C | DATA |
| SIZE_FINAL | | L WORD | 007E | DATA |
| SSSEL | | Number | 0028 | |
| SS_DESC | | L 0008 | 0028 | DATA |
| SYS_ROM_OFFSET | | Number | 8000 | |
| SYS_ROM_SEG | | Number | 000F | |
| SYS_ROM_SIZE | | Number | 8000 | |
| | | | | |
| TESTHIGHSYSMEM | | N PROC | 0064 | ROM Global Length = 0033 |
| TESTHIGHSYSMEM_EXIT | | L NEAR | 0096 | ROM |
| TEST_SIZE | | L WORD | 0076 | DATA |
| TEST_STATUS | | L WORD | 0058 | DATA |
| TEST_STR_LEN | | Number | 000B | |
| TRAM_ERR | | Number | 0001 | |
| TRG_ACC | | Number | 0087 | |
| TRUE | | Number | 0001 | |
| | | | | |
| U_DMA | | Number | 0084 | |
| | | | | |
| VDU_50 | | Number | 0050 | |
| VDU_51 | | Number | 0051 | |
| VDU_52 | | Number | 0052 | |
| VDU_53 | | Number | 0053 | |
| VDU_54 | | Number | 0054 | |
| VDU_55 | | Number | 0055 | |
| VDU_56 | | Number | 0056 | |
| VDU_57 | | Number | 0057 | |
| VDU_58 | | Number | 0058 | |
| VDU_59 | | Number | 0059 | |
| VDU_5A | | Number | 005A | |
| VDU_5B | | Number | 005B | |
| VDU_5C | | Number | 005C | |
| VDU_5D | | Number | 005D | |
| VDU_5E | | Number | 005E | |
| VDU_5F | | Number | 005F | |
| VIDSEL | | Number | 0040 | |
| VID_DESC | | L 0008 | 0040 | DATA |
| VID_SEG | | Number | 8000 | |
| | | | | |
| WR | | Number | 0002 | |
| WRITEABLE | | Number | 0002 | |

```
1089 Source Lines
1095 Total Lines
35526 Bytes symbol space free

0 Warning Errors
    0 Severe Errors
```

CONFIDENTIAL
Aug 13, 1986
Gary Brasher

There are two 2 listings on this diskette. File CLEARMEM.LST contains the
routine, clr_mem, that calls routine MovSysROM in file TESTHRAM.LST.
MovSysROM will move the ROM code to RAM space and write to the memory
location that replaces the ROM address space with RAM and write protects
that RAM.

APPENDIX S

DUAL MAPPED
ROM SUBROUTINE

Microsoft (R) Macro Assembler Version 4.00     8/13/86 11:48:24 clr_mem Copyright (C) 1985,86 COMPAQ Computer Corp.     Page    1-1

```
                    page    58,132
                    title   clr_mem Copyright (C) 1985,86 COMPAQ Computer Corp.
            ;************************************************************
            ;
            ; Name:     clr_mem
            ;
            ; Group:    ROM
            ;
            ; Revision: A
            ;
            ; Date:     May 25, 1986
            ;
            ; Author:   Steve Preston
            ;
            ;************************************************************
            ;
            ; Changes:
            ;
```

```
;        Date      Revision            Description
;        --------  --------            -----------
;        05/14/86  Original    Adapted from Deskpro 286 Rev. E System ROM.
;****************************************************************************
;
;        Functional Description:
;
;             This module clears Base Memory above 64K and all extended memory
;             32 bits at a time.
;
;****************************************************************************
.286P
        page
;****************************************************************************
;
;        Public Declarations
;
;**************************************************************************** public   clr_mem              ; Test protected mode

;****************************************************************************
;
;        RAM External References
;
;**************************************************************************** extrn    ram400:word
        extrn    memsize:word          ; Base memory size (KB)
        extrn    rst_off:word          ; For saving sp
        extrn    rst_seg:word          ; For saving ss 0000    ROM     segment byte public 'ROM'
        assume  cs:ROM ;****************************************************************************
;
;        External References
;
;**************************************************************************** extrn    goprot:near           ; Go to protected mode (Test_Mem.asm)
        extrn    out_err_code:near     ; Report error code. (test_utl.asm)
        extrn    SizeHighMem:near      ; Size high memory. (mem_utl.asm)
        extrn    sb_err_msg:byte       ; System board error message.
        extrn    sb_err_len:abs
        extrn    sb_err_beeps:abs
        extrn    MovSysROM:near        ; Copy System ROM to high memory
        extrn    real_idt:word         ; Real mode idt
        extrn    Gate_A20:near         ; Disable Gate A20

;****************************************************************************
;
;        Equates
;
;****************************************************************************
C       .list C        include mach_def.equ
C ;****************************************************************************
;
;        (inline opcode macros)

C  mov_eax_cr0   macro
C        db      0Fh, 20h, 00h
C        endm
C  ;
C  mov_cr0_eax   macro
C        db      0Fh, 22h, 00h
C        endm
C  ;
C  mov_gs_dx     macro
C        db      8Eh, 0EAh
C        endm
C  ;
C  mov_ax_gs     macro
C        db      8Ch, 0E8h
C        endm
C  ;
C  mov_gs_ax     macro
C        db      8Eh, 0E8h
C        endm
C  ;
C  OSP           macro
C        db      66h                   ; 16/32 operand size prefix
C        endm
C  ;
C  push_fs macro
C        db      0Fh, 0A0h
C        endm
C  ;
C  push_gs macro
C        db      0Fh, 0A8h
C        endm
C  ;
C  pop_fs  macro
C        db      0Fh, 0A1h
C        endm
```

```
           C    ;
           C    pop_gs   macro
           C             db       0Fh, 0A9h
           C             endm
           C    ;
```

```
           C             include  mem_def.equ       ; Memory test equates
           C    ;************************************************************
           C    ;
           C    ;    Memory test definitions, equates, structures, data segment
           C    ;
           C    ;************************************************************
           C    ;
           C    ;    Structures
           C    ;
           C    ;...........................................................
           C    ;
           C    desc     struc
0002  ????  C    base_low     dw    ?            ; low 16 bits of 24-bit address
0004   ??   C    base_high    db    ?            ; high 8 bits of 24-bit address
0005   ??   C    access       db    ?            ; access rights byte
0006  ????  C    res          dw    ?            ; reserved word
0008        C    desc         ends
           C    ;
           C    desc_386     struc                ; 386 descriptor
0000  ????  C    limit_386    dw    ?            ; limit bits 15t0
0002  ????  C    base_low_386 dw    ?            ; low 16 bits of 32-bit address
0004   ??   C    base_386     db    ?            ; mid 8 bits of 32-bit address
0005   ??   C    access_386   db    ?            ; access rights byte
0006   ??   C    gd_limit_386 db    ?            ; grand, operand, limit bits 19t16
0007   ??   C    base_high_386 db   ?            ; high 8 bits of 32-bit address
0008        C    desc_386     ends
           C    ;
           C    ;    Trap or Interrupt Gate
           C    TIG_desc     struc
0000  ????  C    offst        dw    ?            ; offset to code with code segment
0002  ????  C    CS_sel       dw    ?            ; code segment selector
0004   ??   C    TIG_un       db    ?            ; unused
0005   ??   C    TIG_acc      db    ?            ; access
0006  ????  C    TIG_res      dw    ?            ; reserved
0008        C    TIG_desc     ends
           C    ;
           C    ;    Memory Error structure
           C    mem_err      struc
0000   ??   C    badhigh      db    ?            ; high byte of addr of bad byte
0001  ????  C    badlow       dw    ?            ; low word of addr of bad byte
0003   ??   C    badbit       db    ?            ; erroneous bit of bad byte
0004        C    mem_err      ends
           C             page
           C    ;
           C    ;    Equates
           C    ;
= 0001      C    TRUE         equ   1
= 0000      C    FALSE        equ   0
           C
= 0000      C    RAM_ERR_BEEPS equ  0000H        ; # of beeps for ram error message
           C
= 8000      C    SYS_ROM_OFFSET equ 08000H       ; offset for start of system ROM.
= 8000      C    SYS_ROM_SIZE  equ  08000H       ; system ROM size in bytes.
           C
= 0005      C    DIGIT_LEN    equ   5            ; # of digits in mem test KB OK display
= 000B      C    TEST_STR_LEN equ   11           ; # of chars in output string for mem test
= 0002      C    NORMAL       equ   02H          ; normal video attrib
= 0030      C    ASC_ZERO     equ   30H          ; ascii zero '0'
           C
= 00DF      C    A20_ON   equ   0DFH             ; enable gate A20
= 00DD      C    A20OFF   equ   0DDH             ; disable gate A20
= 00FE      C    RST286   equ   0FEH             ; processor reset
= 1000      C    FRD_TO   equ   1000H            ; about 20ms
           C    ;
           C    ;    Reset Codes
           C    ;
= 0002      C    OK_RST   equ   02H              ; mem ok
= 0003      C    ERR_RST  equ   03H              ; mem error
           C    ;
           C    ;    test_mem error codes
           C    ;
= 0000      C    OK_MEM       equ   00H          ; no error
= 0001      C    TRAM_ERR     equ   01H          ; RAM test error from Mem_Test
= 0002      C    HAL_ERR      equ   02H          ; High Address Line Error.
           C    ;
           C    ;    Test_Status error codes
           C    ;
= 0001      C    B_ERR        equ   01H          ; Base Memory Error
= 0002      C    E_ERR        equ   02H          ; Extended Memory Error
= 0004      C    BHAL_ERR     equ   04H          ; Base Memory High Addr line error- system bd
= 0008      C    EHAL_ERR     equ   08H          ; Extended Mem High Addr line error.
= 0010      C    A20_ERR      equ   10H          ; unable to set A20 line
= 0040      C    HALT_ERR     equ   40H          ; Halt cpu due to memory error
= 0080      C    MM_ERR       equ   80H          ; memory miscompare error
           C
           C    ;    Access rights bits
= 0080      C    PRES     equ   80H              ; present bit
= 0000      C    DPL0     equ   00H              ; DPL = 0;
= 0020      C    DPL1     equ   20H              ; DPL = 1;
= 0040      C    DPL2     equ   40H              ; DPL = 2;
= 0060      C    DPL3     equ   60H              ; DPL = 3;
```

```
= 0092        C   DS_acc    equ    92H          ; Data Segment - DPL = 0, writable
= 0090        C   RO_acc    equ    90H          ; Read only data segment
              C
= 0090        C   CS_acc    equ    9AH          ; Code Segment - DPL = 0, readable,non-conforn
= 0004        C   CON       equ    04H          ; Conforming bit for Code Segment
= 0002        C   RD        equ    02H          ; Readable bit for Code Segment
              C
= 0086        C   IG_acc    equ    86H          ; Interrupt Gate - DPL =0
= 0087        C   TrG_acc   equ    87H          ; Trap Gate - DPL = 0
              C ;
              C ;         Machine status word bit positions
              C ;
= 0001        C   PE        equ    1            ; Protection enable
= 0002        C   MP        equ    2            ; Monitor processor extension
= 0004        C   EM        equ    4            ; Emulate processor extension
              C ;
              C ;         Segment sizes
              C ;
= FFFF        C   FULL_SIZE      equ    0FFFFh
              C ;***********************************************************************
              C ;
              C ;         DIAG byte equates, address 80C00000h, segment length 1 byte
              C ;         access rights are same as ROM desc
              C ;
              C ;***********************************************************************
= 0001        C   DIAG_LIMIT       equ    00001h       ; DIAG segment limit bits 15:00
= 0000        C   DIAG_BASE_LOW    equ    00000h       ; DIAG base bits 15:00
= 000C        C   DIAG_BASE        equ    0C0h         ; DIAG base bits 23:16
= 0092        C   DIAG_ACCESS      equ    10010010b    ; DIAG access byte
= 0000        C   DIAG_GD_LIMIT    equ    000h         ; DIAG G, D, limit bits 19:16
= 0080        C   DIAG_BASE_HIGH   equ    080h         ; DIAG base bits 31:24
              C ;
= 0001        C   NOREPLACE   equ    00000001b   ; High system memory can be written
= 0002        C   WRITEABLE   equ    00000010b   ; System ROM is not replaced
              C ;
= 000F        C   SYS_ROM_SEG   equ    00Fh       ; Starting System ROM segment
              C
= 00FF        C   HIGH_MAX_SEG   equ    0FFh       ; Maximum high system memory segment
= 00F0        C   HIGH_MIN_SEG   equ    0F0h       ; Minimum high system memory segment
= 00FE        C   HIGH_SYS_SEG   equ    0FEh       ; Segment of high system memory
= 0080        C   HIGH_SYS_SIZE  equ    128        ; Size of high system memory (k)
              C
= 00FA        C   HIGH_USER_SEG   equ    0FAh      ; Starting high user memory segment
= 0100        C   HIGH_USER_SIZE  equ    256       ; Minimum high user memory (k)
              C ;
= 0020        C   J640      equ    00100000b     ; 640k jumper inactive
= 0080        C   SIZE_640  equ    128           ; Additional high memory if J640 inactive
= 00F8        C   SEG_640   equ    0F8h          ; Starting segment if J640 inactive
              C ;
= 0010        C   J512      equ    00010000b     ; 512k jumper inactive
= 0100        C   SIZE_512  equ    256           ; Additional high memory if J512 inactive
= 00F4        C   SEG_512   equ    0F4h          ; Starting segment if J512 inactive
              C ;
= 0040        C   J1MEG     equ    01000000b     ; 1Meg jumper inactive
= 0400        C   SIZE_1MEG equ    1024          ; 1Meg in k bytes
              C ;
= 0800        C   SIZE_2MEG equ    2*1024        ; 2Meg in k bytes
= 2000        C   SIZE_8MEG equ    8*1024        ; 8Meg in k bytes
              C ;
              C   high_memory   struc            ; Structure for allocating high memory
0000 ??       C   ALLOC_FE     db    ?           ; Number of free 4k blocks, segment FEh
0001 ??       C   INSTALL      db    ?           ; Bits 7:4 copy of 32-bit memory diag byte
              C                                  ; Bits 3:0 = 0000b, 32-bit memory installed
0002 ????     C   HIGH_TOTAL   dw    ?           ; Total number of 16-byte blocks of high memor
0004 ????     C   HIGH_AVAIL   dw    ?           ; Number of 16-byte blocks of high memory avai
0006 ????     C   HIGH_START   dw    ?           ; Segment of first byte of used high memory
0008          C   high_memory  ends
              C ;
= FFE0        C   ALLOC_PTR   equ    0FFE0h      ; Pointer to high memory alloc table
= 0010        C   FREE_FE     equ    10h         ; All 4k pages in seg 0FEh are free
              C ;
= FFE2        C   CPU_REV_PTR equ    0FFE2h      ; Pointer to cpu component, revision
              C ;
              C   cpu_rev_com   struc
0000 ??       C   COMPONENT    db    ?           ; Cpu component
0001 ??       C   CPU_REVISION db    ?           ; Cpu revision
0002          C   cpu_rev_com  ends
              C ;
              C ;***********************************************************************
              C ;
              C ;         GDT selectors
              C ;
              C ;***********************************************************************
= 0008        C   GDTSEL   equ   1 * size desc   ; selector for GDT segment
= 0010        C   IDTSEL   equ   2 * size desc   ; selector for IDT segment
= 0018        C   DSSEL    equ   3 * size desc   ; selector for DATA Segment
= 0020        C   BRSEL    equ   4 * size desc   ; selector for BIOS RAM Segment
= 0028        C   SSSEL    equ   5 * size desc   ; selector for SS Segment
= 0030        C   CSSEL    equ   6 * size desc   ; selector for CS
= 0040        C   VIDSEL   equ   8 * size desc   ; selector for Video RAM area
= 0048        C   RAMSEL   equ   9 * size desc   ; selector for general RAM selector
= 0050        C   DIAGSEL  equ   10 * size desc  ; selector for diag byte on 32-bit memory boar
              C ;
              C ;         IDT selectors
              C ;
= 0008        C   IRQ0_SEL  equ   08H             ; normal irq0 setting
= 0070        C   IRQ8_SEL  equ   70H             ; normal irq8 setting
              C ;
              C           Segments
```

```
= 1C00                      C    DATA_SEG     equ    01C00H       ; scratch area
= 0040                      C    BRAM_SEG     equ    00040H       ; start of area for memory test
= B000                      C    VID_SEG      equ    0B000H       ; video ram area
                            C    ;
                            C    ;            Minimum Memory sizes from testing
                            C    ;
= 0000                      C    BASE_MIN     equ    00000H       ; 1/0K increments for base memory
  0000                      C    EXT_MIN      equ    00000H       ; 64 increments for extended memory
                            C
                            C    ;
= 0002                      C    BASE_FIRST   equ    02H          ; First segment for Base mem test - High byte
= 0009                      C    BASE_LAST    equ    09H          ; Last segment for Base mem test - High byte
= 0001                      C    BASE_SEG_INCR equ   01H          ; 64K blocks for Base memory sizing
                            C
= 0010                      C    EXT_FIRST    equ    10H          ; First seg of Extended Mem - High byte of a
= 00FD                      C    EXT_LAST     equ    0FDH         ; Last seg of Extended Mem - High byte
= 0001                      C    EXT_SEG_INCR equ    01H          ; 64K blocks for Extended memory sizing
                            C    ;
                            C                 DATA SEGMENT
                            C    ;
                            C         page
 0000                       C    DATA   segment at DATA_SEG
                            C           assume ds:DATA
                            C    ;
                            C    ;     Global Descriptor Table
                            C    ;
 0000 ????                  C    GDT          desc   <>           ; dummy descriptor
 0002 ????                  C
 0004 ??                    C
 0005 ??                    C
 0006 ????                  C
                            C
 0008 ????                  C    GDT_desc     desc   <>           ; GDT descriptor of itself
 000A ????                  C
 000C ??                    C
 000D ??                    C
 000E ????                  C
                            C
 0010 ????                  C    IDT_desc     desc   <>           ; IDT descriptor
 0012 ????                  C
 0014 ??                    C
 0015 ??                    C
 0016 ????                  C
                            C
 0018 ????                  C    DS_desc      desc   <>           ; Data Segment descr
 001A ????                  C
 001C ??                    C
 001D ??                    C
 001E ????                  C
                            C
 0020 ????                  C    ES_desc      desc   <>           ; BIOS RAM Segment descr
 0022 ????                  C
 0024 ??                    C
 0025 ??                    C
 0026 ????                  C
                            C
 0028 ????                  C    SS_desc      desc   <>           ; SS descr
 002A ????                  C
 002C ??                    C
 002D ??                    C
 002E ????                  C
                            C
 0030 ????                  C    CS_desc      desc   <>           ; CS descriptor (current)
 0032 ????                  C
 0034 ??                    C
 0035 ??                    C
 0036 ????                  C
                            C
 0038 ????                  C    BCS_desc     desc   <>           ; BIOS CS descriptor
 003A ????                  C
 003C ??                    C
 003D ??                    C
 003E ????                  C
                            C
 0040 ????                  C    VID_desc     desc   <>           ; Video RAM memory
 0042 ????                  C
 0044 ??                    C
 0045 ??                    C
 0046 ????                  C
                            C
 0048 ????                  C    RAM_desc     desc   <>           ; Test RAM descriptor
 004A ????                  C
 004C ??                    C
 004D ??                    C
 004E ????                  C
                            C
 0050 ????                  C    DIAG_desc    desc_386 <>         ; Diag byte descriptor
 0052 ????                  C
 0054 ??                    C
 0055 ??                    C
 0056 ??                    C
 0057 ??                    C
                            C
                            C    ;
= 0057                      C    GDTLIM       equ    $-GDT-1      ; limit of GDT
                            C    ;
```

```
                            C       page
                            C   ;
                            C   ;       Temporary storage
                            C   ;
0058  ????                  C   Test_Status     dw      ?       ; status of Memory Test 0 => no error
005A  ??                    C   Base_Err        mem_err <>      ; error return from Base memory test
005B  ????                  C
005D  ??                    C
                            C
005E  ??                    C   Base_HAL_Err    mem_err <>      ; error return from Base_HAL_test
005F  ????                  C
0061  ??                    C
                            C
0062  ??                    C   Ext_Err         mem_err <>      ; error return from Extended memory test
0063  ????                  C
0065  ??                    C
                            C
0066  ??                    C   Ext_HAL_Err     mem_err <>      ; error return from Extended HAL test
0067  ????                  C
0069  ??                    C
                            C
006A  ????                  C   CMOS_Base       dw      ?       ; Size of Base Memory as stored in CMOS RAM
006C  ????                  C   CMOS_Ext        dw      ?       ; Size of Extended Mem as stored in CMOS RAM
006E  ????                  C   CMOS_Size       dw      ?       ; Size from CMOS RAM
                            C
0070  ????                  C   Found_Base      dw      ?       ; Size of Base Mem as Found by SizeMem
0072  ????                  C   Found_Ext       dw      ?       ; Size of Extended Mem as Found by SizeMem
0074  ????                  C   Found_Size      dw      ?
                            C
0076  ????                  C   Test_Size       dw      ?
                            C
0078  ????                  C   Good_Size       dw      ?
                            C
007A  ????                  C   Size_Base       dw      ?       ; Final Size of Base Memory
007C  ????                  C   Size_Ext        dw      ?       ; Final Size of Extended Memory
007E  ????                  C   Size_Final      dw      ?
                            C
0080  ??                    C   High_Segment    db      ?       ; Starting segment of High Memory
0081  ????                  C   High_Size       dw      ?       ; Size of High_Memory
                            C   ;
0083  ??                    C   memory_break    db      ?       ; Break segment for MemTest routine
0084  ??                    C   base_32_break   db      ?       ; Break segment of base 32-bit memory
0085  ??                    C   ext_32_break    db      ?       ; Break segment of ext 32-bit memory
                            C   ;
0086  ??                    C   Kb_Mesg         db      ?       ; Set to TRUE for "KB OK" display
                            C   ;
                            C   ;       string for displaying K bytes OK during testing
0087  000R(                 C   Disp_String     dw      TEST_STR_LEN dup (?)
                            C
                            C
                            C       page
                            C   ;
                            C   ;       RAM_IDT - Interrupt descriptor table
                            C   ;               This idt is located in RAM for ease of modification.
                            C   ;
009D                        C   RAM_IDT         label   byte
009D  ????                  C           TIG_desc        <>
009F  ????                  C
00A1  ??                    C
00A2  ??                    C
00A3  ????                  C 00A5  ????                  C           TIG_desc        <>
00A7  ????                  C
00A9  ??                    C
00AA  ??                    C
00AB  ????                  C
                            C
00AD  ????                  C           TIG_desc        <>
00AF  ????                  C
00B1  ??                    C
00B2  ??                    C
00B3  ????                  C 00B5  ????                  C           TIG_desc        <>
00B7  ????                  C
00B9  ??                    C
00BA  ??                    C
00BB  ????                  C
                            C
00BD  ????                  C           TIG_desc        <>
00BF  ????                  C
00C1  ??                    C
00C2  ??                    C
00C3  ????                  C 00C5  ????                  C           TIG_desc        <>
00C7  ????                  C
00C9  ??                    C
00CA  ??                    C
00CB  ????                  C 00CD  ????                  C           TIG_desc        <>
00CF  ????                  C
00D1  ??                    C
```

```
00D2  ??          C
00D3  ????        C
00D5  ????        C     TIG_desc    <>        ; # 8
00D7  ????        C
00D8  ??          C
00D9  ??          ;
00DD  ????        C     TIG_desc    <>
00DF  ????        C
00E1  ??          C
00E2  ??          C
00E3  ????        C
00E5  ????        C     TIG_desc    <>
00E7  ????        C
00E9  ??          C
00EA  ??          C
00EB  ????        C
00ED  ????        C     TIG_desc    <>
00EF  ????        C
00F1  ??          C
00F2  ??          C
00F3  ????        C
00F5  ????        C     TIG_desc    <>
00F7  ????        C
00F9  ??          C
00FA  ??          C
00FB  ????        C
00FD  ????        C     TIG_desc    <>
00FF  ????        C
0101  ??          C
0102  ??          C
0103  ????        C
0105  ????        C     TIG_desc    <>
0107  ????        C
0109  ??          C
010A  ??          C
010B  ????        C
010D  ????        C     TIG_desc    <>
010F  ????        C
0111  ??          C
0112  ??          C
0113  ????        C
0115  ????        C     TIG_desc    <>        ; # 16
0117  ????        C
0119  ??          C
011A  ??          C
011B  ????        C
011D  ????        C     TIG_desc    <>
011F  ????        C
0121  ??          ;
0122  ??          
0125  ????        C     TIG_desc    <>
0127  ????        C
0129  ??          C
012A  ??          C
012B  ????        C
012D  ????        C     TIG_desc    <>
012F  ????        C
0131  ??          C
0132  ??          C
0133  ????        C
0135  ????        C     TIG_desc    <>
0137  ????        C
0139  ??          C
013A  ??          C
013B  ????        C
013D  ????        C     TIG_desc    <>
013F  ????        C
0141  ??          C
0142  ??          C
0143  ????        C
0145  ????        C     TIG_desc    <>
0147  ????        C
0149  ??          C
014A  ??          C
014B  ????        C
014D  ????        C     TIG_desc    <>
014F  ????        C
0151  ??          C
0152  ??          C
0153  ????        C
0155  ????        C     TIG_desc    <>        ; # 24
0157  ????        C
```

| | | | | | |
|---|---|---|---|---|---|
| 0159 | ?? | c | | | |
| 015A | ?? | c | | | |
| 015B | ???? | c | | | |
| | | c | | | |
| 015D | ???? | c | TIG_desc | <> | |
| 015F | ???? | c | | | |
| 0161 | ?? | c | | | |
| 0162 | ?? | c | | | |
| 0163 | ???? | c | | | |
| | | c | | | |
| 0165 | ???? | c | TIG_desc | <> | |
| 0167 | ???? | c | | | |
| 0169 | ?? | c | | | |
| 016A | ?? | c | | | |
| 016B | ???? | c | | | |
| 016D | ???? | c | TIG_desc | <> | |
| 016F | ???? | c | | | |
| 0171 | ?? | c | | | |
| 0172 | ?? | c | | | |
| 0173 | ???? | c | | | |
| 0175 | ???? | c | TIG_desc | <> | |
| 0177 | ???? | c | | | |
| 0179 | ?? | c | | | |
| 017A | ?? | c | | | |
| 017B | ???? | c | | | |
| 017D | ???? | c | TIG_desc | <> | |
| 017F | ???? | c | | | |
| 0181 | ?? | c | | | |
| 0182 | ?? | c | | | |
| 0183 | ???? | c | | | |
| 0185 | ???? | c | TIG_desc | <> | |
| 0187 | ???? | c | | | |
| 0189 | ?? | c | | | |
| 018A | ?? | c | | | |
| 018B | ???? | c | | | |
| 018D | ???? | c | TIG_desc | <> | |
| 018F | ???? | c | | | |
| 0191 | ?? | c | | | |
| 0192 | ?? | c | | | |
| 0193 | ???? | c | | | |
| 0195 | ???? | c | TIG_desc | <> | ; # 32 |
| 0197 | ???? | c | | | |
| 0199 | ?? | c | | | |
| 019A | ?? | c | | | |
| 019B | ???? | c | | | |
| 019D | ???? | c | TIG_desc | <> | |
| 019F | ???? | c | | | |
| 01A1 | ?? | c | | | |
| 01A2 | ?? | c | | | |
| 01A3 | ???? | c | | | |
| 01A5 | ???? | c | TIG_desc | <> | |
| 01A7 | ???? | c | | | |
| 01A9 | ?? | c | | | |
| 01AA | ?? | c | | | |
| 01AB | ???? | c | | | |
| 01AD | ???? | c | TIG_desc | <> | |
| 01AF | ???? | c | | | |
| 01B1 | ?? | c | | | |
| 01B2 | ?? | c | | | |
| 01B3 | ???? | c | | | |
| 01B5 | ???? | c | TIG_desc | <> | |
| 01B7 | ???? | c | | | |
| 01B9 | ?? | c | | | |
| 01BA | ?? | c | | | |
| 01BB | ???? | c | | | |
| 01BD | ???? | c | TIG_desc | <> | |
| 01BF | ???? | c | | | |
| 01C1 | ?? | c | | | |
| 01C2 | ?? | c | | | |
| 01C3 | ???? | c | | | |
| 01C5 | ???? | c | TIG_desc | <> | |
| 01C7 | ???? | c | | | |
| 01C9 | ?? | c | | | |
| 01CA | ?? | c | | | |
| 01CB | ???? | c | | | |
| 01CD | ???? | c | TIG_desc | <> | |
| 01CF | ???? | c | | | |
| 01D1 | ?? | c | | | |
| 01D2 | ?? | c | | | |
| 01D3 | ???? | c | | | |
| 01D5 | ???? | c | TIG_desc | <> | ; # 40 |
| 01D7 | ???? | c | | | |
| 01D9 | ?? | c | | | |
| 01DA | ?? | c | | | |
| 01DB | ???? | c | | | |
| | | c | | | |

```
01DD  ????           C        TIG_desc      <>
01DF  ????           C
01E1  ??             C
01E2  ??             C
01E3  ????           C
                     C
01E5  ????           C        TIG_desc      <>
01E7  ????           C
01E9  ??             C
01EA  ??             C
01EB  ????           C
                     C
01ED  ????           C        TIG_desc      <>
01EF  ????           C
01F1  ??             C
01F2  ??             C
01F3  ????           C
                     C
01F5  ????           C        TIG_desc      <>
01F7  ????           C
01F9  ??             C
01FA  ??             C
01FB  ????           C
                     C
01FD  ????           C        TIG_desc      <>
01FF  ????           C
0201  ??             C
0202  ??             C
0203  ????           C
                     C
0205  ????           C        TIG_desc      <>
0207  ????           C
0209  ??             C
020A  ??             C
020B  ????           C
                     C
020D  ????           C        TIG_desc      <>
020F  ????           C
0211  ??             C
0212  ??             C
0213  ????           C
                     C
0215  ????           C        TIG_desc      <>    ; # 48
0217  ????           C
0219  ??             C
021A  ??             C
021B  ????           C
                     C
                     C
= 017F               C        RAM_IDTLIM    =    $-RAM_IDT-1   ; RAM IDT limit
                     C
021D                 C        DATA   ends
                     C .list
                              ;
                              page
                     ;***********************************************************
                     ;
                     ;       clr_mem - clears base memory and extended memory
                     ;
                     ;***********************************************************
0000                          clr_mem  proc   near
0000  60                               pusha
0001  1E                               push   ds
0002  06                               push   es
0003  B0 D0                            mov    al,CMEM_D0         ; Power_up_sequence_code
0005  E6 84                            out    u_dma,al
                              ;
0007  B8 0040                          mov    ax,BRAM_SEG
000A  8E D8                            mov    ds,ax              ; ds points to BIOS RAM area
                              ;
000C  89 26 0000 E                     mov    [rst_off],sp       ; Save ss:sp
0010  8C 16 0000 E                     mov    [rst_seg],ss
                              ;
0014                          prot_mode:                         ; Go to protected mode
0014  B0 D1                            mov    al,CMEM_D1         ; Power up sequence code
0016  E6 84                            out    u_dma,al
                              ;
0018  E8 0000 E                        call   goprot             ; Q: Go to protected mode?
001B  74 03                            jz     clear_ext          ; Y: Now in prot mode, begin
001D  E9 00E4 R                        jmp    cm_A20_err         ; N! Set error code and (halt).
                              ;
                              ;       Clear extended memory
                              ;
0020                          clear_ext:
0020  B0 D2                            mov    al,CMEM_D2         ; Power up sequence code
0022  E6 84                            out    u_dma,al
                              ;
                              ;       Get empirical extended memory size from CMOS
                              ;
0024  EB 00                            jmp    $+2
0026  EB 00                            jmp    $+2
0028  EB 00                            jmp    $+2
002A  B0 B1                            mov    al,(CMOS_EMP_HIGH+NMI_DISABLE)
002C  E6 70                            out    RTC_CMD,al
002E  EB 00                            jmp    $+2
0030  EB 00                            jmp    $+2
0032  EB 00                            jmp    $+2
0034  E4 71                            in     al,RTC_DATA        ; High byte of emp ext mem
0036  8A E0                            mov    ah,al
```

```
0038  EB 00                        jmp     $+2
003A  EB 00                        jmp     $+2
003C  EB 00                        jmp     $+2
003E  B0 80                        mov     al,(CMOS_EMP_LOW+NMI_DISABLE)
0040  E6 70                        out     RTC_CHG,al
0042  EB 00                        jmp     $+2
0044  EB 00                        jmp     $+2
0046  EB 00                        jmp     $+2
0048  E4 71                        in      al,RTC_DATA     ; Low byte of emp ext mem
                                                           ; ax = emp ext mem (KB)
004A  33 D2                        xor     dx,dx           ; dx:ax = dword value
004C  BB 0040                      mov     bx,64           ; bx = 64
004F  F7 F3                        div     bx              ; ax = # of segments in ext mem 0051  8A F8                        mov     bh,al           ; # of ext mem segments to clear
0053  B3 10                        mov     bl,10h          ; Start seg for ext mem clear
0055  E8 00F1 R                    call    clr_it 0058  E8 0000 E                    call    SizeHighMem     ; Size_high_memory
005B  A1 0081 R                    mov     ax,[High_Size]  ; Determine # of high memory segments
005E  05 0080                      add     ax,HIGH_SYS_SIZE ; Add high system size
0061  33 D2                        xor     dx,dx
0063  BB 0040                      mov     bx,64
0066  F7 F3                        div     bx              ; Convert dx:ax to segments
0068  8A F8                        mov     bh,al
006A  8A 1E 0080 R                 mov     bl,[High_Segment] ; Starting high memory segment
006E  E8 00F1 R                    call    clr_it          ; Clear high memory 0071  E8 0000 E                    call    MovSysROM       ; Move System ROM, do ROM replacement
                                                           ; Now executing ROM code in RAM
                                   page
;*****************************************************************
;
;       Return cpu to real mode
;
;       NOTE!   ss:sp are reloaded in clear_base.
;
;*****************************************************************
0074                       cm_reset:
0074  B0 D3                        mov     al,CMEM_D3      ; Power up sequence code
0076  E6 84                        out     u_dma,al
                                                           ; Reload all selectors
0078  B8 0028                      mov     ax,SSSEL        ; ax = real mode selector
007B  8E D8                        mov     ds,ax           ; Load ds cashe
007D  8E C0                        mov     es,ax           ; Load es cashe
007F  8E D0                        mov     ss,ax           ; Load ss cashe
;
;       Reset the PE bit to return to real mode.
;
                           mov_eax_cr0                     ; Move cr0 to eax
0081  0F 20 00             1       db      0Fh, 20h, 00h OSP
0084  66                   1       db      66h             ; 16/32 operand size prefix
0085  25 FFFE                      and     ax,0FFFEh       ; <and eax,07fffffeh>
0089  7FFF                         dw      7FFFh mov_cr0_eax                     ; Set real mode
008A  0F 22 00             1       db      0Fh, 22h, 00h 008D  EA                           db      0EAh            ; <jmp far ROM:real_cs> - Load cs cashe
008E  0092 R                       dw      real_cs         ; Destination offset
0090  ---- R                       dw      ROM             ; Destination segment 0092                       real_cs:
                                                           ; CPU now in real mode
0092  2E: 0F 01 1E 0000 E          lidt    qword ptr cs:real_idt ; Load real idt 0098  B0 D4                        mov     al,CMEM_D4      ; Power up sequence code
009A  E6 84                        out     u_dma,al
                                                           ; Fall thru to clear_base memory
                                   page
;*****************************************************************
;
;       Now clear base memory (including the GDT/IDT loaded in by goprot).
;
;*****************************************************************
009C                       clear_base:
009C  B8 0040                      mov     ax,BRAM_SEG
009F  8E D8                        mov     ds,ax           ; ds points to BIOS RAM area 00A1  8E 16 0000 E                 mov     ss,[rst_seg]
00A5  3B 26 0000 E                 mov     sp,[rst_off]    ; Load ss:sp
00A9  E8 0000 E                    call    Gate_A20        ; Disable gate A20

00AC  A1 0000 R                    mov     ax,[memsize]    ; Get size of base mem (KB)
00AF  33 D2                        xor     dx,dx           ; dx:ax = dword_value
00B1  BB 0040                      mov     bx,64           ; bx = 64
00B4  F7 F3                        div     bx              ; ax = # of segments in base mem 00B6  3D 0000                      cmp     ax,0
00B9  75 03                        jne     do_base
00BB  EB 23 90                     jmp     cm_exit         ; This should never happen 00BE                       do_base:
00BE  2D 0001                      sub     ax,1            ; Skip first segment of base memory
00C1  8A F8                        mov     bh,al           ; # of base mem segments to clear
```

```
00C3  BA 1000                    mov     dx,1000h            ; Start clearing with 2nd 64K
00C6                      base_seg_loop:
00C6  80 FF 00                   cmp     bh,0                ; Check # of segs to clear
00C9  74 15                      je      cm_exit             ; If none left go to prot mode 00CB  8E C2                      mov     es,dx               ; Load in RAM selector - ES
                                 ;
                                 ;                  OSP
00CD  66              1          db      66h                 ; 16/32 operand size prefix
00CE  33 C0                      xor     ax,ax
00D0  B9 4000                    mov     cx,16384            ; 1 segment worth of dwords
00D3  33 FF                      xor     di,di               ; di = 0
00D5  FC                         cld
                                 ;
                                 ;                  OSP
00D6  66              1          db      66h                 ; 16/32 operand size prefix
00D7  F3/ AB                     rep     stosw               ; Fill ES segment with 0
                                 ;
00D9  FE CF                      dec     bh                  ; 1 less segment to clear
00DB  80 C6 10                   add     dh,10h              ; DX = next segment to clear
00DE  EB E6                      jmp     base_seg_loop       ; Go to next segment
00E0              cm_exit:
00E0  07                         pop     es
00E1  1F                         pop     ds
00E2  21                         pop     cx 00E4              cm_A20_err:
00E4  BA 0000 E                  mov     dx,sb_err_beeps
00E7  BB 0000 E                  mov     bx,offset sb_err_msg
00EA  B9 0000 E                  mov     cx,sb_err_len
00ED  E8 0000 E                  call    out_err_code        ; Display message and
00F0  F4                         hlt                         ; Halt.
                                 ;
                                 clr_mem endp
                                 page
;*************************************************************
;
;       clr_it  - clears memory from protected mode
;
;               INPUT:  bh = # of consecutive segments to clear
;                       bl = high byte of 24bit address of start segment.
;                            ( same as segment # )
;
;               OUTPUT: none
;*************************************************************
00F1              clr_it  proc    near
                                 ;
00F1  50                         push    ax
00F2  53                         push    bx
00F3  51                         push    cx
00F4  57                         push    di
00F5  1E                         push    ds
00F6  06                         push    es
                                 ;
00F7  B8 0018                    mov     ax,DSSEL            ; DATA segment- contains GDT
00FA  8E D8                      mov     ds,ax
                                 ;
00FC  C7 06 004A R 0000          mov     RAM_desc.base_low,0 ; Clear out RAM seg addr
0102              ci_seg_loop:
0102  80 FF 00                   cmp     bh,0                ; Check # of segs to clear
0105  74 1B                      je      ci_exit 0107  89 1E 004C R               mov     RAM_desc.base_high,bl ; Seg high byte of seg addr
010B  B8 0048                    mov     ax,RAMSEL
010E  8E C0                      mov     es,ax               ; Load in RAM selector - ES
                                 ;
                                 ;                  OSP
0110  66              1          db      66h                 ; 16/32 operand size prefix
0111  33 C0                      xor     ax,ax
0113  B9 4000                    mov     cx,16384            ; 1 segment worth of dwords
0116  33 FF                      xor     di,di               ; di = 0
0118  FC                         cld
                                 ;
                                 ;                  OSP
0119  66              1          db      66h                 ; 16/32 operand size prefix
011A  F3/ AB                     rep     stosw               ; Fill ES segment with 0
                                 ;
011C  FE CF                      dec     bh                  ; 1 less segment to clear
011E  FE C3                      inc     bl                  ; High byte of next segment
0120  EB E0                      jmp     ci_seg_loop         ; Go to next segment
0122              ci_exit:
0122  07                         pop     es
0123  1F                         pop     ds
0124  5F                         pop     di
0125  59                         pop     cx
0126  5B                         pop     bx
0127  58                         pop     ax
0128  C3                         ret
                                 ;
                                 clr_it  endp
                                 ;
0129                     ROM     ends
                                 end
```

Microsoft (R) Macro Assembler  Version 4.00 clr_mem Copyright (C) 1985,86 COMPAQ Computer Corp.          Symbols-1

Macros:

| Name | Lines |
|---|---|
| MOV_AX_GS | 1 |
| MOV_CR0_EAX | 1 |
| MOV_EAX_CR0 | 1 |
| MOV_GS_AX | 1 |
| MOV_DX_DX | 1 |
| OSP | 1 |
| POP_FS | 1 |
| POP_GS | 1 |
| PUSH_FS | 1 |
| PUSH_GS | 1 |

Structures and Records:

| Name | Width Shift | # fields Width | Mask | Initial |
|---|---|---|---|---|
| CPU_REV_COM | 0002 | 0002 | | |
| COMPONENT | 0000 | | | |
| CPU_REVISION | 0001 | | | |
| DESC | 0008 | 0005 | | |
| LIMIT | 0000 | | | |
| BASE_LOW | 0002 | | | |
| BASE_HIGH | 0004 | | | |
| ACCESS | 0005 | | | |
| RES | 0006 | | | |
| DESC_386 | 0008 | 0006 | | |
| LIMIT_386 | 0000 | | | |
| BASE_LOW_386 | 0002 | | | |
| BASE_386 | 0004 | | | |
| ACCESS_386 | 0005 | | | |
| GD_LIMIT_386 | 0006 | | | |
| BASE_HIGH_386 | 0007 | | | |
| HIGH_MEMORY | 0008 | 0005 | | |
| ALLOC_FE | 0000 | | | |
| INSTALL | 0001 | | | |
| HIGH_TOTAL | 0002 | | | |
| HIGH_AVAIL | 0004 | | | |
| HIGH_START | 0006 | | | |
| MEM_ERR | 0004 | 0003 | | |
| BADHIGH | 0000 | | | |
| BADLOW | 0001 | | | |
| BADBIT | 0003 | | | |
| TIG_DESC | 0008 | 0005 | | |
| OFFST | 0000 | | | |
| CS_SEL | 0002 | | | |
| TIG_UN | 0004 | | | |
| TIG_AL | 0005 | | | |
| TIG_REG | 0006 | | | |

Segments and Groups:

| Name | Size | Align | Combine | Class |
|---|---|---|---|---|
| DATA | 021D | AT | 1C00 | |
| ROM | 0129 | BYTE | PUBLIC | 'ROM' |

Symbols:

| Name | Type | Value | Attr |
|---|---|---|---|
| A20OFF | Number | 00DD | |
| A20_ERR | Number | 0010 | |
| A20_ON | Number | 00DF | |
| ALLOC_PTR | Number | FFE0 | |
| ALTKEY | Number | 0008 | |
| ASC_ZERO | Number | 0030 | |
| AUTO_ | Number | 0008 | |
| A_BIT | Number | 0080 | |
| BAD_TIME | Number | 0004 | |
| BASE_32_BREAK | L BYTE | 0084 | DATA |
| BASE_ERR | L 0004 | 005A | DATA |
| BASE_FIRST | Number | 0002 | |
| BASE_HAL_ERR | L 0004 | 005E | DATA |
| BASE_LAST | Number | 0009 | |
| BASE_MIN | Number | 0080 | |
| BASE_SEG_INCR | Number | 0001 | |
| BASE_SEG_LOOP | L NEAR | 00C6 | ROM |
| BCS_DESC | L 0008 | 0038 | DATA |
| BHAL_ERR | Number | 0004 | |
| BRAM_40 | Number | 0040 | |
| BRAM_41 | Number | 0041 | |
| BRAM_42 | Number | 0042 | |
| BRAM_43 | Number | 0043 | |
| BRAM_44 | Number | 0044 | |
| BRAM_45 | Number | 0045 | |
| BRAM_46 | Number | 0046 | |
| BRAM_47 | Number | 0047 | |
| BRAM_SEG | Number | 0040 | |
| BRSEL | Number | 0020 | |
| BT_B9 | Number | 00B9 | |

| Symbol | Type | Value | Attr |
|---|---|---|---|
| BT_BA | Number | 00BA | |
| BT_BB | Number | 00BB | |
| BT_BC | Number | 00BC | |
| B_ERR | Number | 0001 | |
| CAPKEY | Number | 0040 | |
| CAPSLOK | Number | 0040 | |
| CAP_LED | Number | 0004 | |
| CAP_VID | Number | 0004 | |
| CF_EXT | L WORD | 0022 | COM |
| CF_EXT_COD | L WORD | 0020 | COM |
| CF_EXT_TAG | | | |
| CLEAR_EXT | L NEAR | 0020 | ROM |
| CLR_IT | N PROC | 00F1 | ROM Length = 0038 |
| CLR_MEM | N PROC | 0000 | ROM Global Length = 00F1 |
| CMEM_D0 | Number | 00D0 | |
| CMEM_D1 | Number | 00D1 | |
| CMEM_D2 | Number | 00D2 | |
| CMEM_D3 | Number | 00D3 | |
| CMEM_D4 | Number | 00D4 | |
| CMOS_ACFG | Number | 002D | |
| CMOS_BASE | L WORD | 006A | DATA |
| CMOS_CENTURY | Number | 0032 | |
| CMOS_CHP_HIGH | Number | 002E | |
| CMOS_CHP_LOW | Number | 002F | |
| CMOS_CONFIG | Number | 0014 | |
| CMOS_DIAG | Number | 000E | |
| CMOS_DISK_TYPE | Number | 0012 | |
| CMOS_DRV_C | Number | 0019 | |
| CMOS_DRV_D | Number | 001A | |
| CMOS_EMP_HIGH | Number | 0031 | |
| CMOS_EMP_LOW | Number | 0030 | |
| CMOS_EXT | L WORD | 006C | DATA |
| CMOS_EXT_HIGH | Number | 0018 | |
| CMOS_EXT_LOW | Number | 0017 | |
| CMOS_FLOP_TYPE | Number | 0010 | |
| CMOS_INV_CHECK | Number | 0040 | |
| CMOS_INV_CONFIG | Number | 0020 | |
| CMOS_MISC_FLAGS | Number | 0033 | |
| CMOS_REAL_HIGH | Number | 0016 | |
| CMOS_REAL_LOW | Number | 0015 | |
| CMOS_RST_CODE | Number | 000F | |
| CMOS_SIZE | L WORD | 006E | DATA |
| CM_A20_ERR | L NEAR | 00E4 | ROM |
| CM_EXIT | L NEAR | 00E0 | ROM |
| CM_RESET | L NEAR | 0074 | ROM |
| CNTMSK | Number | 003F | |
| COLOR_40_VDU | Number | 0010 | |
| COLOR_80_VDU | Number | 0020 | |
| COMMON_ | Number | 0000 | |
| COMM_SP | Number | 0024 | |
| CON | Number | 0004 | |
| COUNT | Number | 0009 | |
| CPU_HIGH | Number | 00A3 | |
| CPU_READ | Number | 00A5 | |
| CPU_REV_PTR | Number | FFE2 | |
| CSSEL | Number | 0030 | |
| CS_ACC | Number | 009A | |
| CS_DESC | L 0008 | 0030 | DATA |
| CTRLKEY | Number | 0004 | |
| DATA_SEG | Number | 1000 | |
| DEFAULT_CONFIG | Number | 0000 | |
| DELAYSEC | Number | 0040 | |
| DELAYSP | Number | 001F | |
| DELAY_COUNT | | | |
| DIAG_BASE | Number | 00C0 | |
| DIAG_BASE_HIGH | Number | 0060 | |
| DIAG_BASE_LOW | Number | 0000 | |
| DIAG_DESC | L 0008 | 0050 | DATA |
| DIAG_GO_LIMIT | Number | 0000 | |
| DIAG_LIMIT | Number | 0001 | |
| DIGIT_LEN | Number | 0005 | |
| DISK_ONE_T1 | Number | 0010 | |
| DISK_ONE_T10 | Number | 00A0 | |
| DISK_ONE_T11 | Number | 00B0 | |
| DISK_ONE_T12 | Number | 00C0 | |
| DISK_ONE_T13 | Number | 00D0 | |
| DISK_ONE_T14 | Number | 00E0 | |
| DISK_ONE_T15 | Number | 00F0 | |
| DISK_ONE_T2 | Number | 0020 | |
| DISK_ONE_T3 | Number | 0030 | |
| DISK_ONE_T4 | Number | 0040 | |
| DISK_ONE_T5 | Number | 0050 | |
| DISK_ONE_T6 | Number | 0060 | |
| DISK_ONE_T7 | Number | 0070 | |
| DISK_ONE_T8 | Number | 0080 | |
| DISK_ONE_T9 | Number | 0090 | |
| DISK_ONE_TYPE | Number | 000F | |
| DISK_TWO_T1 | Number | 0001 | |
| DISK_TWO_T10 | Number | 000A | |
| DISK_TWO_T11 | Number | 000B | |
| DISK_TWO_T12 | Number | 000C | |
| DISK_TWO_T13 | Number | 000D | |
| DISK_TWO_T14 | Number | 000E | |
| DISK_TWO_T15 | Number | 000F | |
| DISK_TWO_T2 | Number | 0002 | |
| DISK_TWO_T3 | Number | 0003 | |
| DISK_TWO_T4 | Number | 0004 | |

| | | | | |
|---|---|---|---|---|
| DISK_TWO_T5 | Number | 0005 | | |
| DISK_TWO_T6 | Number | 0006 | | |
| DISK_TWO_T7 | Number | 0007 | | |
| DISK_TWO_T8 | Number | 0008 | | |
| DISK_TWO_T9 | Number | 0009 | | |
| DISK_TWO_TYPE | Number | 00F0 | | |
| DISP_STRING | L WORD | 0087 | DATA | Length = 000B |
| DK_A0 | Number | 00A0 | | |
| DK_A1 | Number | 00A1 | | |
| DK_A2 | Number | 00A2 | | |
| DK_A3 | Number | 00A3 | | |
| DK_A4 | Number | 00A4 | | |
| DK_A5 | Number | 00A5 | | |
| DK_A6 | Number | 00A6 | | |
| DK_A7 | Number | 00A7 | | |
| DK_A8 | Number | 00A8 | | |
| DK_A9 | Number | 00A9 | | |
| DK_AA | Number | 00AA | | |
| DK_AB | Number | 00AB | | |
| DK_AC | Number | 00AC | | |
| DK_AD | Number | 00AD | | |
| DK_AE | Number | 00AE | | |
| DK_AF | Number | 00AF | | |
| DO_BASE | L NEAR | 00BE | ROM | |
| DPL0 | Number | 0000 | | |
| DPL1 | Number | 0020 | | |
| DPL2 | Number | 0040 | | |
| DPL3 | Number | 0060 | | |
| DSSEL | Number | 0018 | | |
| DS_ACC | Number | 0092 | | |
| DS_DESC | L 0008 | 0018 | DATA | |
| DUAL_F | Number | 0001 | | |
| EHAL_ERR | Number | 0008 | | |
| EM | Number | 0004 | | |
| ENH_LRD | Number | 0010 | | |
| ERR_RST | Number | 0003 | | |
| ES_DESC | L 0008 | 0020 | DATA | |
| EXT_15M_HIGH | Number | 003C | | |
| EXT_1M_HIGH | Number | 0004 | | |
| EXT_1_5M_HIGH | Number | 0006 | | |
| EXT_2M_HIGH | Number | 0008 | | |
| EXT_32_BREAK | L BYTE | 0085 | DATA | |
| EXT_512K_HIGH | Number | 0002 | | |
| EXT_ERR | L 0004 | 0062 | DATA | |
| EXT_FIRST | Number | 0010 | | |
| EXT_HAL_ERR | L 0004 | 0066 | DATA | |
| EXT_LAST | Number | 00FD | | |
| EXT_LOW | Number | 0000 | | |
| EXT_MIN | Number | 0000 | | |
| EXT_SEG_INCR | Number | 0001 | | |
| EX_DOWN | Number | 0004 | | |
| E_ERR | Number | 0002 | | |
| FAILED_DRIVEC | Number | 0008 | | |
| FALSE | Number | 0000 | | |
| FAST_ | Number | 0001 | | |
| FAST_CPU | Number | 000C | | |
| FAST_SP | Number | 0022 | | |
| FIN_SETUP | Number | 0045 | | |
| FLOP_ONE_48 | Number | 0010 | | |
| FLOP_ONE_96 | Number | 0020 | | |
| FLOP_ONE_TYPE | Number | 000F | | |
| FLOP_TWO_48 | Number | 0001 | | |
| FLOP_TWO_96 | Number | 0002 | | |
| FLOP_TWO_TYPE | Number | 00F0 | | |
| FOUND_BASE | L WORD | 0070 | DATA | |
| FOUND_EXT | L WORD | 0072 | DATA | |
| FOUND_SIZE | L WORD | 0074 | DATA | |
| FOUR_FLOP | Number | 00C0 | | |
| FREE_FE | Number | 0010 | | |
| FULL_SIZE | Number | FFFF | | |
| FX_B0 | Number | 00B0 | | |
| FX_B1 | Number | 00B1 | | |
| FX_B2 | Number | 00B2 | | |
| FX_B3 | Number | 00B3 | | |
| FX_B4 | Number | 00B4 | | |
| FX_B5 | Number | 00B5 | | |
| FX_B6 | Number | 00B6 | | |
| FX_B7 | Number | 00B7 | | |
| FX_B8 | Number | 00B8 | | |
| F_NUM_LK | Number | 0020 | | |
| GATE_A20 | L NEAR | 0000 | ROM | External |
| GDT | L 0008 | 0000 | DATA | |
| GDTLIM | Number | 0057 | | |
| GDTSEL | Number | 0008 | | |
| GDT_DESC | L 0008 | 0008 | DATA | |
| GOOD_SIZE | L WORD | 0078 | DATA | |
| GOFNOT | L NEAR | 0000 | ROM | External |
| GOT_287 | Number | 0002 | | |
| GOT_DRIVES | Number | 0001 | | |
| GOT_E0 | Number | 0002 | | |
| GOT_E1 | Number | 0001 | | |
| HALT_ERR | Number | 0040 | | |
| HAL_ERR | Number | 0002 | | |
| HIGH | Number | 0002 | | |

```
HIGH_CPU . . . . . . . . . . . . .        Number   0004
HIGH_MAX_SEG . . . . . . . . . .          Number   00FF
HIGH_MIN_SEG . . . . . . . . . .          Number   00F0
HIGH_SEGMENT . . . . . . . . . .          L BYTE   0080   DATA
HIGH_SIZE . . . . . . . . . . .           L WORD   0081   DATA
HIGH_SP . . . . . . . . . . . .           Number   0000
HIGH_SYS_SEG . . . . . . . . . .          Number   00FE
HIGH_SYS_SIZE . . . . . . . . .           Number   0080
HIGH_USER_SEG . . . . . . . . .           Number   00FA
HIGH_USER_SIZE . . . . . . . . .          Number   0100

IBMPC_SP . . . . . . . . . . . .          Number   0031
IDTSEL . . . . . . . . . . . . .          Number   0010
IDT_DESC . . . . . . . . . . . .          L 0008   0010   DATA
IO_ACC . . . . . . . . . . . . .          Number   0086
INIT_KSETUP . . . . . . . . . .           Number   0050
INSKEY . . . . . . . . . . . . .          Number   0030
INSRION . . . . . . . . . . . .           Number   0080
IP_287 . . . . . . . . . . . . .          Number   0020
IRQ0_SEL . . . . . . . . . . . .          Number   0008
IRQ8_SEL . . . . . . . . . . . .          Number   0070

J1MEG . . . . . . . . . . . . .           Number   0040
J2MEG . . . . . . . . . . . . .           Number   0080
J512 . . . . . . . . . . . . . .          Number   0010
J640 . . . . . . . . . . . . . .          Number   0020

KBD_IO . . . . . . . . . . . . .          Number   1000
KBD_TYPE . . . . . . . . . . . .          Number   0020
KBD_DESC . . . . . . . . . . . .          L 0008   0018   DATA
KBD_SEL . . . . . . . . . . . .           Number   0018
KCMD_DIAG_DUMP . . . . . . . . .          Number   00AC
KCMD_DISABLE . . . . . . . . . .          Number   00AD
KCMD_DIS_KBD . . . . . . . . . .          Number   00F5
KCMD_ECHO . . . . . . . . . . .           Number   00EE
KCMD_ENABLE . . . . . . . . . .           Number   00AE
KCMD_ENA_KBD . . . . . . . . . .          Number   00F4
KCMD_INTF_TEST . . . . . . . . .          Number   00AB
KCMD_IP . . . . . . . . . . . .           Number   0040
KCMD_LEDS . . . . . . . . . . .           Number   00ED
KCMD_NOP . . . . . . . . . . . .          Number   00FD
KCMD_PULSE_OUT . . . . . . . . .          Number   00F0
KCMD_RD . . . . . . . . . . . .           Number   0020
KCMD_RD_INPUT . . . . . . . . .           Number   00C0
KCMD_RD_OUTPUT . . . . . . . . .          Number   00D0
KCMD_RD_TINPUTS . . . . . . . .           Number   00E0
KCMD_RESEND . . . . . . . . . .           Number   00FE
KCMD_RESET . . . . . . . . . . .          Number   00FF
KCMD_SELF_TEST . . . . . . . . .          Number   00AA
KCMD_SETTYPE . . . . . . . . . .          Number   00F3
KCMD_WT . . . . . . . . . . . .           Number   0060
KCMD_WT_OUTPUT . . . . . . . . .          Number   00D1
KEY_80 . . . . . . . . . . . . .          Number   0080
KEY_81 . . . . . . . . . . . . .          Number   0081
KEY_82 . . . . . . . . . . . . .          Number   0082
KEY_83 . . . . . . . . . . . . .          Number   0083
KEY_84 . . . . . . . . . . . . .          Number   0084
KEY_86 . . . . . . . . . . . . .          Number   0086
KEY_87 . . . . . . . . . . . . .          Number   0087
KEY_88 . . . . . . . . . . . . .          Number   0088
KEY_89 . . . . . . . . . . . . .          Number   0089
KEY_8A . . . . . . . . . . . . .          Number   008A
KEY_8B . . . . . . . . . . . . .          Number   008B
KEY_8C . . . . . . . . . . . . .          Number   008C
KEY_8D . . . . . . . . . . . . .          Number   008D
KEY_CMD . . . . . . . . . . . .           Number   0064
KEY_IN_BUFF . . . . . . . . . .           Number   0060
KEY_OUT_BUFF . . . . . . . . . .          Number   0060
KEY_STATUS . . . . . . . . . . .          Number   0064
KEY_TEST_OK . . . . . . . . . .           Number   0055
KIN_287 . . . . . . . . . . . .           Number   0004
KIN_CPU_SPEED . . . . . . . . .           Number   0010
KIN_KEY_LOCK . . . . . . . . . .          Number   0080
KIN_MANUF . . . . . . . . . . .           Number   0020
KIN_P_DISPLAY . . . . . . . . .           Number   0040
KOUT_A20 . . . . . . . . . . . .          Number   0002
KOUT_CLK_OUT . . . . . . . . . .          Number   0040
KOUT_CPU_RESET . . . . . . . . .          Number   0001
KOUT_CPU_SPEED . . . . . . . . .          Number   000C
KOUT_DATA_OUT . . . . . . . . .           Number   0010
KOUT_IN_FULL . . . . . . . . . .          Number   0020
KOUT_OUT_FULL . . . . . . . . .           Number   0010
KSTAT_CMD_DATA . . . . . . . . .          Number   0008
KSTAT_INHIBIT . . . . . . . . .           Number   0010
KSTAT_OUT_FULL . . . . . . . . .          Number   0001
KSTAT_P_ERROR . . . . . . . . .           Number   0080
KSTAT_RTO . . . . . . . . . . .           Number   0040
KSTAT_SYS_FLAG . . . . . . . . .          Number   0004
KSTAT_TTO . . . . . . . . . . .           Number   0020
K_CLICK . . . . . . . . . . . .           Number   0002
K_CPU_FAST . . . . . . . . . . .          Number   000C
K_CPU_HIGH . . . . . . . . . . .          Number   0004
K_CPU_SLOW . . . . . . . . . . .          Number   0008

LEFTALT . . . . . . . . . . . .           Number   0002
LEFTCTRL . . . . . . . . . . . .          Number   0001
LEFTSHF . . . . . . . . . . . .           Number   0002
```

| Symbol | Type | Value | Attr | Ref |
|---|---|---|---|---|
| MEMORY_BREAK | L BYTE | 0083 | DATA | |
| MEMSIZE | V WORD | 0000 | | External |
| MEM_60 | Number | 0060 | | |
| MEM_61 | Number | 0061 | | |
| MEM_62 | Number | 0062 | | |
| MEM_63 | Number | 0063 | | |
| MEM_64 | Number | 0064 | | |
| MEM_640K | Number | 0080 | | |
| MEM_65 | Number | 0065 | | |
| MEM_66 | Number | 0066 | | |
| MEM_67 | Number | 0067 | | |
| MEM_68 | Number | 0068 | | |
| MEM_69 | Number | 0069 | | |
| MEM_6A | Number | 006A | | |
| MEM_6B | Number | 006B | | |
| MEM_6C | Number | 006C | | |
| MEM_6D | Number | 006D | | |
| MEM_6E | Number | 006E | | |
| MEM_6F | Number | 006F | | |
| MEM_70 | Number | 0070 | | |
| MEM_71 | Number | 0071 | | |
| MEM_72 | Number | 0072 | | |
| MEM_73 | Number | 0073 | | |
| MEM_74 | Number | 0074 | | |
| MEM_7C | Number | 007C | | |
| MEM_7D | Number | 007D | | |
| MEM_7E | Number | 007E | | |
| MEM_7F | Number | 007F | | |
| MEM_DISCREP | Number | 0010 | | |
| MM_ERR | Number | 0080 | | |
| MONO_VDU | Number | 0030 | | |
| MOVSYSROM | L NEAR | 0000 | ROM | External |
| MP | Number | 0002 | | |
| M_DMA | Number | 0085 | | |
| M_RESET_00 | Number | 0000 | | |
| M_RUN_01 | Number | 0001 | | |
| NMI_DISABLE | Number | 0080 | | |
| NOISEPEACE | Number | 0001 | | |
| NOISY | Number | | | |
| NO_DISK_ONE | Number | 0000 | | |
| NO_DISK_TWO | Number | 0000 | | |
| NUMKEY | Number | 0020 | | |
| NUMLOCK | Number | 0020 | | |
| NUM_FLOPS | Number | 003F | | |
| NUM_LED | Number | 0002 | | |
| OK_MEM | Number | 0000 | | |
| OP_RST | Number | 0002 | | |
| ONE_FLOP | Number | 0000 | | |
| OPT_E0 | Number | 00E0 | | |
| OPT_E1 | Number | 00E1 | | |
| OPT_E2 | Number | 00E2 | | |
| OPT_E3 | Number | 00E3 | | |
| OTHER_VDU | Number | 0000 | | |
| OUT_ERR_CODE | L NEAR | 0000 | ROM | External |
| PE | Number | 0001 | | |
| PPI | Number | 0061 | | |
| PPI_ENB_IOCHECK | Number | 0008 | | |
| PPI_ENB_PCHECK | Number | 0004 | | |
| PPI_IOCHECK | Number | 0040 | | |
| PPI_PCHECK | Number | 0080 | | |
| PPI_REFRSH | Number | 0010 | | |
| PPI_SPKR_DATA | Number | 0002 | | |
| PPI_SPKR_GATE | Number | 0001 | | |
| PPI_T2OUT | Number | 0020 | | |
| PPO | Number | 0061 | | |
| PPO_ENB_IOCHECK | Number | 0008 | | |
| PPO_ENB_PCHECK | Number | 0004 | | |
| PPO_INIT | Number | 000C | | |
| PPO_SPKR_DATA | Number | 0002 | | |
| PPO_SPKR_GATE | Number | 0001 | | |
| PRES | Number | 0080 | | |
| PRIM_VDU | Number | 0030 | | |
| PROT_75 | Number | 0075 | | |
| PROT_76 | Number | 0076 | | |
| PROT_77 | Number | 0077 | | |
| PROT_78 | Number | 0078 | | |
| PROT_79 | Number | 0079 | | |
| PROT_7A | Number | 007A | | |
| PROT_7B | Number | 007B | | |
| PROT_MODE | L NEAR | 0014 | ROM | |
| RAM400 | V WORD | 0000 | | External |
| RAMI_30 | Number | 0030 | | |
| RAMI_31 | Number | 0031 | | |
| RAMI_32 | Number | 0032 | | |
| RAMI_33 | Number | 0033 | | |
| RAMI_34 | Number | 0034 | | |
| RAMI_35 | Number | 0035 | | |
| RAMI_36 | Number | 0036 | | |
| RAMI_37 | Number | 0037 | | |
| RAMI_39 | Number | 0039 | | |
| RAMI_3A | Number | 003A | | |
| RAMI_3B | Number | 003B | | |
| ROMSEL | Number | 0048 | | |

| Name | Type | Value | Section | Notes |
|---|---|---|---|---|
| RAM_DESC | L 0008 | 0048 | DATA | |
| RAM_ERR_BEEPS | Number | 0000 | | |
| RAM_IDT | L BYTE | 009D | DATA | |
| RAM_IDTLIM | Number | 017F | | |
| RCVD_ACK | Number | 0010 | | |
| RD | Number | 0002 | | |
| REAL_256K_HIGH | Number | 0001 | | |
| REAL_256K_LOW | Number | 0000 | | |
| REAL_512K_HIGH | Number | 0002 | | |
| REAL_512K_LOW | Number | 0000 | | |
| REAL_640K_HIGH | Number | 0002 | | |
| REAL_640K_LOW | Number | 0080 | | |
| REAL_CS | L NEAR | 0092 | ROM | |
| REAL_IDT | V WORD | 0000 | ROM | External |
| RESET_00 | Number | 0000 | | |
| RESET_01 | Number | 0001 | | |
| RESET_02 | Number | 0002 | | |
| RESET_03 | Number | 0003 | | |
| RESET_04 | Number | 0004 | | |
| RESET_05 | Number | 0005 | | |
| RESET_06 | Number | 0006 | | |
| RESET_07 | Number | 0007 | | |
| RESET_08 | Number | 0008 | | |
| RESET_09 | Number | 0009 | | |
| RESET_0A | Number | 000A | | |
| RESET_0B | Number | 000B | | |
| RESET_0C | Number | 000C | | |
| RESET_0F | Number | 000F | | |
| RID_1ST | Number | 0040 | | |
| RID_IP | Number | 0080 | | |
| RIOTALT | Number | 0008 | | |
| RIOTCTRL | Number | 0004 | | |
| RIOTSHF | Number | 0001 | | |
| RST286 | Number | 00FE | | |
| RST_BLK_MOV | Number | 0009 | | |
| RST_BOOT | Number | 0004 | | |
| RST_MEM_ERR | Number | 0003 | | |
| RST_MEM_OK | Number | 0002 | | |
| RST_MEM_SIZ | Number | 0001 | | |
| RST_NORMAL | Number | 0000 | | |
| RST_OFF | V WORD | 0000 | | External |
| RST_PROT_ERR | Number | 0007 | | |
| RST_PROT_OK | Number | 0006 | | |
| RST_SEG | V WORD | 0000 | | External |
| RST_VECT | Number | 000A | | |
| RST_VECTI | Number | 0005 | | |
| RTCA_DIV | Number | 0020 | | |
| RTCA_RS | Number | 0006 | | |
| RTCA_UIP | Number | 0080 | | |
| RTCB_AIE | Number | 0020 | | |
| RTCB_DM | Number | 0004 | | |
| RTCB_DSE | Number | 0001 | | |
| RTCB_PIE | Number | 0040 | | |
| RTCB_SET | Number | 0080 | | |
| RTCB_SQWE | Number | 0008 | | |
| RTCB_UIE | Number | 0010 | | |
| RTCC_AF | Number | 0020 | | |
| RTCC_IRQF | Number | 0080 | | |
| RTCC_PF | Number | 0040 | | |
| RTCC_UF | Number | 0010 | | |
| RTCD_VAL_CMOS | Number | 0080 | | |
| RTC_ALRM_HRS | Number | 0005 | | |
| RTC_ALRM_MINS | Number | 0003 | | |
| RTC_ALRM_SECS | Number | 0001 | | |
| RTC_CMD | Number | 0070 | | |
| RTC_DATA | Number | 0071 | | |
| RTC_DATE | Number | 0007 | | |
| RTC_HRS | Number | 0004 | | |
| RTC_LOST_POWER | Number | 0080 | | |
| RTC_MINS | Number | 0002 | | |
| RTC_MONTH | Number | 0008 | | |
| RTC_REGA | Number | 000A | | |
| RTC_REGB | Number | 000B | | |
| RTC_REGC | Number | 000C | | |
| RTC_REGD | Number | 000D | | |
| RTC_SECS | Number | 0000 | | |
| RTC_WEEKDAY | Number | 0006 | | |
| RTC_YEAR | Number | 0009 | | |
| RUN_10 | Number | 0010 | | |
| RUN_11 | Number | 0011 | | |
| RUN_12 | Number | 0012 | | |
| RUN_13 | Number | 0013 | | |
| RUN_14 | Number | 0014 | | |
| RUN_15 | Number | 0015 | | |
| RUN_16 | Number | 0016 | | |
| RUN_17 | Number | 0017 | | |
| SANITY_0D | Number | 000D | | |
| SANITY_0E | Number | 000E | | |
| SAN_10 | Number | 0010 | | |
| SAN_11 | Number | 0011 | | |
| SAN_12 | Number | 0012 | | |
| SAN_13 | Number | 0013 | | |
| SAN_14 | Number | 0014 | | |
| SAN_15 | Number | 0015 | | |
| SAN_16 | Number | 0016 | | |
| SAN_17 | Number | 0017 | | |
| SAN_18 | Number | 0018 | | |

| | | | | |
|---|---|---|---|---|
| SAN_1? | Number | 001? | | |
| SAN_1D | Number | 001D | | |
| SAN_1D | Number | 001D | | |
| SAN_1D | Number | 001D | | |
| SAN_1? | Number | 001? | | |
| SAN_1E | Number | 001E | | |
| SAN_1F | Number | 001F | | |
| SAN_20 | Number | 0020 | | |
| SAN_21 | Number | 0021 | | |
| SAN_22 | Number | 0022 | | |
| SAN_23 | Number | 0023 | | |
| SAN_24 | Number | 0024 | | |
| SAN_25 | Number | 0025 | | |
| SAN_26 | Number | 0026 | | |
| SAN_27 | Number | 0027 | | |
| SAN_28 | Number | 0028 | | |
| SAN_29 | Number | 0029 | | |
| SAN_2A | Number | 002A | | |
| SAN_2B | Number | 002B | | |
| SAN_2C | Number | 002C | | |
| SAN_2D | Number | 002D | | |
| SB_90 | Number | 0090 | | |
| SB_91 | Number | 0091 | | |
| SB_92 | Number | 0092 | | |
| SB_93 | Number | 0093 | | |
| SB_94 | Number | 0094 | | |
| SB_95 | Number | 0095 | | |
| SB_96 | Number | 0096 | | |
| SB_ERR_BEEPS | Number | 0000 | | External |
| SB_ERR_LEN | Number | 0000 | | External |
| SB_ERR_MSG | V BYTE | 0000 | ROM | External |
| SCRLKEY | Number | 0010 | | |
| SCRLOCK | Number | 0010 | | |
| SCRL_LED | Number | 0001 | | |
| SEG_512 | Number | 00F4 | | |
| SEG_640 | Number | 00F8 | | |
| SETUP_FLAG | Number | 0040 | | |
| SIZEHIGHMEM | L NEAR | 0000 | ROM | External |
| SIZE_1MEG | Number | 0400 | | |
| SIZE_2MEG | Number | 0800 | | |
| SIZE_512 | Number | 0100 | | |
| SIZE_640 | Number | 0080 | | |
| SIZE_8MEG | Number | 2000 | | |
| SIZE_BASE | L WORD | 007A | DATA | |
| SIZE_EXT | L WORD | 007C | DATA | |
| SIZE_FINAL | L WORD | 007E | DATA | |
| SLOW_CPU | Number | 0008 | | |
| SPEEDIO | Number | 0086 | | |
| SSSEL | Number | 0028 | | |
| SS_DESC | L 0008 | 0029 | DATA | |
| SYSREQ | Number | 0004 | | |
| SYS_ROM_OFFSET | Number | 8000 | | |
| SYS_ROM_SEG | Number | 000F | | |
| SYS_ROM_SIZE | Number | 8000 | | |
| S_BIT | Number | 0040 | | |
| TEST_SIZE | L WORD | 0026 | DATA | |
| TEST_STATUS | L WORD | 0028 | DATA | |
| TEST_?? | ?? | ??? | | |
| THREE_FLOP | Number | 0080 | | |
| TOGGLE_ | Number | 0003 | | |
| TRAM_ERR | Number | 0001 | | |
| TRG_ACC | Number | 0087 | | |
| TRUE | Number | 0001 | | |
| TWO_FLOP | Number | 0040 | | |
| U_DMA | Number | 0084 | | |
| VDU_50 | Number | 0050 | | |
| VDU_51 | Number | 0051 | | |
| VDU_52 | Number | 0052 | | |
| VDU_53 | Number | 0053 | | |
| VDU_54 | Number | 0054 | | |
| VDU_55 | Number | 0055 | | |
| VDU_56 | Number | 0056 | | |
| VDU_57 | Number | 0057 | | |
| VDU_58 | Number | 0058 | | |
| VDU_59 | Number | 0059 | | |
| VDU_5A | Number | 005A | | |
| VDU_5B | Number | 005B | | |
| VDU_5C | Number | 005C | | |
| VDU_5D | Number | 005D | | |
| VDU_5E | Number | 005E | | |
| VDU_5F | Number | 005F | | |
| VIDSEL | Number | 0040 | | |
| VID_DESC | L 0008 | 0040 | DATA | |
| VID_SEG | Number | B000 | | |
| WOWKEY | Number | 0008 | | |
| WR | Number | 0002 | | |
| WRITEABLE | Number | 0002 | | |

1338 Source Lines
1351 Total Lines
659 Symbols

27608 Bytes symbol space free

0 Warning Errors
0 Severe Errors

What I claim is:

1. A personal computer with a high speed microprocessor compatible with applications software written for slower speed microprocessors comprising:
   (a) a high speed microprocessor with a real and protected mode electrically coupled to a high speed data bus;
   (b) non-volatile memory electrically coupled to a slow speed data bus;
   (c) bus controller electrically coupling the high speed data bus to the slow speed data bus;
   (d) dynamic memory electrically coupled to the high speed data bus;
   (e) at least one input/output device coupled to said slow speed data bus;
   (f) first microprocessor instruction halting means responsive to dynamic memory refresh cycle, said cycle repeatably occurring at timed intervals to generate a first microprocessor hold request;
   (g) second microprocessor instruction halting means responsive to a direct memory access (DMA) request to generate a second microprocessor hold request;
   (h) first arbitration means to arbitrate said first microprocessor hold request and said second microprocessor hold request to generate an arbitrated microprocessor hold request;
   (i) switching means for switching the microprocessor from the real to protected mode and from protected to real mode, said switching means generates a microprocessor reset cycle when the microprocesor returns from the protected mode to the real mode; and
   (j) detection means to detect the occurrence of an arbitrated microprocessor hold request during a microprocessor reset cycle to retain, for execution at a later time, the arbitrated microprocessor hold request generated during the execution of a microprocessor reset cycle.

2. The personal computer set forth in claim 1 wherein the detection means further detects and retains a microprocessor reset instruction, for execution at a later time, in the event an arbitrated microprocessor hold request is being processed at the time a microprocessor reset instruction is received.

3. The personal computer set forth in claim 2 further comprising a second arbitration logic means which arbitrates the priority of the microprocessor refresh cycle and the arbitrated microprocessor hold requests.

4. The personal computer set forth in claim 3 wherein said second arbitration logic means executes the microprocessor refresh cycle and arbitrated microprocessor hold requested in the order received.

5. A personal computer with a high speed microprocessor comprising:
   (a) a high speed microprocessor with a real and protected mode electrically coupled to a data bus;
   (b) non-volatile memory electrically coupled to a data bus;
   (c) dynamic memory electrically coupled to the data bus;
   (d) at least one input/output device;
   (e) microprocessor instruction halting means responsive to dynamic memory refresh cycle, said cycle repeatably occurring at timed intervals to generate a first microprocessor hold request;
   (f) microprocessor instruction halting means responsive to a direct memory access (DMA) request to generate a second microprocessor hold request;
   (g) arbitration means to arbitrate said first microprocessor hold request and said second microprocessor hold request to generate an arbitrated microprocessor hold request;
   (h) switching means for switching the microprocessor from the real to protected mode and from protected to real mode, said switching means generates a microprocessor reset cycle when the microprocessor returns from the protected mode to the real mode; and
   (i) detection means to detect the occurrence of an arbitrated microprocessor hold request during a microprocessor reset cycle to retain, for execution at a later time, the arbitrated microprocesor hold request generated during the execution of a microprocessor reset cycle.

6. The personal computer set forth in claim 5 wherein the detection means further detects and retains a microprocessor reset instruction, for execution at a later time, in the event an arbitrated microprocessor hold request is being processed at the time a microprocessor reset instruction is received.

* * * * *